US012627517B2

(12) United States Patent
Finlow-Bates et al.

(10) Patent No.: US 12,627,517 B2
(45) Date of Patent: May 12, 2026

(54) SYSTEMS AND METHODS FOR PERFORMING SECURE TRANSACTIONS ON BLOCKCHAIN

(71) Applicant: Artema Labs, Inc, Los Angeles, CA (US)

(72) Inventors: Keir Finlow-Bates, Eura (FI); Bjorn Markus Jakobsson, New York, NY (US)

(73) Assignee: Artema Labs, Inc, Los Angeles, CA (US)

( * ) Notice: Subject to any disclaimer, the term of this patent is extended or adjusted under 35 U.S.C. 154(b) by 0 days.

(21) Appl. No.: 19/038,599

(22) Filed: Jan. 27, 2025

(65) Prior Publication Data

US 2025/0385807 A1     Dec. 18, 2025

Related U.S. Application Data

(60) Provisional application No. 63/687,205, filed on Aug. 26, 2024, provisional application No. 63/683,175, (Continued)

(51) Int. Cl.
| | |
|---|---|
| *H04L 9/00* | (2022.01) |
| *H04L 9/08* | (2006.01) |
| *H04L 9/32* | (2006.01) |

(52) U.S. Cl.
CPC .............. *H04L 9/50* (2022.05); *H04L 9/0869* (2013.01); *H04L 9/3213* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 6,901,145 B1 | 5/2005 | Bohannon et al. | |
| RE49,968 E * | 5/2024 | Ebrahimi | .............. H04L 9/3247 |

(Continued)

OTHER PUBLICATIONS

Anderson et al., "A New Family of Authentication Protocols", Acm Sigops Operating Systems Review, vol. 32, Issue 4, Oct. 1, 1998, pp. 9-20, https://doi.org/10.1145/302350.302353.

(Continued)

*Primary Examiner* — Bassam A Noaman
(74) *Attorney, Agent, or Firm* — KPPB LLP

(57)     ABSTRACT

Systems and methods for securing transactions in accordance with various embodiments of the invention are illustrated. One embodiment includes a method for confirming token ownership rights. The method generates a pre-image value using a random number generator. The method generates an action request that corresponds to an action performed cryptographic token(s). The method derives a commit output based on the pre-image value. The method generates a commit request that obfuscates the action request based on the commit output and submits the commit request to an immutable ledger. The method receives a confirmation when the commit request is approved by the ledger. When a reveal request referencing the commit output is published, the method receives a confirmation of at least one of: the reveal request being published, that the reveal request comprises a reference to the commit output, or that the action request has been approved.

26 Claims, 44 Drawing Sheets

Related U.S. Application Data filed on Aug. 14, 2024, provisional application No. 63/671,588, filed on Jul. 15, 2024, provisional application No. 63/660,984, filed on Jun. 17, 2024.

(56) References Cited

U.S. PATENT DOCUMENTS

| | | | |
|---|---|---|---|
| 2019/0394179 A1* | 12/2019 | Androulaki | H04L 9/0822 |
| 2020/0145198 A1* | 5/2020 | Guan | H04L 9/30 |
| 2022/0035950 A1* | 2/2022 | Wakabayashi | G06F 12/1408 |
| 2023/0087602 A1* | 3/2023 | De Caro | G06Q 20/065 |
| | | | 705/64 |
| 2023/0254136 A1* | 8/2023 | Stewart | H04L 9/50 |
| | | | 713/150 |
| 2023/0351464 A1* | 11/2023 | Beausoleil | G06Q 30/018 |
| 2024/0078940 A1* | 3/2024 | Salem | G05D 1/104 |
| 2024/0171393 A1* | 5/2024 | Bathen | H04L 9/3236 |
| 2024/0394689 A1* | 11/2024 | Ellis | G06Q 20/3829 |
| 2025/0013995 A1* | 1/2025 | Chaum | H04L 9/3218 |

OTHER PUBLICATIONS

Bonneau et al., "Fawkescoin: A cryptocurrency without public-key cryptography", Security Protocols XXII, Security Protocols 2014, Lecture Notes in Computer Science, vol. 8809, Oct. 29, 2014, https://doi.org/10.1007/978-3-319-12400-1_35.

Buterin, "How to Hard-Fork to Save Most Users' Funds in a Quantum Emergency", Ethereum Research, Mar. 9, 2024, Available at: ethresear.ch/t/how-to-hard-fork-to-save-most-users-funds-in-a-quantum-emergency/18901.

Buterin et al., "ERC-4337: Account Abstraction Using Alt Mempool" Ethereum Improvement Proposals, No. 4337, Sep. 2021, available from https://eips.ethereum.org/EIPS/eip-4337.

Di Crescenzo et al., "How To Forget a Secret", STACS 1999: STACS 99 pp. 500-509.

Golle et al., "Universal Re-Encryption for Mixnets", Topics in Cryptology—CT-RSA 2004, The Cryptographers' Track at the RSA Conference 2004, San Francisco, CA, USA, Feb. 23-27, 2004.

Jakobsson, "Financial Instruments in Recommendation Mechanisms", Published in FC 2002: Financial Cryptography, 2003, LNCS 2357, pp. 31-43.

Jakobsson, "On Quorum Controlled Asymmetric Proxy Re-encryption", Lecture Notes in Computer Science, Oct. 1999, vol. 1560: 632-632. DOI: 10.1007/3-540-49162-7_9.

Jakobsson, "Privacy vs Authenticity", Dissertation or Thesis, 1997, UMI Order No. GAX98-04529, 18pgs.

Jakobsson et al., "Making Mix Nets Robust For Electronic Voting By Randomized Partial Checking", Proceedings of the 11th USENIX Security Symposium, 2002, 16pgs.

Jakobsson et al., "Proving Without Knowing: On Oblivious, Agnostic and Blindfolded Provers", 1998, 15 pages, available from: http://markus-jakobsson.com/papers/jakobsson-crypto96.pdf., Jul. 24, 1996,.

Perrig et al., "The TESLA Broadcast Authentication Protocol", CryptoBytes, vol. 5, No. 2, 2002, pp. 2-13, doi: 10.1007/978-1-4615-0229-6_3.

* cited by examiner

1700

1900

Start

Generate a pre-image
1910

Apply a one-way function to the pre-image to generate an output
1920

Generate a commit transaction corresponding to the output
1930

Submit the commit transaction to a blockchain
1940

Is the commit transaction accepted?
1950

Y

N

Generate a reveal transaction
1960

Submit the reveal transaction to the blockchain
1970

End

2300

```
// Artema Labs pragma solidity ^0.8.20;

contract Hydro {

// records the balance of the tokens against each output address
    mapping(uint256 => uint256) private _balances;

// structure for commit transactions
    struct Commit {
      uint256 sender;
      uint256 recipient;
      uint256 amount;
      uint256 change;
      bool actedOn;
    }

// records a commit transaction awaiting a reveal
    // we map from a hash of the commit parameters to
    // the commit structure to ensure that the reveal
    // is specific
    mapping(uint256 txId => Commit) private _commits;

// this mapping tracks which addresses have been used
    // to avoid reusing them
    mapping(uint256 addr => bool) private _revealed;

// usual ERC20 stuff
    uint256 private _totalSupply;
    string private _name;
    string private _symbol;

// admin can rescue saved assets
    address private _admin;
    uint256 private _rescue = 0x01;

// event to get transaction id of commit transaction
    event returnedTxId(uint256 indexed txId);

// initialize the contract with all tokens going to deployer
    constructor(
        string memory name_,
        string memory symbol_,
        uint256 totalSupply_,
        uint256 initialOwner_
    ) {
        _name = name_;
        _symbol = symbol_;
        _totalSupply = totalSupply_;
        _balances[initialOwner_] = _totalSupply;
        _admin = msg.sender;
    }
```

*FIG. 25A*

```
// standard ERC20 function
function symbol() public view virtual returns (string memory) {
    return _symbol;
}

// standard ERC20 function
function name() public view virtual returns (string memory) {
    return _name;
}

// standard ERC20 function
function decimals() public view virtual returns (uint8) {
    return 18;
}

// standard ERC20 function
function totalSupply() public view virtual returns (uint256) {
    return _totalSupply;
}

// standard ERC20 function
function balanceOf(uint256 account) public view virtual returns (uint256) {
    return _balances[account];
}

// submit a commit transaction to the contract
function transferCommit(
    uint256 from,
    uint256 to,
    uint256 change,
    uint256 amount
) external {
    uint256 txId = uint256(keccak256(abi.encode(from, to, change, amount)));
    require(_revealed[from] == false, "Sender address already revealed");
    require(_revealed[to] == false, "Recipient address already revealed");
    require(_revealed[change] == false, "Change address already revealed");
    _commits[txId].sender = from;
    _commits[txId].recipient = to;
    _commits[txId].amount = amount;
    _commits[txId].change = change;
    emit returnedTxId(txId);
}
```

*FIG. 25B*

```
// reveal a committed transaction and execute the transfer after validation
function transferReveal(uint256 preimage, uint256 txId) external {
    uint256 hashOutput = uint256(keccak256(abi.encode(preimage)));
    uint amount = _commits[txId].amount;
    require(_commits[txId].actedOn == false, "Transaction already acted on");
    require(_commits[txId].sender == hashOutput, "Preimage does not hash to sender");
    require(_revealed[hashOutput] == false, "Sender already used");
    // at this point we know the reveal is authorized, and it has not been done yet
    if (amount > _balances[hashOutput]) {
        // not enough tokens to cover commit transfer so cancel by setting
        // transfer amount to 0
        amount = 0;
    }
    if (_revealed[_commits[txId].recipient] == true) {
        // recipient address already used, so ensure a transfer of all funds
        // to the change address
        amount = 0;
    }
    // if the change address has been previous revealed, we move the assets to the rescue address
    if (_revealed[_commits[txId].change] == true) {
        _balances[_rescue] += _balances[hashOutput] - amount;
    } else {
        // otherwise the remainder of the senders assets goes to the change
        _balances[_commits[txId].change] += _balances[hashOutput] - amount;
    }
    // recipient gets the amount
    _balances[_commits[txId].recipient] += amount;
    // set revealed sender address balance to zero
    _balances[hashOutput] = 0;
    // make revealed sender address unusable
    _revealed[hashOutput]  = true;
    // mark transaction as acted on
    _commits[txId].actedOn = true;
}

// allows assets rescued from a bad change address to be recovered
function adminRescue(uint256 to) external {
    require(msg.sender == _admin, "Restricted function");
    _balances[to] += _balances[_rescue];
    _balances[_rescue] = 0;

}

// included to verify that test case hashing and contract hashing match
function testKeccak(uint256 preimage) public view returns (uint256) {
    return uint256(keccak256(abi.encode(preimage)));
}

SYSTEMS AND METHODS FOR PERFORMING SECURE TRANSACTIONS ON BLOCKCHAIN

CROSS-REFERENCE TO RELATED APPLICATIONS

The current application claims the benefit of and priority under 35 U.S.C. § 119(e) to U.S. Provisional Patent Application No. 63/660,984, entitled "Improved Token and Resource Management," filed Jun. 17, 2024; U.S. Provisional Patent Application No. 63/671,588, entitled "KYC-Enhanced Blockchain Technology with Applications to Advertising and Security," filed Jul. 15, 2024; U.S. Provisional Patent Application No. 63/683,175, entitled "System, Method and Apparatus for Publicly Verifiable Asset Linkage," filed Aug. 14, 2024; and U.S. Provisional Patent Application No. 63/687,205, entitled "Secure and Efficient Quantum-Resistant Digital Signing Method for Blockchains," filed Aug. 26, 2024, the disclosures of which are hereby incorporated by reference in their entireties for all purposes.

FIELD OF THE INVENTION

The present invention generally relates to Web 3.0-based immutable ledgers, particularly in the context of transaction implementation.

BACKGROUND

Cryptography can be used to provide security, privacy and authenticity to transactions and can be used to create immutable ledgers such as (but not limited to) blockchains. Web 3.0 (or Web3) refers to a large-scale restructuring of the World Wide Web that includes open-source applications maintained by blockchain and operating in a way that is decentralized yet interconnected. The term contrasts Web 1.0 (the earliest version of the internet where individuals could create web pages digested by wide varieties of consumers) and Web 2.0 (which expanded capabilities towards user-generated content and user-participation).

Blockchain technology is implemented on Web 3.0 in a manner which instantiates digital assets with clearly defined ownership. The blockchain functions as a ledger recording ownership that restricts the movement of digital assets from one party to another based on identity and access management encoded in the blockchain. As such, blockchains (and software running on those blockchains in the form of smart contracts) can address and process digital assets as held commodities. Blockchain and smart contracts thereby facilitate transactions between parties, with the blockchain itself acting as a distributed ledger providing a public record.

Under web3 systems, digital assets in the form of tokens (instantiated through smart contracts) are registered against one or more owners on blockchains. Such tokens may be registered on the blockchains against blockchain addresses by relying on asymmetric key cryptography, thus indicating ownership of the digital assets by entities with private keys.

In a traditional blockchain-based transaction, a transferor receives a public key from a transferee and generates a digital signature on a message that includes the received public key. This enables the holder of the associated private key, namely the transferee, to use the generated digital signature and the private key associated with the signed public key to make additional transferors according to the same technique as the transferor used.

SUMMARY OF THE INVENTION

Systems and methods for securing transactions in accordance with various embodiments of the invention are illustrated. One embodiment includes a method for confirming token ownership rights. The method generates, using a processor, a pre-image value, wherein the pre-image value is generated using a random number generator. The method generates, using the processor, an action request, wherein the action request corresponds to an action performed for a set of at least one particular cryptographic token. The method derives, using the processor, a commit output based, at least in part, on the pre-image value. The method generates, using the processor, a commit request, wherein the commit request obfuscates the action request based on the commit output. The method submits, using the processor, the commit request to a particular immutable ledger. The method receives a confirmation when the commit request is approved by the particular immutable ledger. When a reveal request referencing the commit output is published, the method receives, based on the reveal request, a confirmation of at least one of: the reveal request being published, that the reveal request comprises a reference to the commit output, or that the action request has been approved.

In a further embodiment, the action request comprises a transfer request, transferring the set of at least one particular cryptographic token to a receiving address. Further, the particular immutable ledger is a blockchain.

In a still further embodiment, the reveal request is submitted to the particular immutable ledger by the receiving address.

In another embodiment, deriving the commit output comprises applying a one-way function to the pre-image value.

In a further embodiment, the one-way function is a cryptographic hash function.

In a still further embodiment, the cryptographic hash function hashes the pre-image value with a message comprising at least one of: a purpose value; a token type value, where the token type value numerically identifies a token type for the set of at least one particular cryptographic token; or an address value, where the address value corresponds to a blockchain address.

In another further embodiment, the confirmation that the reveal request comprises the reference to the commit output depends on whether applying the one-way function to the commit output referenced in the reveal request produces the same result as applying the one-way function to the commit output referenced in the commit request.

In another embodiment, the reveal request is submitted to a second immutable ledger. The method and a node, monitoring both the particular immutable ledger and the second immutable ledger, determines whether the reveal request comprises the reference to the commit output.

In a further embodiment the action request corresponding to the commit request is approved by the second immutable ledger.

In another embodiment, the commit request corresponds to at least one additional request for a set of at least one additional cryptographic token.

One embodiment includes a non-transitory computer-readable medium comprising instructions that, when executed, are configured to cause a processor to perform a process for confirming token ownership rights. The process generates, using a processor, a pre-image value, wherein the pre-image value is generated using a random number generator. The process generates an action request, wherein the action request corresponds to an action performed for a set of at least one particular cryptographic token. The process derives a commit output based, at least in part, on the pre-image value. The process generates a commit request, wherein the commit request obfuscates the action request based on the commit output. The process submits the commit request to a particular immutable ledger. The process receives a confirmation when the commit request is approved by the particular immutable ledger. When a reveal request referencing the commit output is published, the process receives, based on the reveal request, a confirmation of at least one of: the reveal request being published, that the reveal request comprises a reference to the commit output, or that the action request has been approved.

In a further embodiment, the action request comprises a transfer request, transferring the set of at least one particular cryptographic token to a receiving address. Further, the particular immutable ledger is a blockchain.

In a still further embodiment, the reveal request is submitted to the particular immutable ledger by the receiving address.

In another embodiment, deriving the commit output comprises applying a one-way function to the pre-image value.

In a further embodiment, the one-way function is a cryptographic hash function.

In a still further embodiment, the cryptographic hash function hashes the pre-image value with a message comprising at least one of: a purpose value; a token type value, where the token type value numerically identifies a token type for the set of at least one particular cryptographic token; or an address value, where the address value corresponds to a blockchain address.

In another further embodiment, the confirmation that the reveal request comprises the reference to the commit output depends on whether applying the one-way function to the commit output referenced in the reveal request produces the same result as applying the one-way function to the commit output referenced in the commit request.

In another embodiment, the reveal request is submitted to a second immutable ledger. The process and a node, monitoring both the particular immutable ledger and the second immutable ledger, determines whether the reveal request comprises the reference to the commit output.

In a further embodiment the action request corresponding to the commit request is approved by the second immutable ledger.

In another embodiment, the commit request corresponds to at least one additional request for a set of at least one additional cryptographic token.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIGS. 25A-25C illustrate a textual representation, using the Solidity programming language, of systems operating in accordance with miscellaneous embodiments of the invention.

DETAILED DESCRIPTION

Figure 1:
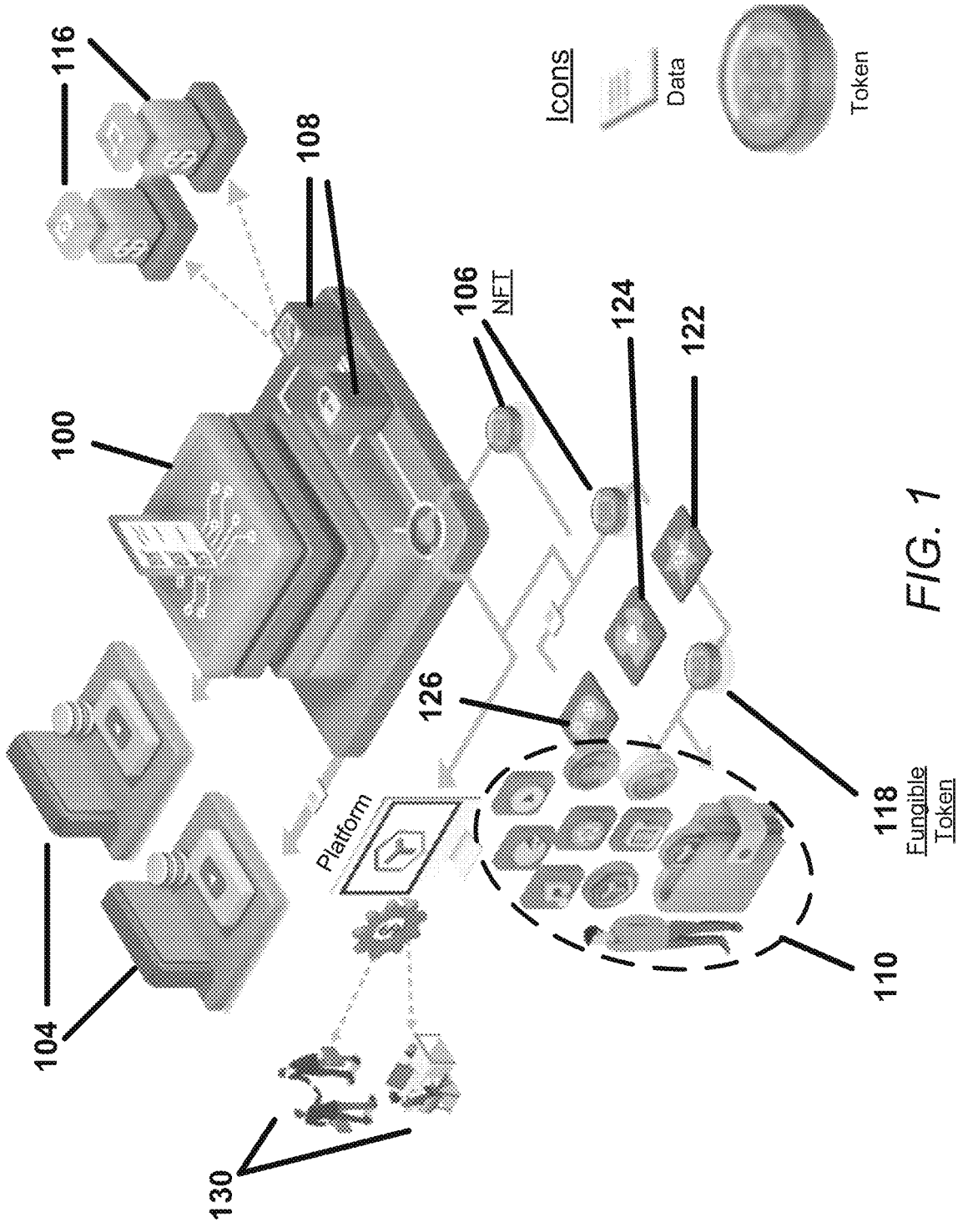
FIG. 1 is a conceptual diagram of an NFT platform in accordance with an embodiment of the invention.

Systems and methods for incorporating blockchain-directed and token-directed functionalities into non-fungible token (NFT) platforms, in accordance with many embodiments of the invention, are described herein. Such functionality may include but is not limited to quantum-computing-resistant digital signatures, publicly-verifiable links to assets, alternative approaches to ownership verifications, and policy-token associations.

In order to circumvent the dangers posed by quantum computing in brute-forcing digital signature private keys, configurations including but not limited to one-way functions and cryptographic hash functions may be utilized as an alternative to digital signatures. Systems and methods in accordance with multiple embodiments of the invention may deconstruct transactions into commit transactions that are obfuscated based on randomly-generated preimages; and reveal transactions that reference and are used to validate the former based on the same preimages. These transactions may be used to verify transactions based on transaction-specific and randomly-generated pre-images, thereby making fraudulent activity based on quantum computing much more difficult.

Additionally or alternatively, in accordance with many embodiments of the invention, supplemental blockchain functionalities may be implemented. Systems in accordance with several embodiments of the invention may be used to facilitate blockchain-based commerce by generating links between target entities and tokens representing monetary value. Additionally or alternatively, systems may be configured to incorporate Know-Your-Customer (KYC) mechanisms for purposes including but not limited to ownership verification. Blockchain-based functionality implemented in accordance with some embodiments of the invention may, additionally or alternatively, associate policies with assets that can be used to perform processes including but not limited to automated transactions.

While various applications are discussed above, blockchain-based functionalities that may be utilized within NFT platforms in accordance with various embodiments of the invention are also discussed further below.

Non-Fungible Token (NFT) Platforms

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators may issue NFTs to users within the NFT platform. NFTs may be created around a large range of real-world media content and intellectual property. Movie studios may mint digital collectibles for their movies, characters, notable scenes and/or notable objects. Record labels may mint digital collectibles for artists, bands, albums and/or songs. Similarly, official digital trading cards may be made from the likeness of celebrities, cartoon characters and/or gaming avatars.

NFTs minted using NFT platforms in accordance with various embodiments of the invention may have multifunctional programmable use cases including rewards, private access to premium content and experiences, as discounts toward the purchase of goods, among many other value-added use cases.

In many embodiments, each NFT may have a set of attributes that define its unique properties. NFTs may therefore be classified based on which attributes are emphasized. Possible classifications may address but are not limited to: NFTs as identifying entities, NFTs output by other NFTs, NFTs as content creation assets, and NFTs as evaluating entities. NFTs may be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance may allow for incremental payment and ongoing asset protection. NFT storage may be additionally self-regulated through willing participants disclosing unsatisfactory NFT management in exchange for rewards.

In many embodiments, the NFT platform may include media wallet applications that enable users to securely store NFTs and/or other tokens on their devices. Furthermore, media wallets (also referred to as "digital wallets") may enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users may download and install media wallet applications to store NFTs on the same computing devices used to consume streamed and/or downloaded content. Media wallet applications and NFTs may disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that may be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 may provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs may cause payments of residual royalties 116 when users engage in specific transactions involving NFTs (e.g., transfer of ownership of the NFT).

In a number of embodiments, users utilize media wallet applications 110 on their devices to store NFTs 106 distributed using the NFT platform 100. Users may use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As may readily be appreciated, NFTs 106 that are implemented using smart contracts 108 having interfaces that comply with open standards are not limited to being stored within media wallets and may be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 may incentivize users to grant access to media consumption data using offers including (but not limited to) offers of fungible tokens 118 and/or NFTs 106. In this way, the ability of the content creators to mint NFTs enables consumers to engage directly with the content creators and may be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 may query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users may be content creators that are vetted by an administrator of networks that may be responsible for deploying and maintaining the NFT blockchain. Once the NFTs are minted, users may obtain and conduct transactions with the NFTs. In several embodiments, the NFTs may be redeemable for items or services in the real world such as (but not limited to) admission to movie screenings, concerts, and/or merchandise.

As illustrated in FIG. 1, users may install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features but would all be able to be used to initiate the change of ownership of tokens, such as NFTs. In many embodiments, the fungible tokens may be fully converted into fiat currency and/or other cryptocurrency. In several embodiments, the fungible tokens are implemented using split blockchain models in which the fungible tokens may be issued to multiple blockchains (e.g., Ethereum). As may readily be appreciated, the fungible tokens and/or NFTs utilized within an NFT platform in accordance with various embodiments of the invention are dependent upon the requirements of a given application.

In several embodiments, the media wallet application is capable of accessing multiple blockchains by deriving accounts from each of the various immutable ledgers used within an NFT platform. For each of these blockchains, the media wallet application may automatically provide simplified views whereby fungible tokens and NFTs across multiple accounts and/or multiple blockchains may be rendered as single user profiles and/or wallets. In many embodiments, the single view may be achieved using deep indexing of the relevant blockchains and API services that may rapidly provide information to media wallet applications in response to user interactions. In certain embodiments, the accounts across the multiple blockchains may be derived using BIP32 deterministic wallet key. In other embodiments, any of a variety of techniques may be utilized by the media wallet application to access one or more immutable ledgers as appropriate to the requirements of a given application.

NFTs may be purchased by way of exchanges 130 and/or from other users 128. In addition, content creators may directly issue NFTs to the media wallets of specific users (e.g., by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and may be utilized in any NFT platform and/or with any media wallet application.

While the NFTs are shown as static in the illustrated embodiment, content creators may utilize users' ownership of NFTs to engage in additional interactions with the user. In this way, the relationship between users and particular pieces of content and/or particular content creators may evolve over time around interactions driven by NFTs. In a number of embodiments, collection of NFTs may be gamified to enable unlocking of additional NFTs. In addition, leaderboards may be established with respect to particular content and/or franchises based upon users' aggregation of NFTs. As is discussed further below, content creators may also utilize NFTs and/or fungible tokens to incentivize users to share data.

NFTs minted in accordance with several embodiments of the invention may incorporate a series of instances of digital content elements in order to represent the evolution of the digital content over time. Each one of these digital elements may have multiple numbered copies, just like a lithograph, and each such version may have a serial number associated with it, and/or digital signatures authenticating its validity. The digital signature may associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications may request authentication of the NFT directly based upon the public key of the content creator and/or indirectly based upon transaction records within the NFT blockchain. As discussed above, minted NFTs may be signed by content creators and administrators of the NFT blockchain. In addition, users may verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein may also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain may be in the form of distributed ledgers, while the blockchain may alternatively be centralized in a single entity.

Figure 2:
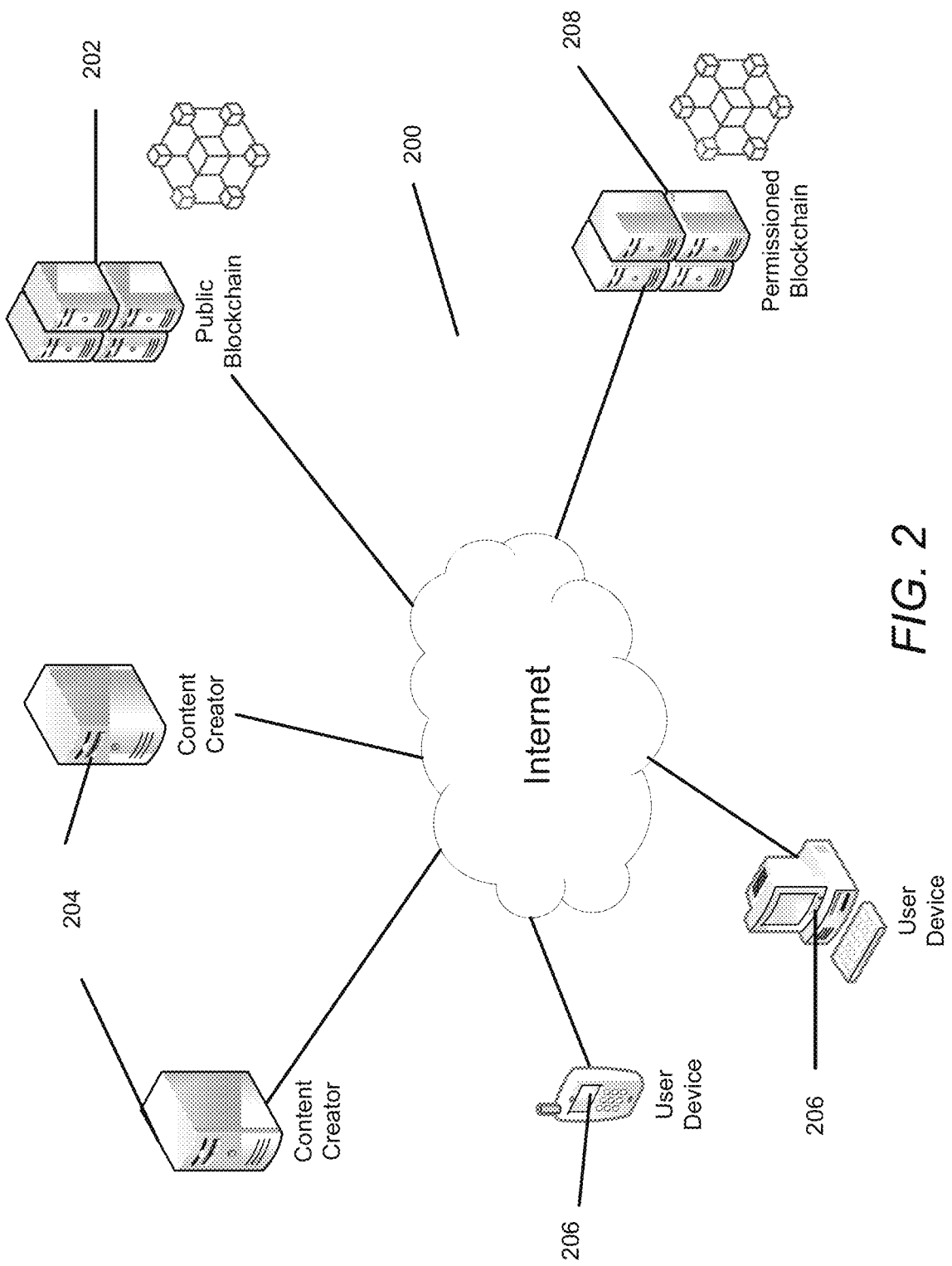
FIG. 2 is a network architecture diagram of an NFT platform in accordance with an embodiment of the invention.

An example of network architecture that may be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 may support minting of standards based NFTs that may be utilized in an interchangeable manner with NFTs minted by sources outside of the NFT platform on the public blockchain. In this way, the NFT platform 200 and the NFTs minted within the NFT platform are not part of a walled garden but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform may also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users may utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications may provide any of a variety of functionality that may be determined as appropriate to the requirements of a given application. In the illustrated embodiment, the user devices 206 are shown as mobile phones and personal computers. As may readily be appreciated user devices may be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data may be accessed by the media wallet application. In this way, users control access to entries in the permissioned blockchain 208 describing the user's NFT transaction. In several embodiments, users may authorize content creators 204 to access NFT transaction data recorded within the permissioned blockchain 208 using one of a number of appropriate mechanisms including (but not limited to) compound identities where the user is the owner of the data and the user may authorize other entities as guests that may also access the data. As may readily be appreciated, particular content creators' access to the data may be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they may make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users may utilize a media wallet application to modify permissions granted by way of the access control list. In many embodiments, the manner in which access permissions are defined enables different restrictions to be placed on particular pieces of information within a particular NFT transaction data record within the permissioned blockchain 208. As may readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists may enable users to grant permission to decrypt certain pieces of information or individual records within the permissioned blockchain. In several embodiments, the access to the data is determined by computer systems that implement permission-based data access services.

In many embodiments, the permissioned blockchain 208 may be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention may be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms may be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As may readily be appreciated, a variety of approaches may be taken to the writing of data to permissioned blockchains and the particular approach is largely determined by the requirements of particular applications. As such, computer systems in accordance with various embodiments of the invention may have the capacity to create verified NFT entries written to permissioned blockchains.

Figure 3:
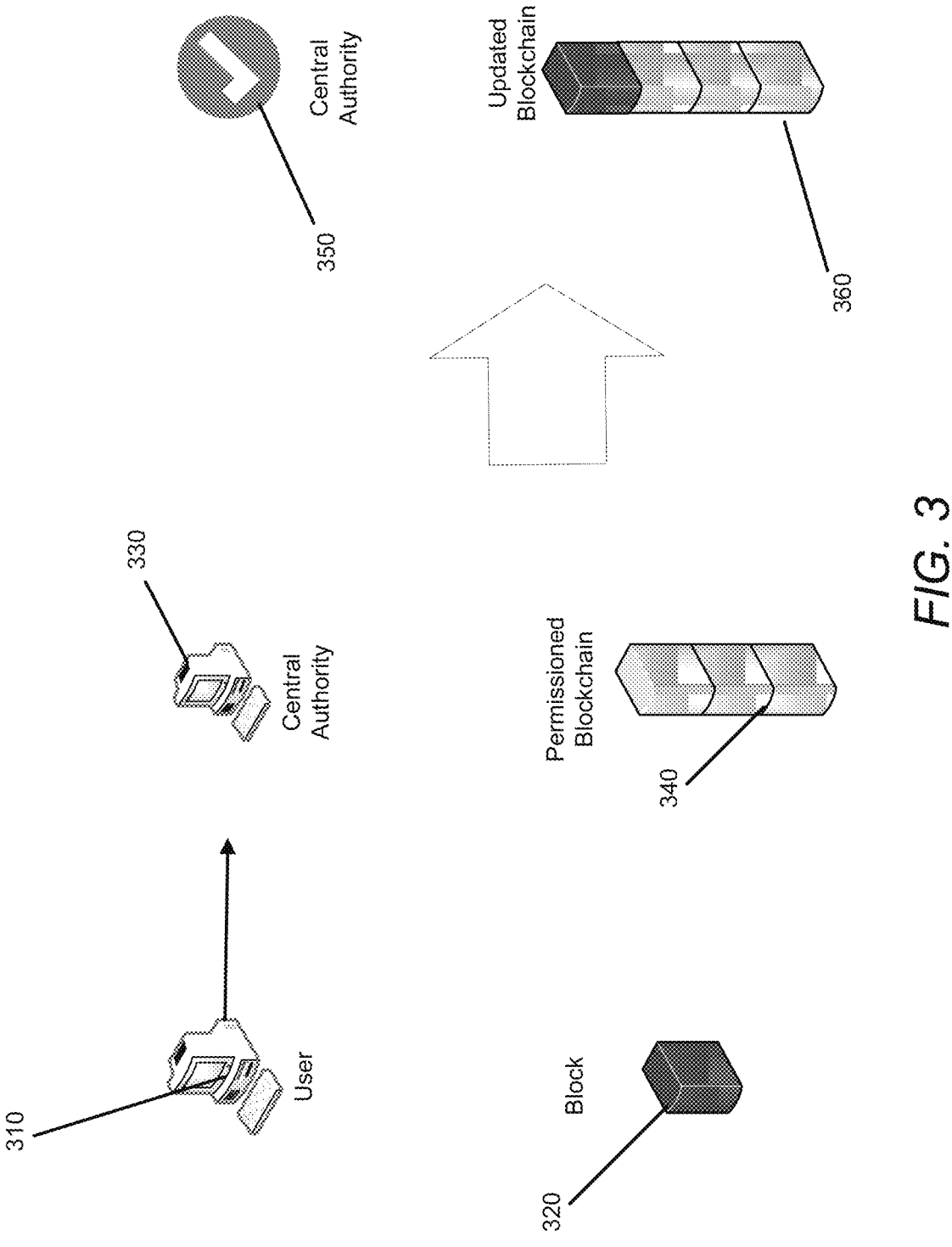
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 may typically function as closed computing systems in which each participant is well defined. In several embodiments, private blockchain networks may require invitations. In a number of embodiments, entries, or blocks 320, to private blockchains may be validated. In some embodiments, the validation may come from central authorities 330. Private blockchains may allow an organization or a consortium of organizations to efficiently exchange information and record transactions. Specifically, in a permissioned blockchain, a preapproved central authority 330 (which should be understood as potentially encompassing multiple distinct authorized authorities) may approve a change to the blockchain. In a number of embodiments, approval may come without the use of a consensus mechanism involving multiple authorities. As such, through a direct request from users 310 to the central authority 330, the determination of whether blocks 320 may be allowed access to the permissioned blockchain 340 may be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 may reflect the added block 320.

NFT platforms in accordance with many embodiments of the invention may also benefit from the anonymity and accessibility of a public blockchain. Therefore, NFT platforms in accordance with many embodiments of the invention may have the capacity to create verified NFT entries written to a permissioned blockchain.

Figure 4:
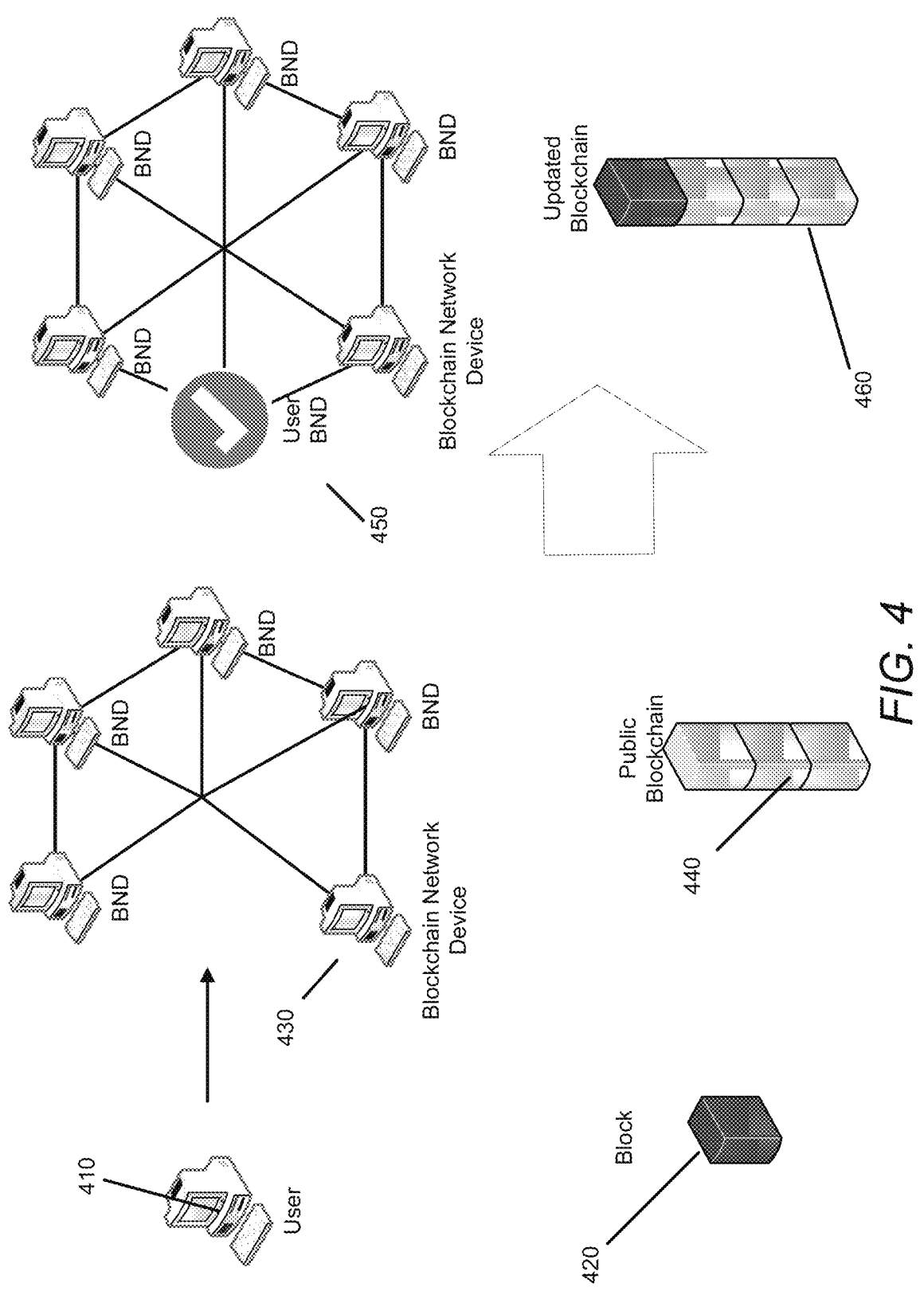
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 may directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 may not remove entries, even if anonymously made, making it immutable. In many decentralized blockchains, many blockchain network devices 430, in the decentralized system may have copies of the blockchain, allowing the ability to validate transactions. In many instances, the blockchain network device 430 may personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that may be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention may therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references may be stored by adding a ledger entry incorporating the reference enabling the entry to be timestamped. In doing so, the URL, which typically accounts for domain names, may be resolved to IP addresses. However, when only files of certain types are located on particular resources, or where small portions of individual assets are stored at different locations, users may require methods to locate assets stored on highly splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
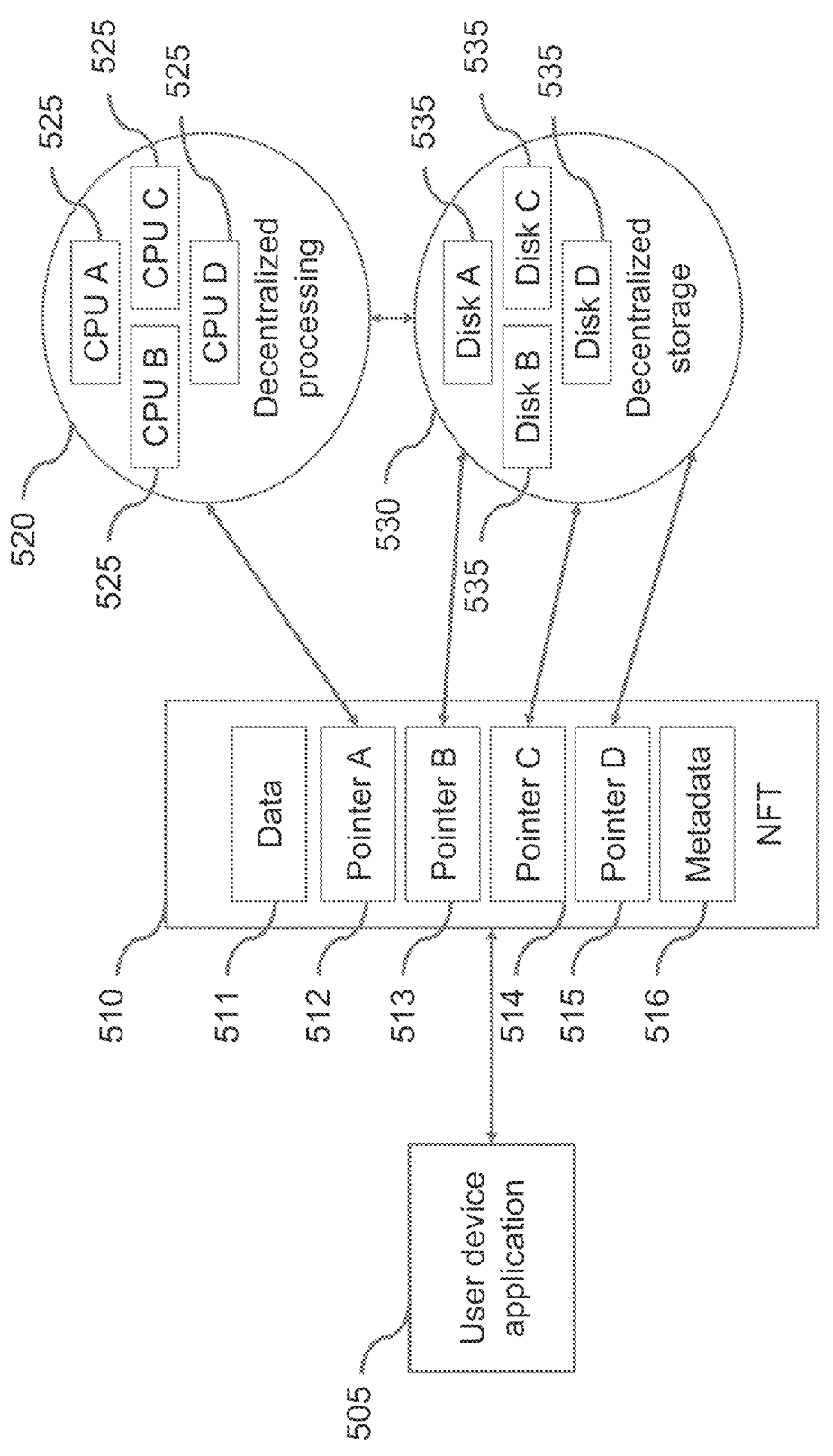
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g., URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 may direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
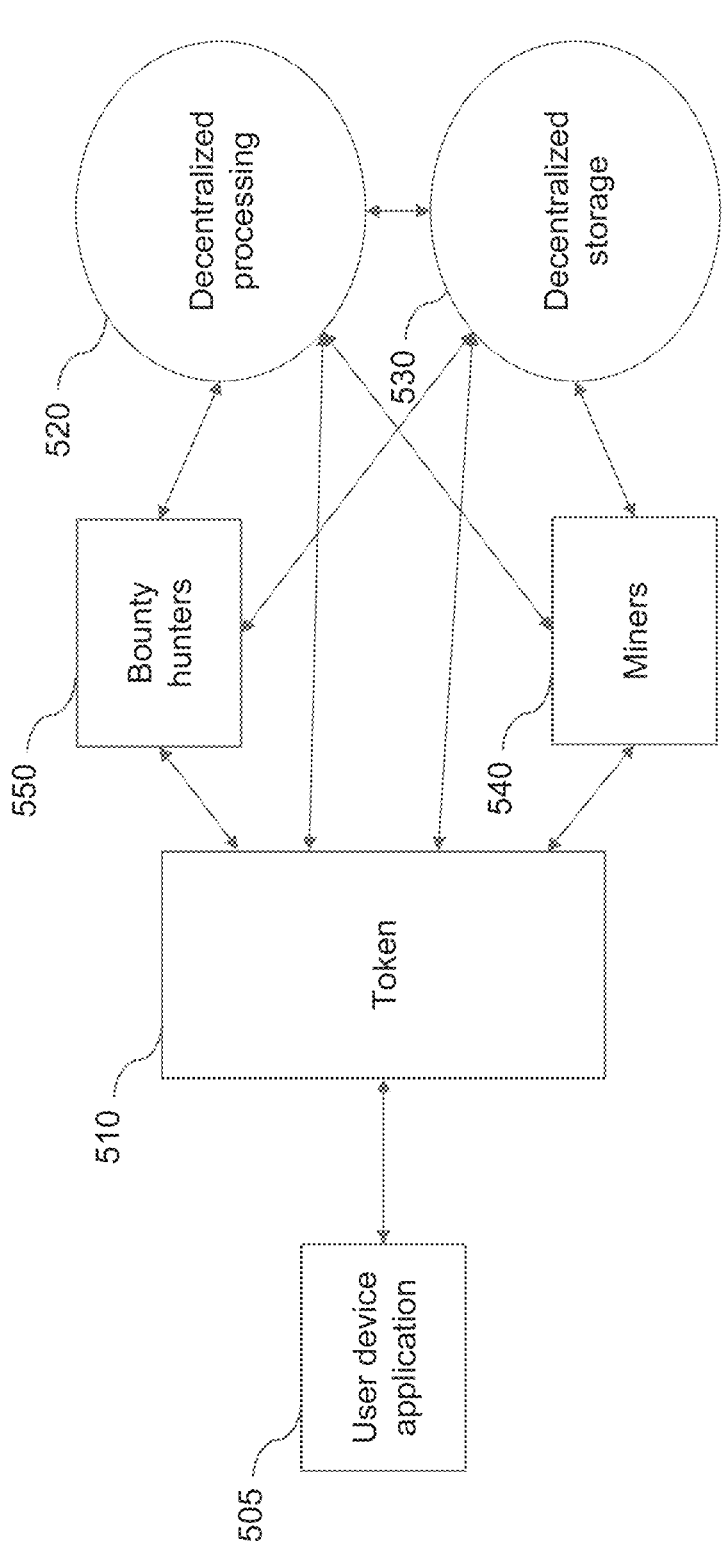

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which may point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 may have the capacity to perform all necessary minting processes or any process within the architecture that involves a consensus mechanism.

Bounty hunters 550 may also choose to verify each step of a computation, and if they find an error, submit evidence of this in return for some reward. This may have the effect of invalidating the incorrect ledger entry and potentially based on policies, all subsequent ledger entries. Such evidence may be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this may automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein may also be implemented outside the context of an NFT platform network architecture unrelated to the storage of fungible tokens and/or NFTs. A variety of components, mechanisms, and blockchain configurations that may be utilized within NFT platforms are discussed further below. Moreover, any of the blockchain configurations described herein with reference to FIGS. 3-5B (including permissioned, permissionless, and/or hybrid mechanisms) may be utilized within any of the networks implemented within the NFT platforms described above.

NFT Platform Consensus Mechanisms

NFT platforms in accordance with many embodiments of the invention may depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (POS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor may be memory rather than processing power. Specifically, Proof of Space mechanisms may perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
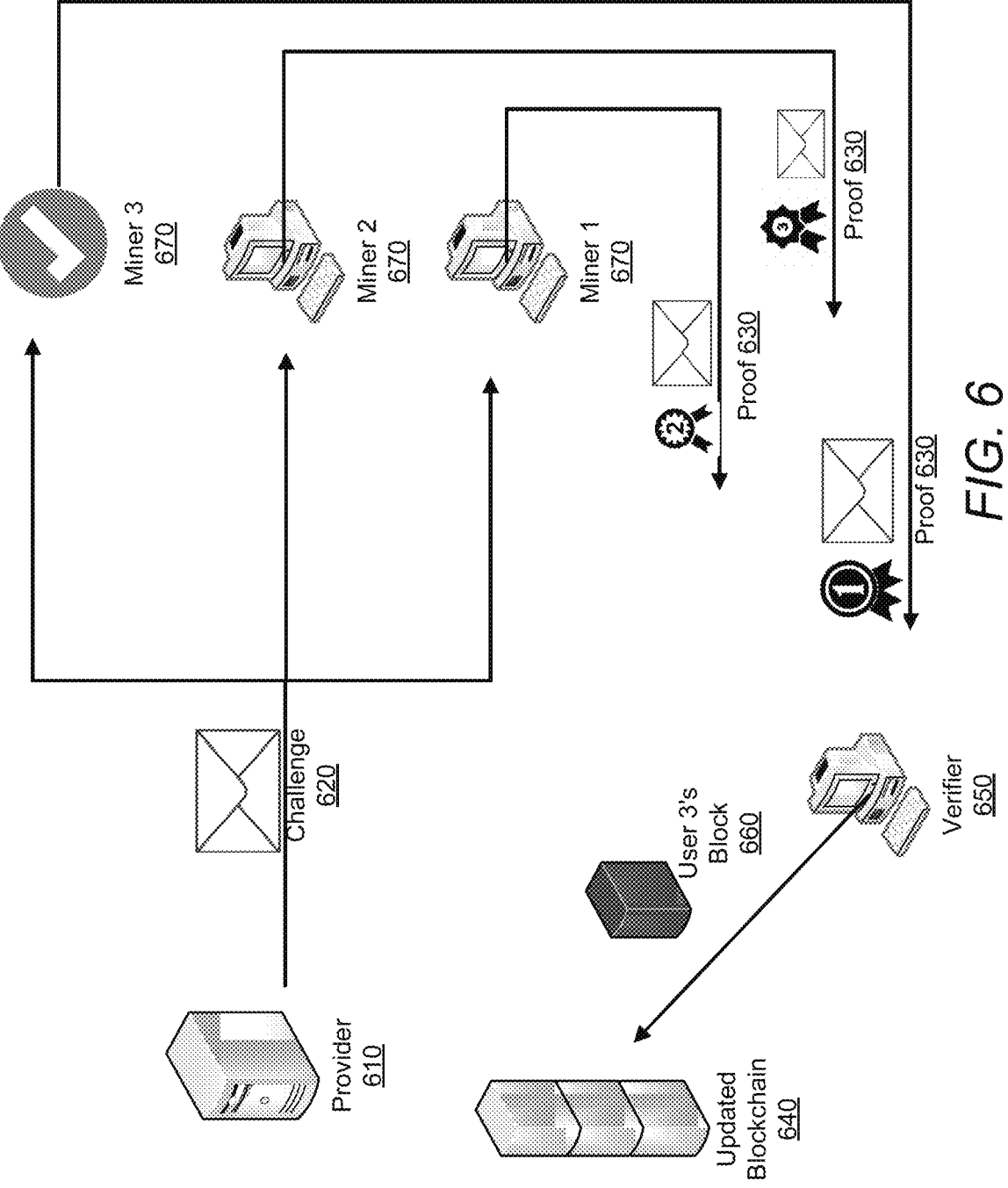
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network may verify the proof, something which typically requires much less processing power, to determine the first device that would have the right to add the winning block

650 to the blockchain 630. As such, under a Proof of Work consensus mechanism, each miner involved may have a success probability proportional to the computational effort expended.

Figure 7:
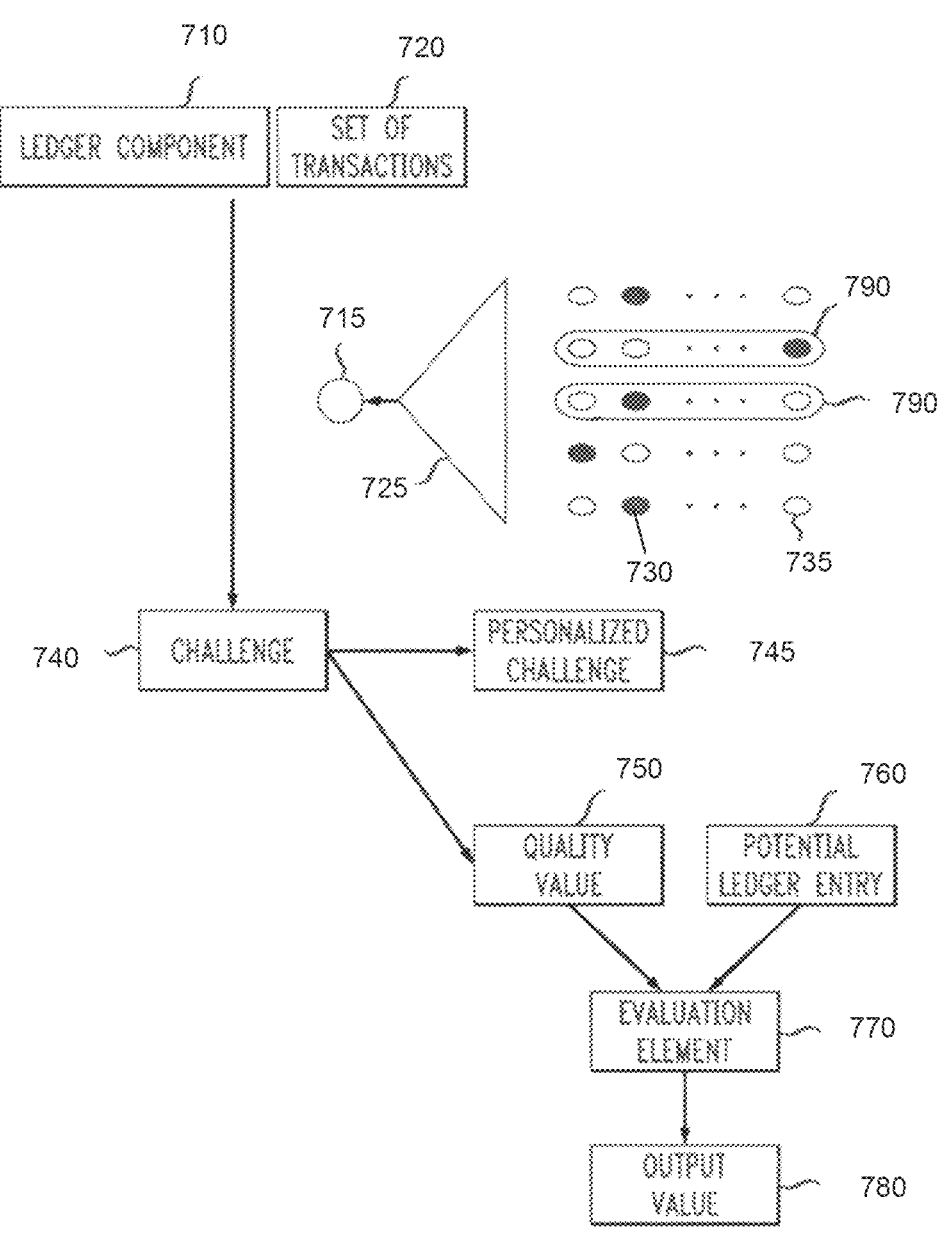
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner and may be used to compute values at a setup time. This may be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 may be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 may indicate a selection of nodes 730, denoted in FIG. 7 by filled-in circles. In the FIG. 7 example specifically, the personalized challenge corresponds to one node per row. The collection of nodes selected as a result of computing the personalized challenge 745 may correspond to a valid potential ledger entry 760. However, here a quality value 750 (also referred to herein as a qualifying function value) may also be computed from the challenge 740, or from other public information that is preferably not under the control of any one miner.

A miner may perform matching evaluations 770 to determine whether the set of selected nodes 730 matches the quality value 750. This process may take into consideration what the memory constraints of the miner are, causing the evaluation 770 to succeed with a greater frequency for larger memory configurations than for smaller memory configurations. This may simultaneously level the playing field to make the likelihood of the evaluation 770 succeeding roughly proportional to the size of the memory used to store the nodes used by the miner. In some embodiments, nonproportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 may also correspond to public keys. The miner may submit valid ledger entries, corresponding to a challenge-response pair including one of these nodes. In that case, public key values may become associated with the obtained NFT. As such, miners may use a corresponding secret/private key to sign transaction requests, such as purchases. Additionally, any type of digital signature may be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems may also be implemented in accordance with many embodiments of the invention. In many embodiments, hybrid methods may be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures may be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments may utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
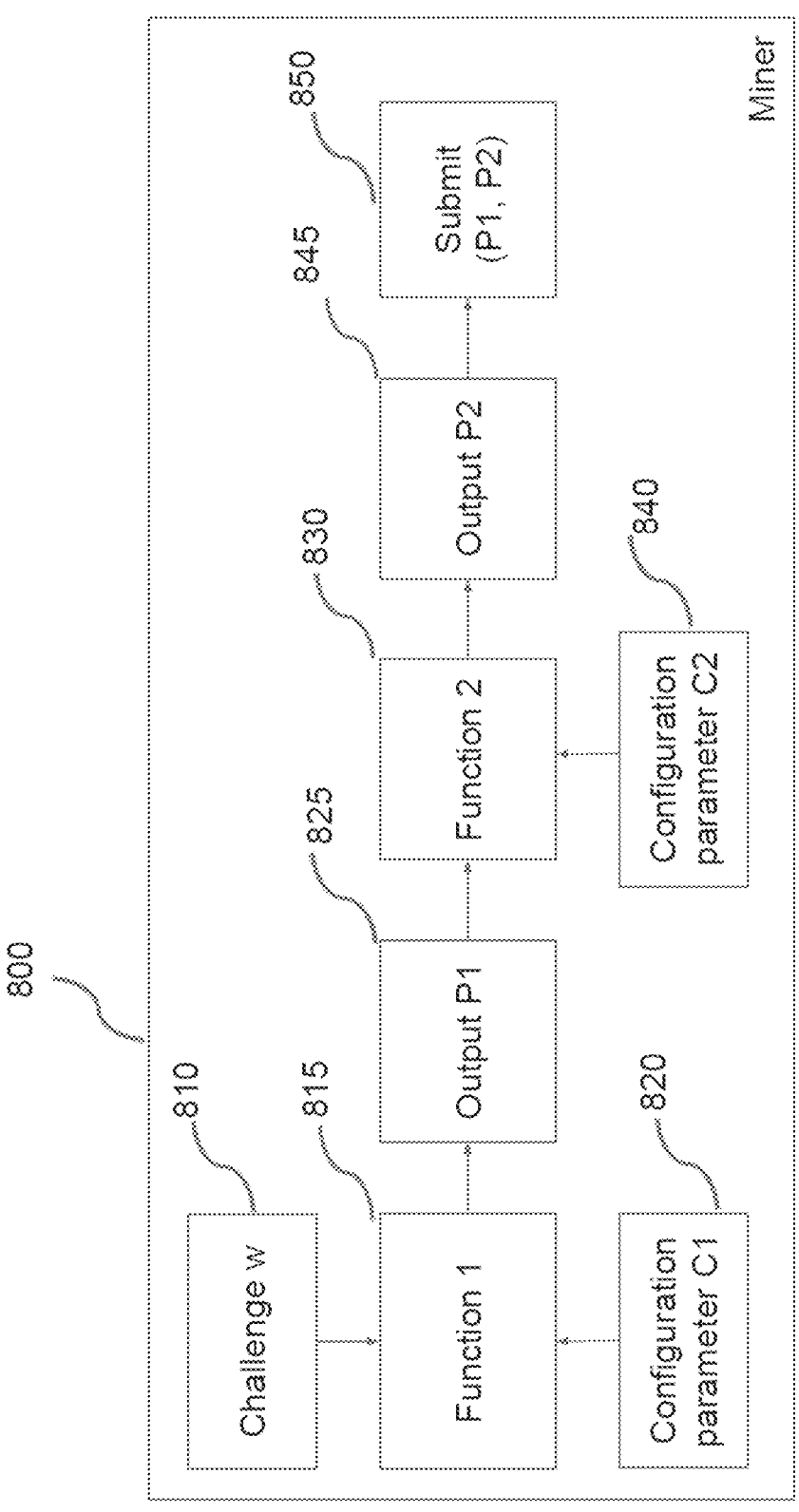
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof may be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention may constrain the search space for the mining effort. This may be done using a configuration parameter that controls the range of random or pseudo-random numbers that may be used in a proof. Upon challenge w 810 being issued to one or more miners 800, it may be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 may then submit the combination of proofs (P1, P2) 850 to a verifier, in order to validate a ledger associated with challenge w 810. In some embodiments, miner 800 may also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances exist of integrity by virtue of incorporating private/isolated processing environments.

Figure 9:
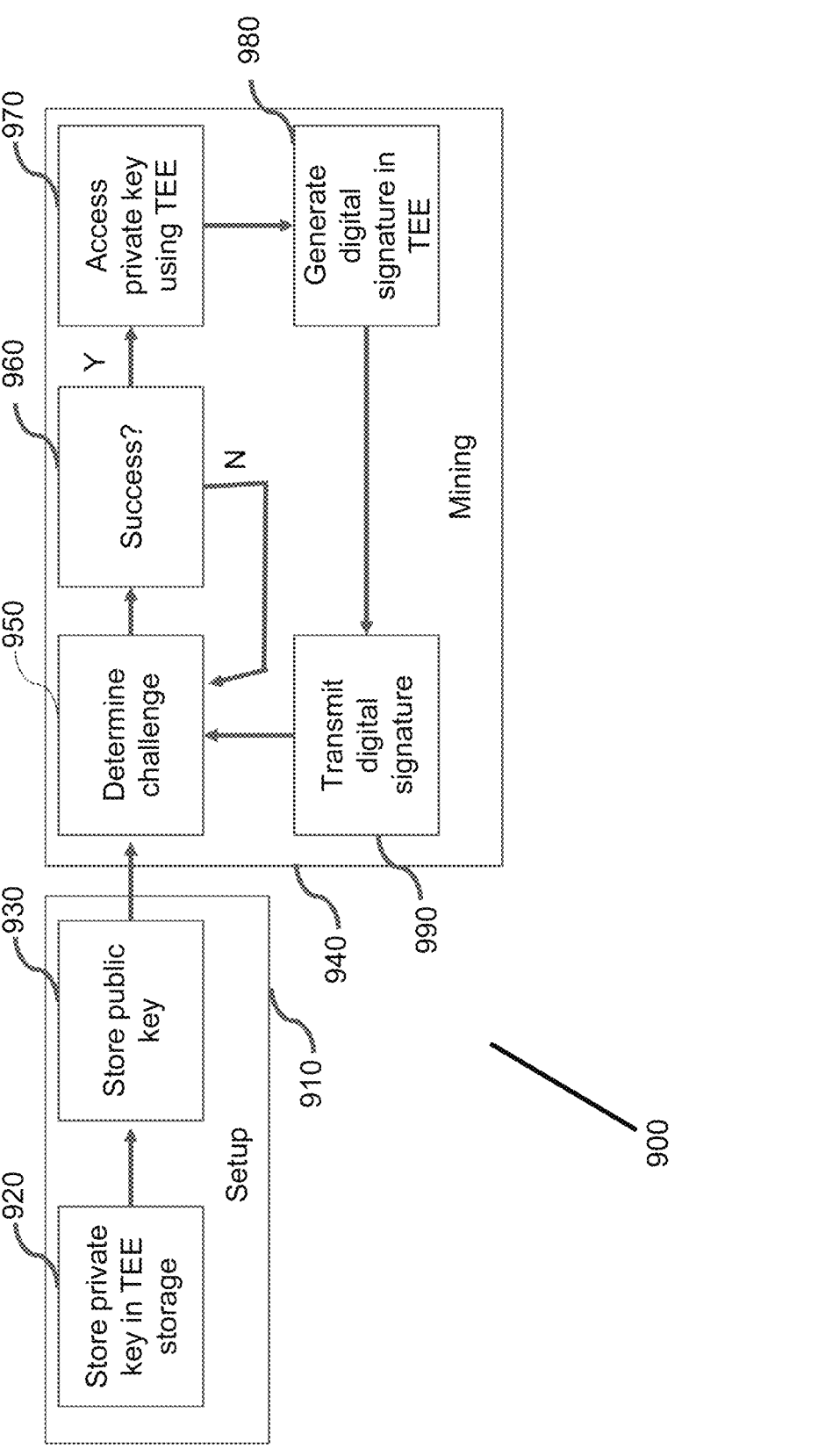
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e., storage associated with the Trusted Execution Environment). While storage may be accessible from the TEE, it may be shielded from applications running outside the TEE. Additionally, processes may store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate may be stored with the public key.

In many embodiments of the invention, mining-directed steps may also be influenced by the TEE. In the illustrated embodiment, the process 900 may determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g., the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 may return to determine (950) a new challenge. In this context, process 900 may determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing may continue on to access (970) the private key using the TEE.

When the private key is accessed, the process may generate (980) a digital signature using the TEE. The digital signature may be on a message that includes the challenge and/or which otherwise references the ledger entry being closed. Process 900 may also transmit (980) the digital signature to other participants implementing the consensus mechanism. In cases where multiple digital signatures are received and found to be valid, a tie-breaking mechanism may be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein may also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) may be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that may be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As may readily be appreciated each of these computer systems may be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
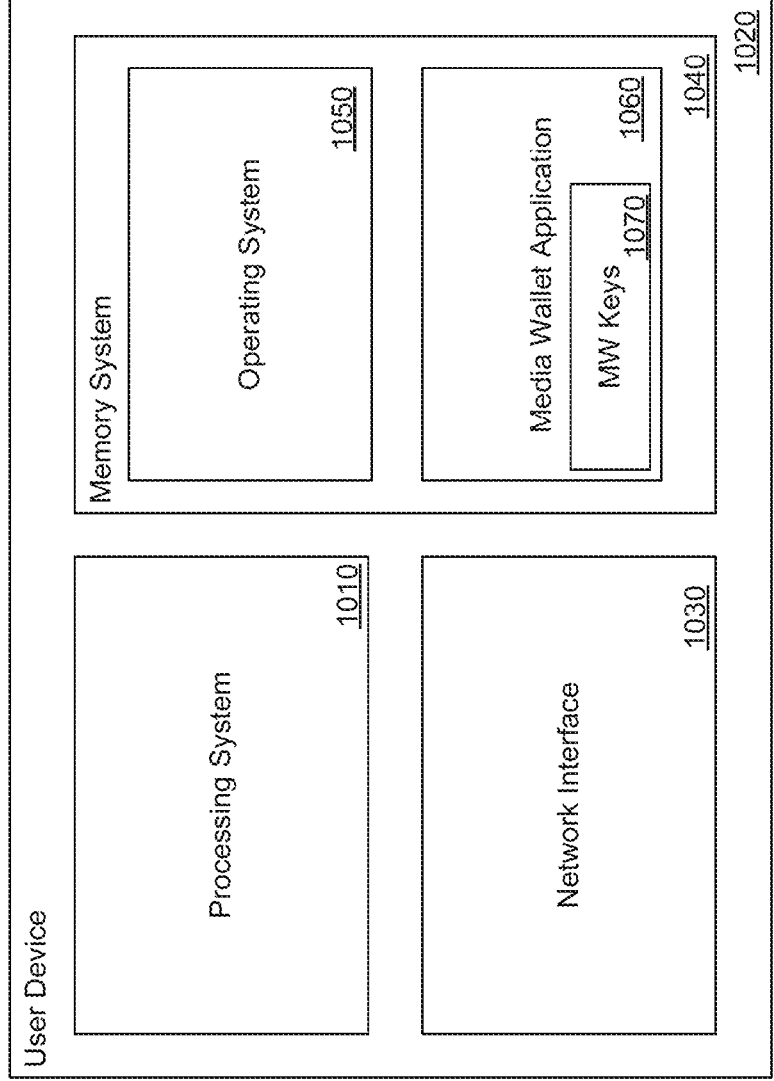
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that may include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
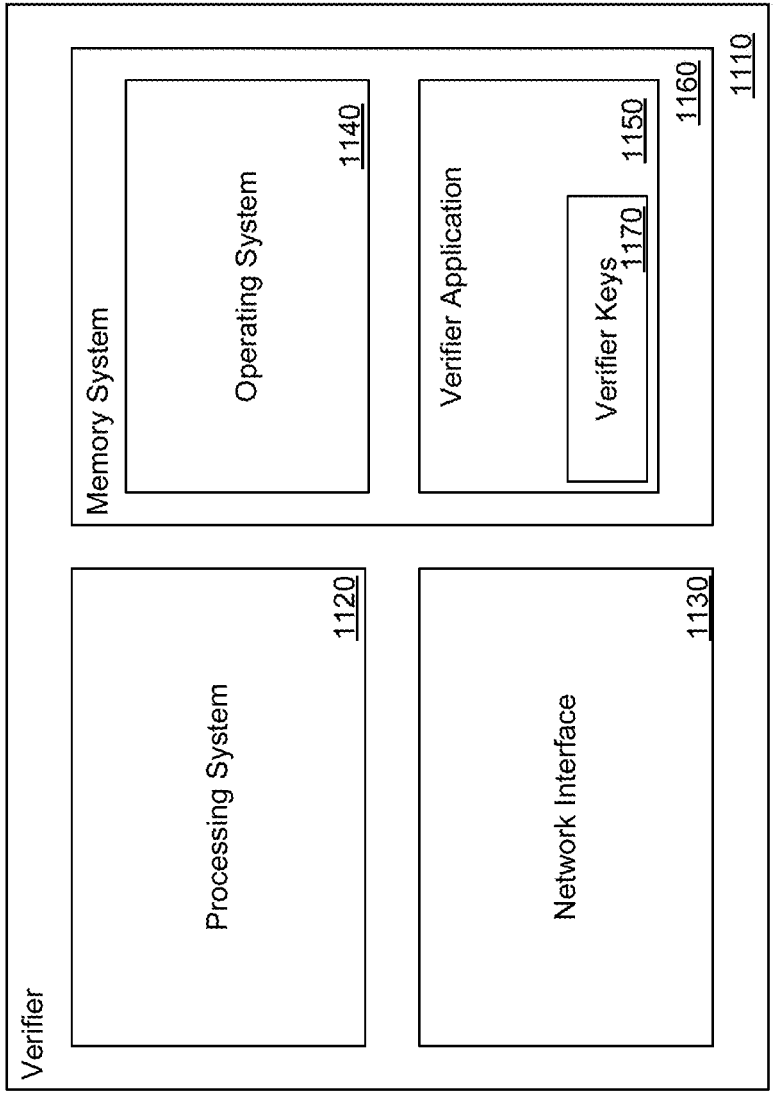

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries may be verified, the verifier application 1150 may transmit blocks to the corresponding blockchains. The verifier application 1150 may also implement some or all of the various functions described above with reference to verifiers as appropriate to the requirements of a given application in accordance with various embodiments of the invention.

Figure 12:
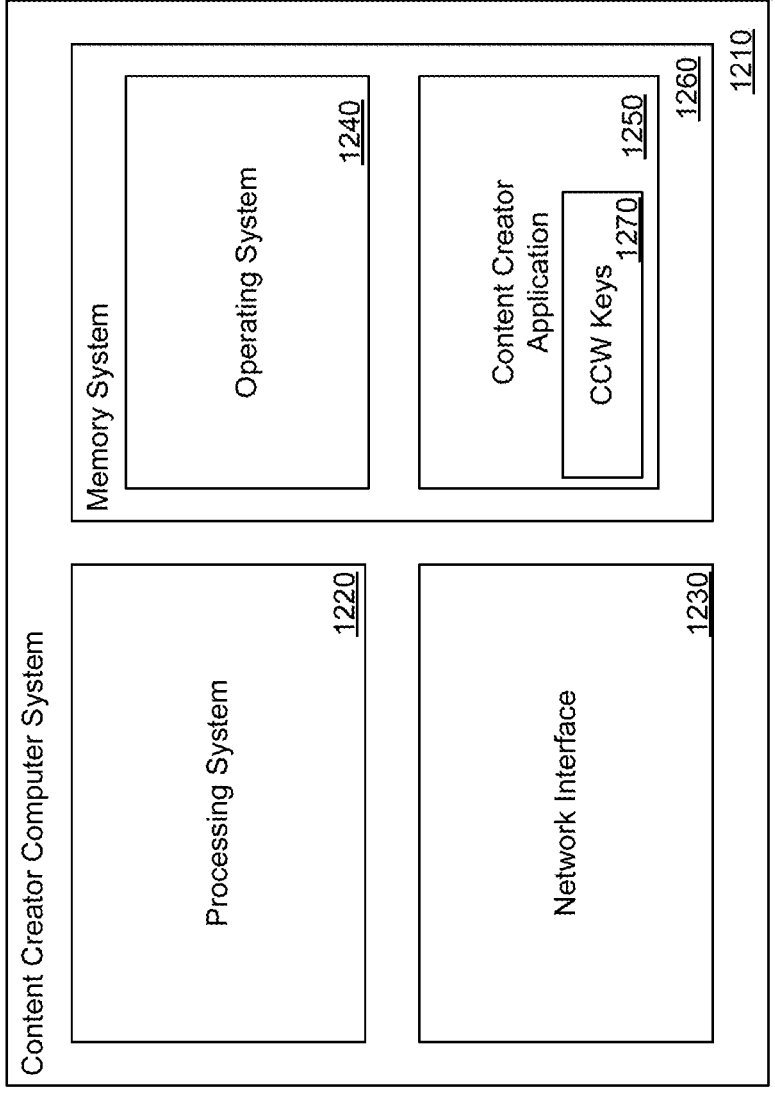

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application may include sets of content creator wallet (CCW) keys 1270 that may include a public key/private key pairs. Content creator applications may use these keys to sign NFTs minted by the content creator application. The content creator application may also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions may be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party may indicate their relationship with the wallet; whether they may read summary data associated with the content; whether they have access to peruse the content; whether they may place bids to purchase the content; whether they may borrow the content, and/or whether they are biometrically authenticated.

Figure 13:
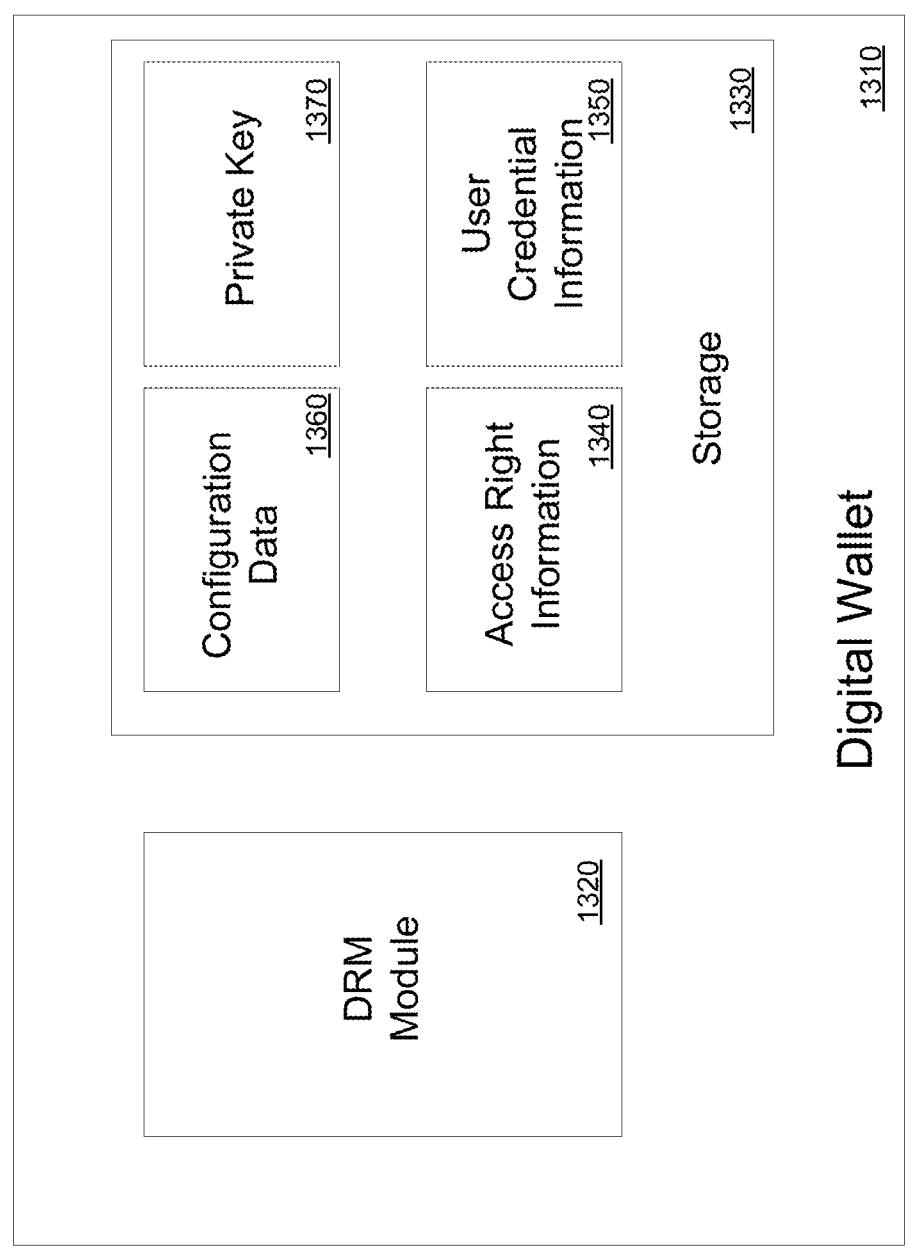
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that may be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
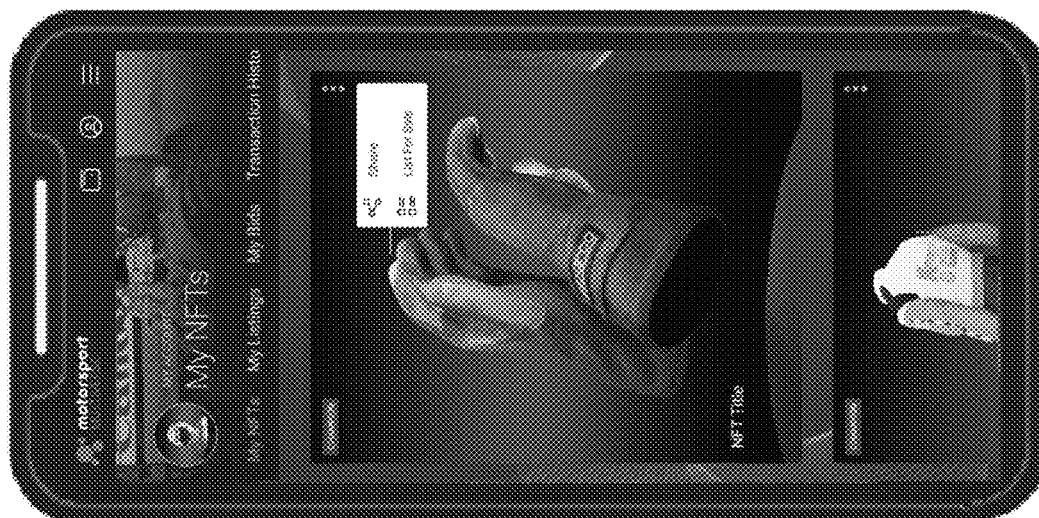
FIGS. 14A-14C depicts user interfaces of various media wallet applications in accordance with a number of embodiments of the invention.
Figure 14A:
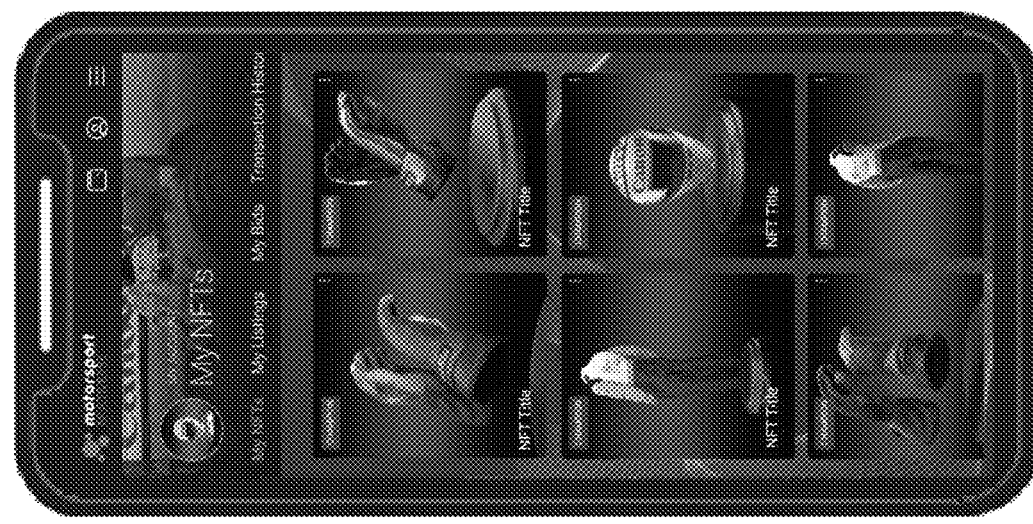
Figure 14C:

Operation of media wallet applications implemented in accordance with some embodiments of the invention is conceptually illustrated by way of the user interfaces shown in FIGS. 14A-14C. In many embodiments, media wallet applications may refer to applications that are installed upon user devices such as (but not limited to) mobile phones and tablet computers running the IOS, Android and/or similar operating systems. Launching media wallet applications may provide a number of user interface contexts. In many embodiments, transitions between these user interface contexts may be initiated in response to gestures including (but not limited to) swipe gestures received via a touch user interface. As may readily be appreciated, the specific manner in which user interfaces operate through media wallet applications is largely dependent upon the user input capabilities of the underlying user device. In several embodiments, a first user interface context is a dashboard (see, FIGS. 14A, 14C) that may include a gallery view of NFTs owned by the user. In several embodiments, the NFT listings may be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT may be main-staged in said display with its status and relevant information shown. Users may swipe through each collectible and interacting with the user interface may launch a collectible user interface enabling greater interaction with a particular collectible in a manner that may be determined based upon the smart contract underlying the NFT.

A participant of an NFT platform may use a digital wallet to classify wallet content, including NFTs, fungible tokens, content that is not expressed as tokens such as content that has not yet been minted but for which the wallet may initiate minting, and other non-token content, including executable content, webpages, configuration data, history files and logs.

This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that may be seen by anybody, the second partition corresponds to content that may be seen by members of a first group, and/or the third partition corresponds to content that may be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility may correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet including the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may include tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items may be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users may be asked, for each automatically classified element, to confirm its placement. Before the user confirms, the element may remain in a queue that corresponds to not being visible to the outside world. When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view may correspond to the classifications described above, which indicates the actions and interactions others may perform relative to elements. Another view may correspond to a classification of content based on use, type, and/or user-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. Users may search the contents of his or her wallet by using search terms that result in potential matches.

Alternatively, the collection of content may be navigated based on the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein may also be implemented outside the context of an NFT platform network architecture unrelated to the storage of fungible tokens and/or NFTs. Moreover, any of the computer systems described herein with reference to FIGS. 10-14C may be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" may be used to refer to blockchain-based cryptographic tokens created with respect to a specific piece of rich media content and which incorporate programmatically defined digital rights management. In some embodiments of the invention, each NFT may have a unique serial number and be associated with a smart contract defining an interface that enables the NFT to be managed, owned and/or traded.

Under a rich media blockchain in accordance with many embodiments of the invention, a wide variety of NFT configurations may be implemented. Some NFTs may be referred to as anchored NFTs (or anchored tokens), used to tie some element, such as a physical entity, to an identifier. Of this classification, one sub-category may be used to tie users' real-world identities and/or identifiers to a system identifier, such as a public key. In this disclosure, this type of NFT applied to identifying users, may be called a social NFT, identity NFT, identity token, and a social token. In accordance with many embodiments of the invention, an individual's personally identifiable characteristics may be contained, maintained, and managed throughout their lifetime so as to connect new information and/or NFTs to the individual's identity. A social NFT's information may include, but are not limited to, personally identifiable characteristics such as name, place and date of birth, and/or biometrics.

An example social NFT may assign a DNA print to a newborn's identity. In accordance with a number of embodiments of the invention, this first social NFT might then be used in the assignment process of a social security number NFT from the federal government. In some embodiments, the first social NFT may then be associated with some rights and capabilities, which may be expressed in other NFTs. Additional rights and capabilities may also be directly encoded in a policy of the social security number NFT.

Figure 15:
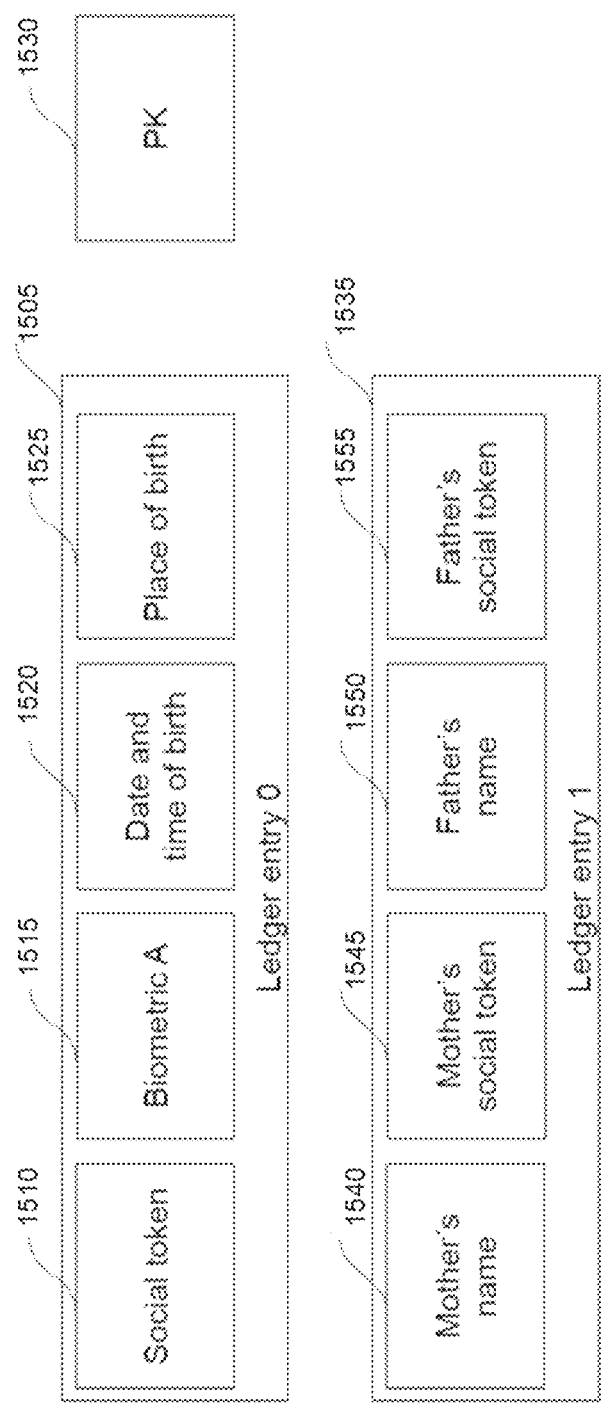
FIG. 15 illustrates an NFT ledger entry corresponding to an NFT identifier configured in accordance with an embodiment of the invention.

A social NFT may exist on a personalized branch of a centralized and/or decentralized blockchain. Ledger entries related to an individual's social NFT in accordance with several embodiments of the invention are depicted in FIG. 15. Ledger entries of this type may be used to build an immutable identity foundation whereby biometrics, birth and parental information are associated with an NFT. As such, this information may also be protected with encryption using a private key 1530. The initial entry in a ledger, "ledger entry 0" 1505, may represent a social token 1510 assignment to an individual with a biometric "A" 1515. In this embodiment, the biometric may include but is not limited to a footprint, a DNA print, and a fingerprint. The greater record may also include the individual's date and time of birth 1520 and place of birth 1525. A subsequent ledger entry 1 1535 may append parental information including but not limited to mothers' name 1540, mother's social token 1545, father's name 1550, and father's social token 1555.

In a number of embodiments, the various components that make up a social NFT may vary from situation to situation. In a number of embodiments, biometrics and/or parental information may be unavailable in a given situation and/or period of time. Other information including, but not limited to, race, gender, and governmental number assignments such as social security numbers, may be desirable to include in the ledger. In a blockchain, future NFT creation may create a life-long ledger record of an individual's public and private activities. In accordance with some embodiments, the record may be associated with information including, but not limited to, identity, purchases, health and medical records, access NFTs, family records such as future offspring, marriages, familial history, photographs, videos, tax filings, and/or patent filings. The management and/or maintenance of an individual's biometrics throughout the individual's life may be immutably connected to the first social NFT given the use of a decentralized blockchain ledger.

In some embodiments, a certifying third party may generate an NFT associated with certain rights upon the occurrence of a specific event. In one such embodiment, the DMV may be the certifying party and generate an NFT associated with the right to drive a car upon issuing a traditional driver's license. In another embodiment, the certifying third party may be a bank that verifies a person's identity papers and generates an NFT in response to a successful verification. In a third embodiment, the certifying party may be a car manufacturer, who generates an NFT and associates it with the purchase and/or lease of a car.

In many embodiments, a rule may specify what types of policies the certifying party may associate with the NFT. Additionally, a non-certified entity may also generate an NFT and assert its validity. This may require putting up some form of security. In one example, security may come in the form of a conditional payment associated with the NFT generated by the non-certified entity. In this case, the conditional payment may be exchangeable for funds if abuse may be detected by a bounty hunter and/or some alternate entity. Non-certified entities may also relate to a publicly accessible reputation record describing the non-certified entity's reputability.

Anchored NFTs may additionally be applied to automatic enforcement of programming rules in resource transfers. NFTs of this type may be referred to as promise NFTs. A promise NFT may include an agreement expressed in a machine-readable form and/or in a human-accessible form. In a number of embodiments, the machine-readable and human-readable elements may be generated one from the other. In some embodiments, an agreement in a machine-readable form may include, but is not limited to, a policy and/or an executable script. In some embodiments, an agreement in a human-readable form may include, but is not limited to, a text and/or voice-based statement of the promise.

In some embodiments, regardless of whether the machine-readable and human-readable elements are generated from each other, one may be verified based on the other. Smart contracts including both machine-readable statements and human-accessible statements may also be used outside the implementation of promise NFTs. Moreover, promise NFTs may be used outside actions taken by individual NFTs and/or NFT-owners. In some embodiments, promise NFTs may relate to general conditions, and may be used as part of a marketplace.

In one such example, horse betting may be performed through generating a first promise NFT that offers a payment of $10 if a horse does not win. Payment may occur under the condition that the first promise NFT is matched with a second promise NFT that causes a transfer of funds to a public key specified with the first promise NFT if horse X wins.

A promise NFT may be associated with actions that cause the execution of a policy and/or rule indicated by the promise NFT. In some embodiments of the invention, a promise of paying a charity may be associated with the sharing of an NFT. In this embodiment, the associated promise NFT may identify a situation that satisfies the rule associated with the promise NFT, thereby causing the transfer of funds when the condition is satisfied (as described above). One method of implementation may be embedding in and/or associating a conditional payment with the promise NFT. A conditional payment NFT may induce a contract causing the transfer of funds by performing a match. In some such methods, the match may be between the promise NFT and inputs that identify that the conditions are satisfied, where said input may take the form of another NFT. In a number of embodiments, one or more NFTs may also relate to investment opportunities.

For example, a first NFT may represent a deed to a first building, and a second NFT a deed to a second building. Moreover, the deed represented by the first NFT may indicate that a first party owns the first property. The deed represented by the second NFT may indicate that a second party owns the second property. A third NFT may represent one or more valuations of the first building. The third NFT may in turn be associated with a fourth NFT that may represent credentials of a party performing such a valuation. A fifth NFT may represent one or more valuations of the second building. A sixth may represent the credentials of one of the parties performing a valuation. The fourth and sixth NFTs may be associated with one or more insurance policies, asserting that if the parties performing the valuation are mistaken beyond a specified error tolerance, then the insurer would pay up to a specified amount.

A seventh NFT may then represent a contract that relates to the planned acquisition of the second building by the first party, from the second party, at a specified price. The seventh NFT may make the contract conditional provided a sufficient investment and/or verification by a third party. A third party may evaluate the contract of the seventh NFT, and determine whether the terms are reasonable. After the evaluation, the third party may then verify the other NFTs to ensure that the terms stated in the contract of the seventh NFT agree. If the third party determines that the contract exceeds a threshold in terms of value to risk, as assessed in the seventh NFT, then executable elements of the seventh NFT may cause transfers of funds to an escrow party specified in the contract of the sixth NFT.

Alternatively, the first party may initiate the commitment of funds, conditional on the remaining funds being raised within a specified time interval. The commitment of funds may occur through posting the commitment to a ledger. Committing funds may produce smart contracts that are conditional on other events, namely the payments needed to complete the real estate transaction. The smart contract also may have one or more additional conditions associated with it. For example, an additional condition may be the reversal of the payment if, after a specified amount of time, the other funds have not been raised. Another condition may be related to the satisfactory completion of an inspection and/or additional valuation.

NFTs may also be used to assert ownership of virtual property. Virtual property in this instance may include, but is not limited to, rights associated with an NFT, rights associated with patents, and rights associated with pending patents. In a number of embodiments, the entities involved in property ownership may be engaged in fractional ownership. In some such embodiments, two parties may wish to purchase an expensive work of digital artwork represented by an NFT. The parties may enter into smart contracts to fund and purchase valuable works. After a purchase, an additional NFT may represent each party's contribution to the purchase and equivalent fractional share of ownership.

Another type of NFTs that may relate to anchored NFTs may be called "relative NFTs." This may refer to NFTs that relate two or more NFTs to each other. Relative NFTs associated with social NFTs may include digital signatures that is verified using a public key of a specific social NFT. In some embodiments, an example of a relative NFT may be an assertion of presence in a specific location, by a person corresponding to the social NFT. This type of relative NFT may also be referred to as a location NFT and a presence NFT. Conversely, a signature verified using a public key embedded in a location NFT may be used as proof that an entity sensed by the location NFT is present. Relative NFTs are derived from other NFTs, namely those they relate to, and therefore may also be referred to as derived NFTs. An anchored NFT may tie to another NFT, which may make it both anchored and relative. An example of such may be called pseudonym NFTs.

Pseudonym NFTs may be a kind of relative NFT acting as a pseudonym identifier associated with a given social NFT. In some embodiments, pseudonym NFTs may, after a limited time and/or a limited number of transactions, be replaced by a newly derived NFTs expressing new pseudonym identifiers. This may disassociate users from a series of recorded events, each one of which may be associated with different pseudonym identifiers. A pseudonym NFT may include an identifier that is accessible to biometric verification NFTs. Biometric verification NFTs may be associated with a TEE and/or DRM which is associated with one or more biometric sensors. Pseudonym NFTs may be output by social NFTs and/or pseudonym NFTs.

Inheritance NFTs may be another form of relative NFTs, that transfers rights associated with a first NFT to a second NFT. For example, computers, represented by an anchored NFT that is related to a physical entity (the hardware), may have access rights to WiFi networks. When computers are replaced with newer models, users may want to maintain all old relationships, for the new computer. For example, users may want to retain WiFi hotspots. For this to be facilitated, a new computer may be represented by an inheritance NFT, inheriting rights from the anchored NFT related to the old computer. An inheritance NFT may acquire some or all pre-existing rights associated with the NFT of the old computer, and associate those with the NFT associated with the new computer.

More generally, multiple inheritance NFTs may be used to selectively transfer rights associated with one NFT to one or more NFTs, where such NFTs may correspond to users, devices, and/or other entities, when such assignments of rights are applicable. Inheritance NFTs may also be used to transfer property. One way to implement the transfer of property may be to create digital signatures using private keys. These private keys may be associated with NFTs associated with the rights. In accordance with a number of embodiments, transfer information may include the assignment of included rights, under what conditions the transfer may happen, and to what NFT(s) the transfer may happen. In this transfer, the assigned NFTs may be represented by identities unique to these, such as public keys. The digital signature and message may then be in the form of an inheritance NFT, or part of an inheritance NFT. As rights are assigned, they may be transferred away from previous owners to new owners through respective NFTs. Access to financial resources is one such example.

However, sometimes rights may be assigned to new parties without taking the same rights away from the party (i.e., NFT) from which the rights come. One example of this may be the right to listen to a song, when a license to the song is sold by the artist to consumers. However, if the seller sells exclusive rights, this causes the seller not to have the rights anymore.

In accordance with many embodiments of the invention, multiple alternative NFT configurations may be implemented. One classification of NFT may be an employee NFT or employee token. Employee NFTs may be used by entities including, but not limited to, business employees, students, and organization members. Employee NFTs may operate in a manner analogous to key card photo identifications. In a number of embodiments, employee NFTs may reference information including, but not limited to, company information, employee identity information and/or individual identity NFTs.

Additionally, employee NFTs may include associated access NFT information including but not limited to, what portions of a building employees may access, and what computer system employees may utilize. In several embodiments, employee NFTs may incorporate their owner's biometrics, such as a face image. In a number of embodiments, employee NFTs may operate as a form of promise NFT. In some embodiments, employee NFT may include policies or rules of employing organization. In a number of embodiments, the employee NFT may reference a collection of other NFTs.

Another type of NFT may be referred to as the promotional NFT or promotional token. Promotional NFTs may be used to provide verification that promoters provide promotion winners with promised goods. In some embodiments, promotional NFTs may operate through decentralized applications for which access restricted to those using an identity NFT. The use of a smart contract with a promotional NFT may be used to allow for a verifiable release of winnings. These winnings may include, but are not limited to, cryptocurrency, money, and gift card NFTs useful to purchase specified goods. Smart contracts used alongside promotional NFTs may be constructed for winners selected through random number generation.

Another type of NFT may be called the script NFT or script token. Script tokens may incorporate script elements including, but not limited to, story scripts, plotlines, scene details, image elements, avatar models, sound profiles, and voice data for avatars. Script tokens may also utilize rules and policies that describe how script elements are combined. Script tokens may also include rightsholder information, including but not limited to, licensing and copyright information. Executable elements of script tokens may include instructions for how to process inputs; how to configure other elements associated with the script tokens; and how to process information from other tokens used in combination with script tokens.

Script tokens may be applied to generate presentations of information. In accordance with some embodiments, these presentations may be developed on devices including but not limited to traditional computers, mobile computers, and virtual reality display devices. Script tokens may be used to provide the content for game avatars, digital assistant avatars, and/or instructor avatars. Script tokens may include audio-visual information describing how input text is presented, along with the input text that provides the material to be presented. It may also include what may be thought of as the personality of the avatar, including how the avatar may react to various types of input from an associated user.

In some embodiments, script NFTs may be applied to govern behavior within an organization. For example, this may be done through digital signatures asserting the provenance of the scripts. Script NFTs may also, in full and/or in part, be generated by freelancers. For example, a text script related to a movie, an interactive experience, a tutorial, and/or other material, may be created by an individual content creator. This information may then be combined with a voice model or avatar model created by an established content producer. The information may then be combined with a background created by additional parties. Various content producers may generate parts of the content, allowing for large-scale content collaboration.

Features of other NFTs may be incorporated in a new NFT using techniques related to inheritance NFTs, and/or by making references to other NFTs. As script NFTs may consist of multiple elements, creators with special skills related to one particular element may generate and combine elements. This may be used to democratize not only the writing of storylines for content, but also outsourcing for content production. For each such element, an identifier establishing the origin or provenance of the element may be included. Policy elements may also be incorporated that identify the conditions under which a given script element may be used. Conditions may be related to, but are not limited to execution environments, trusts, licenses, logging, financial terms for use, and various requirements for the script NFTs. Requirements may concern, but are not limited to, what other types of elements the given element are compatible with, what is allowed to be combined with according to the terms of service, and/or local copyright laws that must be obeyed.

Evaluation units may be used with various NFT classifications to collect information on their use. Evaluation units may take a graph representing subsets of existing NFTs and make inferences from the observed graph component. From this, valuable insights into NFT value may be derived. For example, evaluation units may be used to identify NFTs whose popularity is increasing or waning. In that context, popularity may be expressed as, but not limited to, the number of derivations of the NFT that are made; the number of renderings, executions or other uses are made; and the total revenue that is generated to one or more parties based on renderings, executions or other uses.

Evaluation units may make their determination through specific windows of time and/or specific collections of end-users associated with the consumption of NFT data in the NFTs. Evaluation units may limit assessments to specific NFTs (e.g., script NFTs). This may be applied to identify NFTs that are likely to be of interest to various users. In addition, the system may use rule-based approaches to identify NFTs of importance, wherein importance may be ascribed to, but is not limited to, the origination of the NFTs, the use of the NFTs, the velocity of content creation of identified clusters or classes, the actions taken by consumers of NFT, including reuse of NFTs, the lack of reuse of NFTs, and the increased or decreased use of NFTs in selected social networks.

Evaluations may be repurposed through recommendation mechanisms for individual content consumers and/or as content originators. Another example may address the identification of potential combination opportunities, by allowing ranking based on compatibility. Accordingly, content creators such as artists, musicians and programmers may identify how to make their content more desirable to intended target groups.

The generation of evaluations may be supported by methods including, but not limited to machine learning (ML) methods, artificial intelligence (AI) methods, and/or statistical methods. Anomaly detection methods developed to identify fraud may be repurposed to identify outliers. This may be done to flag abuse risks or to improve the evaluation effort.

Multiple competing evaluation units may make competing predictions using alternative and proprietary algorithms. Thus, different evaluation units may be created to identify different types of events to different types of subscribers, monetizing their insights related to the data they access.

In a number of embodiments, evaluation units may be a form of NFTs that derive insights from massive amounts of input data. Input data may correspond, but is not limited to the graph component being analyzed. Such NFTs may be referred to as evaluation unit NFTs.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
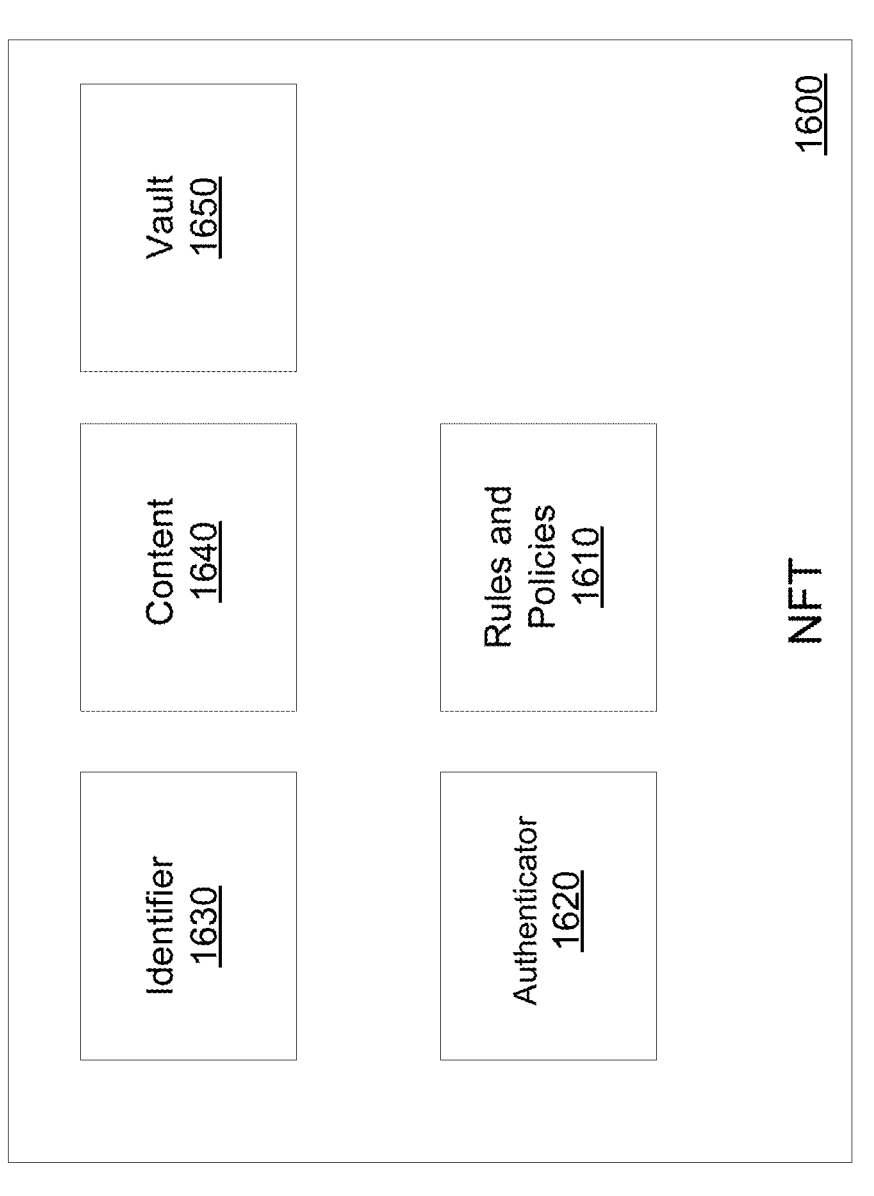
FIGS. 16A-16B illustrate an NFT arrangement relationship with corresponding physical content in accordance with an embodiment of the invention.

An example NFT which may be associated with specific content in accordance with several embodiments of the invention is illustrated in FIG. 16A. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 may incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content may correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership may be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, may be governed by conditions related to an item with which it is associated. For example, a physical painting may have a digital authenticity value that attests to the identity of the content creator associated with the physical painting.

Figure 16B:
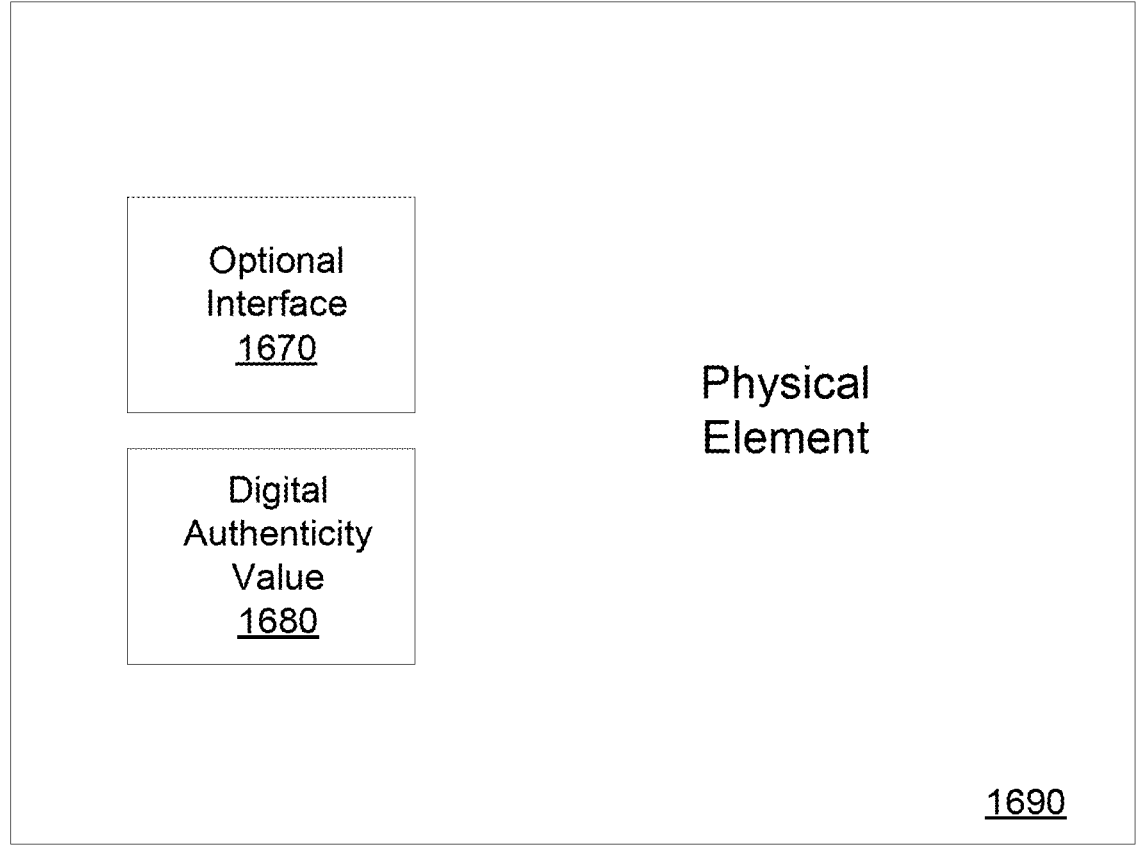

An example of a physical element 1690 corresponding to an NFT, in accordance with some embodiments of the invention is illustrated in FIG. 16B. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value). In accordance with many embodiments of the invention, a digital authenticity value (DAV) 1680 may therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 may be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item may be associated with a control that prevents forgeries to be registered as legitimate, and therefore, makes them not valid. In the context of a content creator receiving a physical element from an owner, the content creator may deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
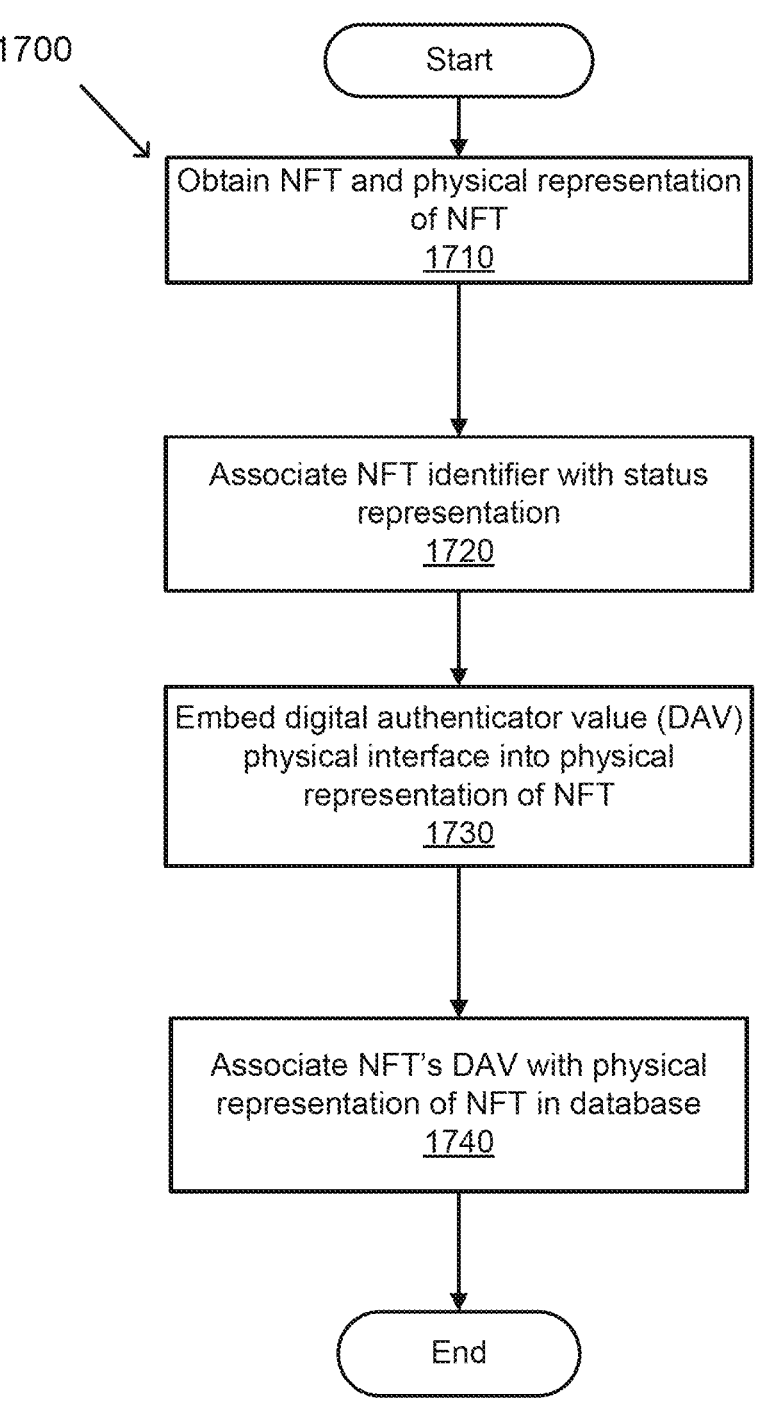
FIG. 17 illustrates a process for establishing a relationship between an NFT and corresponding physical content in accordance with some embodiments of the invention.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 may associate (1740) the NFT's DAV with the physical representation of the NFT in a database. In some embodiments, the association may be performed through making note of the transaction and clarifying that it encapsulates both the mouse painting and the mouse NFT.

While specific processes are described above with reference to FIGS. 15-17, NFTs may be implemented in any of a number of different ways to enable as appropriate to the requirements of specific applications in accordance with various embodiments of the invention. Additionally, the specific manner in which NFTs may be utilized within NFT platforms in accordance with various embodiments of the invention is largely dependent upon the requirements of a given application.

NFT Platform Alternative Digital Signatures

When sufficient quantum computing power becomes cheaply available, systems of asymmetric cryptography/encryption may be manipulated far more easily. For example, establishing the identity of users is performed on blockchain using the Elliptical Curve Digital Signature Algorithm (ECDSA) to: derive blockchain addresses from public keys; and authorize transactions by digitally signing the transactions with private keys (from which the public keys and blockchain addresses are derived). In doing so, blockchain may act as a distributed decentralized ledger, recording which addresses own specific digital assets. However, using a quantum computer, a fraudulent party could take a publicly available public key, derive the associated private key from it, and thereby have access to assets that do not legally belong to them. As digital asset holdings of bitcoin and/or ether may have a dollar value in the tens of billions, this is a problem with a significant financial cost. It may be a long-felt need to provide protection of cryptographic assets against quantum attacks, e.g., as argued in: V. Buterin. "How to Hard-Fork to Save Most Users' Funds in a Quantum Emergency." Ethereum Research, 9 Mar. 2024, Available at: ethresear.ch/t/how-to-hard-fork-to-save-most-users-funds-in-a-quantum-emergency/18901, the disclosure of which is incorporated by reference in its entirety.

Many alternate systems (e.g., Lamport signature schemes, Winternitz signature schemes) are quantum-resistant due to relying on quantum-resistant cryptographic hash functions. However, problems with such signature schemes include the fact that they are directed to one-time use, while being significantly larger than ECDSA signatures, which would make the financial burden too large for meaningful deployment on blockchains, where space is at a premium.

The cost of deployment in the form of gas costs may be one of the reasons why the proposed solutions are not practical. Seen from the lens of network congestion instead of just the financial overhead associated with gas fees, the greater the data overhead is, the more congested the network becomes.

As such, systems and methods in accordance with various embodiments of the invention, may be used to streamline processes. Specifically, systems address a need for an efficient quantum-resistant method to digitally sign transactions (and/or perform verifications) that are not data-intensive. Systems in accordance with many embodiments of the invention may address the above need by immediately converting ownership of tokens, including but not limited to fungible tokens (e.g., cryptocurrency) and NFTs, to quantum-protected expressions of the same ownership.

Systems may, thereby, not only improve the security of the resulting system (by adding protection against quantum-based attacks) but also lower the gas costs associated with the ongoing costs of transferring tokens (relative to today's systems that are not quantum-secure). This is due to a reduction in the size of the data string used to authenticate a transfer of ownership. Thus, due to factors including but not limited to the required size of authenticating data strings, even when quantum attacks never become reality, systems in accordance with various embodiments of the invention may benefit blockchain technology. In accordance with many embodiments of the invention, the extremely low computational costs enable battery-constrained devices including but not limited to smart cards, subscriber identity module (SIM) cards, radio frequency identification (RFID) tags, near-field communication (NFC) tags, and/or processors to perform blockchain-based transactions and/or verifications.

Systems accordance with many embodiments of the invention may avoid several additional pitfalls of challenge-response protocols. First, systems may benefit from operating without dependence on verifiers. In accordance with various embodiments of the invention, the second value (e.g., reveal signatures) may be implemented without dependence on verifier-selected values. Additionally or alternatively, the revealing party is not limited by the need to wait for verifier challenges. In numerous embodiments, the recording of the commit transaction may be sufficient preparation for the "reveal" step. The lack of verifier challenges may, additionally or alternatively, remove incorporation of attributes including but not limited to secrets and zero-knowledge proofs. This benefit results from the input values being made public and the authentication being based on known orderings of published values.

As mentioned above, ownership of digital assets by entities implies that the digital assets are registered on blockchain(s) as belonging to blockchain addresses of the entities. Specifically, private keys owned by the entities are used to derive corresponding public keys and blockchain addresses. In doing so, registration of digital assets may take place at a base protocol level of the blockchains and/or through smart contracts on the blockchains. As such, the entities have control over the transfer of the digital assets. In most instances, transactions to transfer digital assets may only succeed when duly authorized by the entities using corresponding private keys.

Transactions (also referred to as "actions" and/or "authorized actions") may alter the state of smart contracts by calling functions of the smart contracts. Such state changes may require authorization, similar to transfer transactions. As mentioned, generally, authorizations for transfer transactions may require asymmetric key cryptography through digitally signing transactions using appropriate private keys. Specifically, a public key and/or blockchain address derived from an appropriate private key is registered on a blockchain as having authorization to perform such transactions.

Systems in accordance with some embodiments of the invention may compute outputs used to implement transactions from preimage inputs off-blockchain. In doing so, systems may utilize sets of one or more cryptographic hash functions, random number generators, and/or other one-way functions. Initial preimages may be produced using random number generators that may include but are not limited to pseudo-random number generators (PRNGs) and/or quantum random number generators (QRNGs). The initial ("first") preimages may thereby need to be kept secret and stored securely. Denoting a first preimage as P1, and a one-way function as F( ), a first output, used to anonymize the blockchain address of the requesting party may be denoted by $O1=F(P1)$ ("anonymizing output). One particular example of a one-way function F( ) may be a hash function H( ). This disclosure may use these terms interchangeably, noting that, as one of these is mentioned, typically the other one could be used instead, as will be understood by a person of skill in the art.

A. CR Signatures

Systems in accordance with various embodiments of the invention, may enable authorized actions on blockchain(s) by submitting a first transaction (a "commit transaction" or "commit") and a subsequent second transaction (a "reveal transaction" or "reveal") to the blockchain(s). The commit transactions may essentially represent obfuscated versions of the authorized actions being requested on the blockchain(s). The reveal transaction may be used to identify/validate the commit transactions as requesting the actions, essentially validating the transactions and/or sending users.

Figure 18:
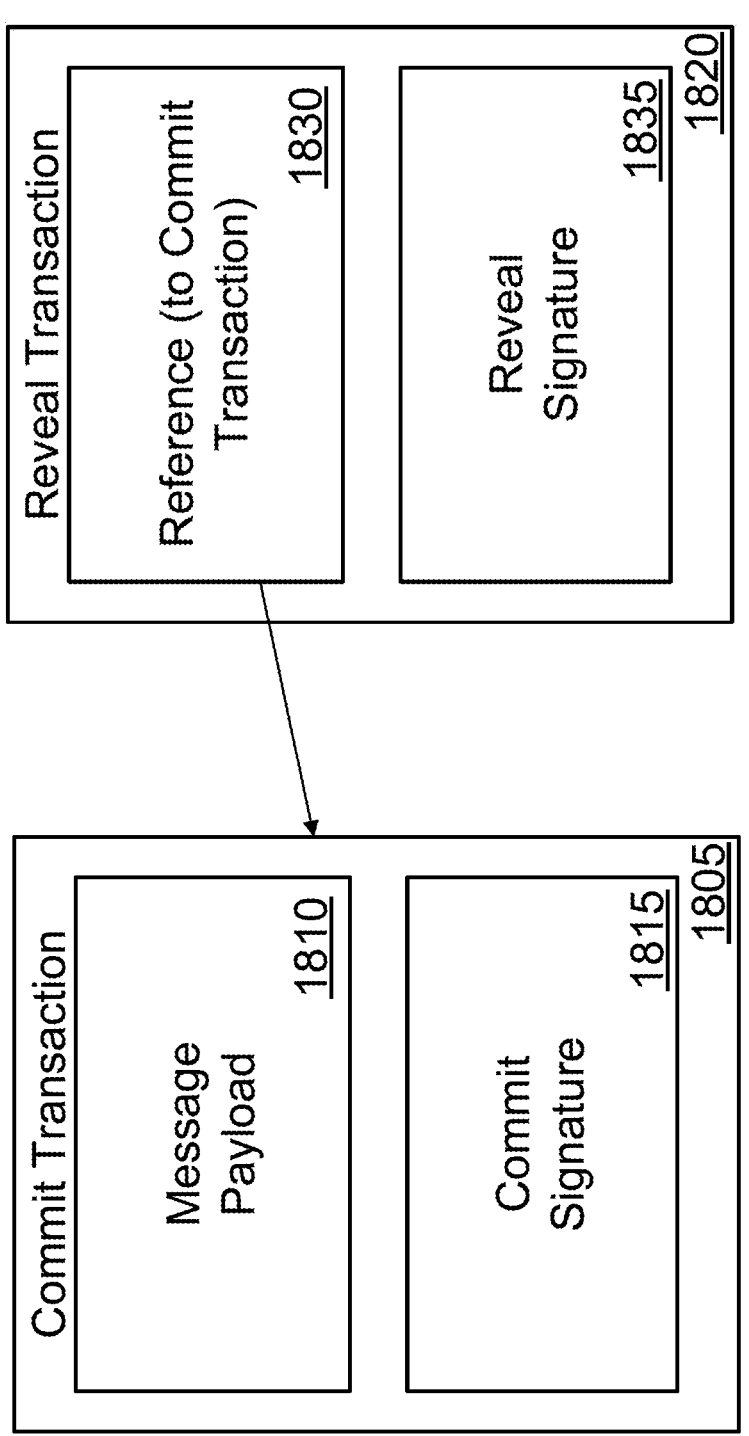
FIG. 18 illustrates a commit and reveal transaction implemented in accordance with some embodiments of the invention.

An example of a commit and reveal transaction implemented in accordance with many embodiments of the invention is illustrated in FIG. 18. A reveal transaction 1820 may include a reference 1830 to the commit transaction 1805, which may include one or more of a transaction identifier, a block height of a block including the commit transaction 1805, a pointer to and/or resource locator for the commit transaction 1805, and/or various other aids for finding the commit transaction 1805. The reveal transaction 1820 may (additionally or alternatively) include a reveal signature 1835, which in some embodiments may include one or more of: the random number, and the message payload 1810.

A commit transaction 1800 may include, but is not limited to a message payload 1810 and a commit signature 1815. Message payloads 1810 may describe the actions being requested on blockchain including but not limited to requests for transfers of digital assets and/or smart contract function calls. By doing so, commit transactions 1800 may refer to the (e.g., requests for) actions once validated later. As mentioned above, in accordance with many embodiments of the invention, blockchain addresses may be represented by the first output O1: for transfers of digital assets, the digital assets may be registered against O1; and the authorizations needed to execute functions may be identified (in corresponding smart contracts) by the first output O1.

Commit signatures 1815 may include one or more authentication values, used by verifying entities to identify the corresponding commit transactions 1800. In several embodiments of the invention, versions (e.g., hashes) of the pre-image P1 (and/or the first output O1) may be combined (e.g., concatenated) with (a hash of) the action(s) in the commit transactions 1800, producing an authentication value (termed C1, C2, C3, etc. for the sake of convenience). The hashes may be performed using one or more one-way functions (e.g., hash algorithms). In accordance with various embodiments, authentication values (e.g., C1) may be included in signatures for the commit transactions 1800.

Systems and methods in accordance with several embodiments of the invention may use the term commit-reveal (CR) signatures to describe the signature pairings used for authentication of messages (e.g., describing the requested action) as described herein. While the term "signature" commonly refers to an asymmetric authentication construct (i.e., one based on public key cryptography) systems and methods in accordance with some embodiments, may (additionally or alternatively) be implemented using symmetric-key primitives including but not limited to hash functions and, more generally, one-way functions. At times, a signature to a commit transaction 1800 may be called a commit signature 1815. In various embodiments, commit signatures 1815 may include but are not limited to hashes of the preimage (e.g., the authentication value, C1) and/or hashes of the preimage combined with (e.g., hashes of) the message payloads 1810 describing the requested actions. In this disclosure, the terms "combined" or "combinations" may refer to combination operations including but not limited to regular additions with carry, concatenation, OR, XOR, etc., though they may be referred to using "+" and/or "comb" at several points.

Systems in accordance with various embodiments of the invention may submit commit transactions 1800 to blockchains through modes including but not limited to proxy blockchain nodes and/or blockchain relays. The commit transactions 1800 may then be included in blocks on the blockchain(s) by validator nodes and/or miner nodes. However, at this point, the actions may be prevented from being acted on by the blockchain(s) (e.g., when the action is to transfer digital assets, the digital assets may not be yet considered transferred by the blockchain).

As mentioned above, the reveal transactions 1820 may be used to actually perform the commit transactions 1800. Reveal transactions 1820 may include but are not limited to references 1830 to the commit transaction 1800 and/or reveal signatures 1835. Reveal transactions 1820 may typically be performed as soon as the token owners (identified in the corresponding smart contracts) are able to identify that the associated commit transactions 1800 have been properly recorded on the blockchains. Therefore, reveal transactions 1820 may (optionally) be configured to include references 1830 to the corresponding commit transactions 1800. References 1830 to commit transactions 1800 may include (but are not limited to): transaction identifiers, block heights indicating blocks including the commit transaction(s) 1800, the first output O1, and/or other references/pointers to the commit transactions 1800. Specifically, where no references 1830 to commit transactions 1800 are included (e.g., to reduce gas cost), systems in accordance with some embodiments of the invention may depend on verifying entities to search the last few blocks of the blockchain(s) to determine the location of the corresponding commit transactions 1800. At times, providing authorization for the commit signature 1815 may be done using a reveal signature 1835 that, in some embodiments, may include but is not limited to the random number used to produce the initial preimage, and/or (e.g., an identifier of) the message payload 1810 describing the requested action.

In accordance with certain embodiments of the invention, reveal transactions 1820 may thereby be used to validate commit transactions 1800. Specifically, blockchain entities including but not limited to validator nodes and/or miner nodes may be used to verify that applying the same one-way function(s) F( ) to the preimage P1 (and/or first output O1) in the reveal transactions 1820 results in the same hash value, an output of C1. For example, where O1=$F_1$(P1) and C1=$F_2$(O1), the blockchain entities may be configured to verify that C1=$F_2$(O1), and/or verify that C1=$F_2$($F_1$(P1)).

In accordance with multiple embodiments of the invention, once commit transactions 1800 are validated, then blockchains may have the freedom to execute the (now authorized) actions in the message payload 1810. For example, when an action requests for a transfer of digital assets from a first blockchain address to a second blockchain address, then a blockchain may register the digital assets against the second blockchain address. When an action is to execute a function of a smart contract (requiring authorization), then the function may be executed and the state of the smart contract may change accordingly.

In addition or alternative to the example(s) disclosed above, various different functionalities may be included in commit and/or reveal transactions. In accordance with various embodiments, (a plurality of) digital assets may be registered against the first output O1 and/or be registered to blockchain addresses derived from the first output O1. In such cases, commit transactions may transfer some but not all of the digital assets to another blockchain address. However, those skilled in the art may now appreciate that the remainder of the digital assets may become vulnerable to theft on publishing the reveal transaction, as this reveals the first preimage P1 of the first output O1. This effectively allows anyone to subsequently transfer the remainder of the digital assets by constructing further commit/reveal transactions of their choosing.

To address situations like the above, in miscellaneous embodiments of the invention, a commit transaction and/or reveal transaction may include multiple anonymizing outputs (e.g., O1). Systems configured in accordance with some embodiments may generate a second (or more) anonymizing output O2 (and/or associate a second blockchain address with the second anonymizing output O2), for which the corresponding additional preimage(s) (P2) remain unrevealed. That way, upon executing the action, blockchains may be configured to (e.g., automatically) register the remainder of the plurality of digital assets against the second output O2 (and/or the blockchain address derived therefrom), thus ensuring ownership of the remainder of the plurality of digital assets only resides with entities knowing the additional preimage(s) (e.g., P2). In numerous embodiments of the invention, further divisions of the digital assets may be performed in transactions, such as by indicating three or more recipient addresses and the relative portions of the asset to be transferred to these. In such cases, one or more of the indicated addresses may receive conditional transfers based on a condition that may be evaluated. Such conditions may be based on but are not limited to time (e.g., the time of the posting of the commit transaction and/or the time of a triggering event).

In accordance with many embodiments of the invention, where a commit transaction discloses that (fractions) of tokens may be transferred to one recipient key (key2), the remainder of the token(s) may (simultaneously or subsequently) be transferred to another key (key3). Additionally or alternatively, in some embodiments, key3 may be part of the message m used for the initial commit transaction(s).

In accordance with various embodiments of the invention, commit signatures may correspond to recordings (e.g., on blockchain) of messages. Messages configured in accordance with certain embodiments may follow the format "H(prelm), H(prelm+m)", where: prelm is the preimage of a publicly available value (e.g., PX) and m is the message payload. In accordance with some embodiments of the invention, prelm may be selected in a manner that may not be easily guessed by a third party (e.g., selected in a pseudo-random manner, true random manner, and/or an approximation of a pseudo-random/true random manner).

Additionally or alternatively, m may represent an encoding of an action. For example, potential encodings may include but are not limited to: information indicating an amount of value to be transferred (such as "A fraction of 0.4 of the coin indicated by a key associated with the commit"); information indicating a recipient (e.g., "to be transferred to . . . "); and/or optional conditions, which may be references to other actions that the payload actions should be atomic with (i.e., one action occurs if and only if the other action occurs).

In various embodiments, the commit transaction may be represented in the format H(prelm) comb H(prelm+m), where comb is a combination function such as exclusive OR (XOR). The message H(prelm) comb H(prelm+m) may produce shorter message to record than H(prelm), H(prelm+m), saving time and gas. In such cases, verifications may be modified accordingly, as will be understood by a person of skill in the art. This technique may be referred to as "folding".

Additionally or alternatively, the term "composite function" may refers to the application of a one-way function (e.g., H) to the first input (prelm) creating a first temporary result; the application of the one-way function to a combination (in this example, represented by +) of the first and second input, creating a second temporary result; and/or a combination of the first and second temporary results, using the combination function comb. For folding to be secure, the resulting composite function may be configured to be collision-free. A person of skill in the art will recognize that the two applications of one-way functions may correspond to distinct one-way functions, although we use the same one-way function in the example above.

In accordance with many embodiments of the invention, two or more tokens may be exchanged in transactions including but not limited to atomic transactions. Specifically, transactions in accordance with certain embodiments of the invention may involve (a fraction of) a first token T1 being transferred to an entity associated with a transferee public key (key2), from an entity associated with another transferor public key (key1). For NFTs, certain parameters (e.g., "frac" disclosing fractions of fungible tokens) may not be applicable. In its place, different parameters (e.g., a parameter to represent a quantity of tokens) may be implemented. In some situations, fractions and/or quantities may be determined at the time(s) the transfer(s) are validated. In such cases, these valuations may use terms and/or exchange rates available at that time but not necessarily before that time. In multi-party exchanges, the terms may depend on factors including but not limited to the number of parties, the committed resources, and policies and conditions included in the agreement.

In atomic transactions, the above transaction may execute if and only if (a fraction of) another token T2 is transferred. In some embodiments, the atomic transactions may be reciprocal. Additionally or alternatively, the atomic transactions may depend on token T2 being transferred from an entity associated with a transferor public key (key3) to an entity associated with a transferee public key (key4). In any event, the conditions governing the transfers and the validity of the transfer requests may be verified prior to any such (initial and/or reciprocal) transfer. The verification may be performed using systems including but not limited to consensus mechanisms.

Thus, in accordance with several embodiments of the invention, transactions may be associated with message payloads that follow the format m=(frac,key2,coAct), where frac represents the fraction of the coin being transferred in the current action; key2 refers to the intended recipient (e.g., by their public key); and coAct identifies (e.g., via commit transaction, message payload) another action that the current action is atomic with (e.g., the above scenario). The associated reveal may correspond to the recording of a message with format (prelm,m,ref), to represent the preimage, the message payload, and (optionally) a reference to the recording of the commit transaction message "H(prelm), H(prelm+m)."

Figure 19:
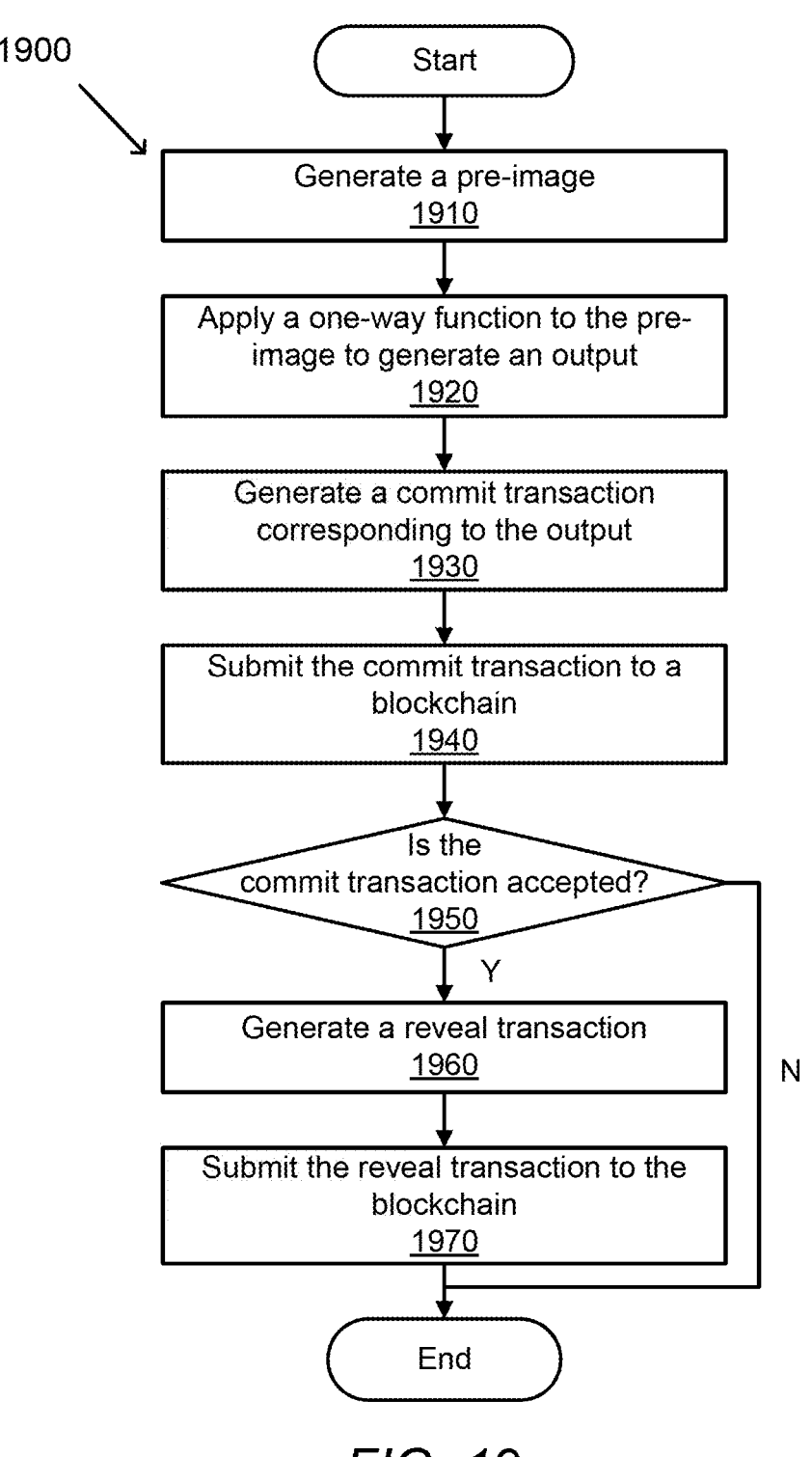
FIG. 19 illustrates a process for utilizing commit transactions and reveal transactions in accordance with many embodiments of the invention.

A process for utilizing commit transactions and reveal transactions in accordance with some embodiments of the invention is illustrated in FIG. 19. Process 1900 generates (1910) a preimage. As discussed above, the preimage may be generated randomly using random number generators that may include but are not limited to pseudo-random number generators (PRNGs) and/or quantum random number generators (QRNGs). Process 1900 applies (1920) a one-way function to the preimage to generate an output. As mentioned above, the one-way functions used in accordance with numerous embodiments may include but are not limited to hash algorithms. Process 1900 generates (1930) a commit transaction corresponding to the output. Commit transactions may include, but are not limited to the requested action(s) and/or hashes of combinations of the generated output and the action(s). Process 1900 submits (1940) the commit transaction to a blockchain. As mentioned above, the commit transactions may be included on blockchain recordings.

Process 1900 determines (1950) whether the commit transaction was accepted onto the blockchain. When the commit transaction is not accepted, the process 1900 may end. Alternatively, after the commit transaction is accepted, process 1900 generates (1960) a reveal transaction. Reveal transactions may include but are not limited to preimages, references to outputs, and/or references to the commit transactions.

Process 1900 submits (1970) the reveal transaction to the blockchain. In several embodiments of the invention, reveal transactions may not be posted on a blockchain by the sending party of the transfer. Instead, the information may be made available specifically to the receiving party. This may be facilitated by using associated keys (k2) that are preimages to the public key of the receiving party key2=h (k2). Systems like this may be especially effective in relation to cryptocurrency, effectively keeping the (fraction of the token) in escrow until the reveal transaction is recorded. Specifically, when the receiving party wishes to transfer the associated token, they may record the reveal transaction. Among other features, this carries the benefit of delaying the cost associated with the requesting actions (e.g., to periods of low gas prices and/or low-congestion).

While a specific process for implementing blockchain transactions is described above, any of a variety of processes may be utilized as appropriate to the requirements of specific applications. In many embodiments, steps may be executed or performed in any order or sequence not limited to the order and sequence shown and described. In a number of embodiments, some of the above steps may be executed or performed substantially simultaneously where appropriate or in parallel to reduce latency and processing times. In several embodiments, one or more of the above steps may be omitted.

As suggested above, CR signatures may correspond to groups of multiple records (e.g., R1 and R2) that are added to given blockchains. For example, a commit signature (R1) may correspond to a first record and/or the corresponding reveal signature (R2) may correspond to a second record. The above example may thereby be represented such that the commit signature record R1=(R1a, R1b), where R1a=H (prelm) and R1b=H(prelm+m). Additionally or alternately, reveal signature records may be configured such that R2=

41

(R2a, R2b, R2c), where R2a=prelm; R2b=m=(R2b1, R2b2, R2b3) where R2b1=frac, R2b2=key2, and R2b3=coAct; and R2c=ref.

In accordance with a number of embodiments, CR signature may be verified by making various determinations, including but not limited to:

(1) R1a=H(R2a): that hashing the preimage in the reveal signature record produces a result equal to the hash of the preimage already listed in the commit signature record; and/or that the hash of the preimage in the commit signature is valid (e.g., has had value transferred to it);

(2) R1b=H(R2a+R2b): that hashing a combination (of the preimage and the message payload) produces a result equal to the hash of the combination (of the preimage and the message payload) already listed in the commit signature record; and/or that the hash of the combination is valid;

(3) that R2b1 (e.g., frac) corresponds to a transfer amount disclosed in an agreement; that the agreement corresponds to a valid transfer; and/or that the agreement is the same agreement referenced by the condition indicated in R2b3; and/or (4) that R2b2 (e.g., key2) corresponds to the public key that is a token recipient in the agreement referenced in R2b1 (e.g., frac). In accordance with some embodiments, the relevant token may be determined by verifying what token may be associated with the transferor, where the association may be an assignment of ownership rights.

In accordance with some embodiments, the verification succeeds when all of the above determinations are made, indicating that the CR signature may be valid.

B. Alternative Applications

Systems and methods in accordance with many embodiments of the invention may be used to implement a number of additional applications, including but not limited to facilitating cross-platform transactions. Specifically, systems may be modified to allow transactions even by entities without access to CR signatures. In an example, a first party wishes to transfer one or more tokens, and/or fractions thereof, to a second party not yet using the disclosed CR technology for outgoing payments. The first party may transfer the tokens, using the disclosed approaches, to the second party, where the latter may be represented by one or more ECDSA public keys.

This incorporation of ECDSA public keys may be done by modifying the addresses to where the token(s) should be transferred. In such cases, where the recipient address is (e.g., a hash of) an ECDSA public key, transfers may be performed on the same blockchain (i.e., the token may not be moved from one blockchain to another as part of the transfer from the ECDSA key and the CR key). Additionally or alternatively, transfers may be made to bridges from a first blockchain to a second blockchain, where at the same time, the key on the "sender" chain may be of one type (e.g., ECDSA) and the key on the "recipient" chain may be of another type (e.g., CR). Potential implementations of bridges are disclosed in PCT Patent Application No. PCT/US23/62851, titled "Systems and Methods for Abuse Safeguards in NFT-Directed Environments," filed on Feb. 17, 2023, incorporated by reference in its entirety.

Additionally or alternatively, in accordance with several embodiments, tokens (and/or parts thereof) may simultaneously be transferred to both CR keys (as disclosed herein) and to ECDSA public keys, where the recipient selects where to accept the funds by ignoring one of the transfers

42 while storing the other, and/or by only performing a transfer of a token using one of the two methods. This may be especially beneficial in settings where some of a user's devices are compatible with the disclosed CR technology, whereas others are not.

In some embodiments of the invention commit transactions may be submitted to individual blockchains, while the corresponding reveal transactions are submitted to alternative blockchains. In such an example, actions provided by the commit transaction(s) on the first blockchain may be validated (even in the absence of corresponding reveal transaction on the same blockchain) using dual nodes monitoring both blockchains involved. Dual nodes may, in this disclosure refer to individual nodes monitoring both the first blockchain and the second blockchain and/or pairs of nodes (in communication with each other) with each monitoring one of the first blockchain and the second blockchain. In several embodiments, the authorized actions disclosed on the initial commit transaction(s) may be applied on either or both involved blockchains.

Dual nodes have applications to cross-chain asset transfers, including but not limited to transfers currently provided through blockchain bridges. For example, provided for illustrative purposes only and not meant to be limiting in any way, a dual node may detect a commit transaction on a first blockchain including an action to transfer digital assets from the first blockchain to the second blockchain (or vice versa). On subsequently detecting a reveal transaction on one blockchain, the dual nodes may lock and/or destroy the digital assets on that blockchain and release (and/or instantiate) the digital assets on the other blockchain (or vice versa. In numerous embodiments, the operation of dual nodes may be facilitated by synchronizing the two (or more) blockchains involved as part of the transfer; e.g., cross-references in terms of state being made. Systems in accordance with many embodiments of the invention may utilize dual node and/or dual blockchain implementations as disclosed in U.S. patent application Ser. No. 17/810,085, titled "Distributed Ledgers with Ledger Entries Containing Redactable Payloads," filed Jun. 30, 2022, incorporated by reference in its entirety.

In accordance with many embodiments of the invention, blockchain transactions that have been received by peer-to-peer networks of blockchain nodes may be stored in a data storage area known as a mempool. This may occur during in periods such as before the blockchain transactions may be included in canonical blocks of the blockchains by miners and/or validators. In certain embodiments of the invention, nodes may include a second (i.e., "validated") mempool for commit transactions that have been included on the blockchain. Specifically, this may be especially helpful to recover commit transactions after reveal transactions are submitted.

In accordance with some embodiments, entities may attempt to submit two or more commit transactions spending the same digital assets. In certain embodiments, nodes may inspect subsequently submitted commit transactions (e.g., using the mempools) to confirm that assets in associated actions have not previously been allocated for transferal by prior commit transaction(s). In such cases, the later transactions may be rejected at a base blockchain protocol level after discovery, for example, in the validated mempool.

In miscellaneous embodiments, the use of the validated mempool may vary. For instance, subsequent commit transactions may, by default, replace the prior first commit transaction in the validated mempool. In several embodiments, both the prior first commit transaction and the later commit transactions may be stored in the validated mempool until a reveal transaction is received, validating one of the two transactions. Which transaction to validate may be determined from reference(s) in the reveal transaction(s). These references may be used to identify one transaction as a validated commit transaction, and the other(s) as invalid commit transaction(s). The action within validated commit transactions may naturally be executed by nodes on the blockchain. Additionally or alternatively, invalid commit transactions may be deleted from the validated mempool.

In some embodiments, the absence of double-spending may be verified at the time of the reveal operation. In such cases, validation may involve a search for any overlapping commit transactions. This may involve a search to confirm whether the corresponding key(s) have not previously been revealed. When they have been so, the current reveals may be considered void/invalid and be ignored.

Systems and methods in accordance with many embodiments of the invention are not limited to singular transfers of assets such as crypto funds and non-fungible tokens. For example, CR signatures may, in several embodiments of the invention, be used in any contexts with a need for digital signatures, and/or where signers post to and/or verify the contents of blockchains. For example, systems may be used for processes including but not limited to digitally signing access privilege statements to be verified by digital rights management (DRM) units to acknowledge access requests (e.g., agreeing to be billed accordingly); physical access control; and various machine-to-machine authentication configurations.

Systems and methods in accordance with some embodiments of the invention may be applied to off-chain activities relating to identity and access management (IAM). For example, provided for illustrative purposes only, and not meant to be limiting in any way, in several embodiments of the invention, preimages and one-way function outputs may be used to provide identification and hence access rights. This may be used to verify rights of entry to areas including but not limited to hotel doors, home doors, cars, digitally locked safes, prisons, restricted areas (e.g., of a hospital), offices of employment, and/or member's clubs.

Systems in accordance with various embodiments may, additionally or alternatively, allow lightweight auditing of access patterns. In some embodiments, stored audit data may be encrypted using keys associated with escrow authorities, requiring collaboration with said escrow authorities to perform tracking. Associated techniques are disclosed in co-pending application U.S. patent application Ser. No. 17/821, 444, titled "Systems and Methods for Management of Token Interactions," filed Aug. 22, 2022, the disclosure of which is incorporated by reference in its entirety.

In some embodiments, (e.g., token) representations of access rights may be transferred to addresses (e.g., in a blockchain wallet) of authorized individuals. In such cases, the authorized individuals may obtain access to specific areas through methods including but not limited to validating actions through commit and reveal transactions for the addresses. These actions may, in certain embodiments incorporate the tokens being transferred to different (e.g., second) addresses associated with the same authorized individuals (e.g., in the same blockchain wallet). In multiple embodiments, users may submit actions including requested activities from authorized blockchain addresses as part of commit transactions. In such cases, the actions may refer to (e.g., physical) activities including but not limited to: "open safe", "lock door", and/or "start car." In some cases, other authorized wallet addresses may be used for future actions.

In accordance with certain embodiments of the invention, transactions may include multiple parties, transferring ownership rights to set numbers and/or fractions of tokens. Each party may include one or more conditions under which the transfer goes through. In essence, these conditions may determine the validity of a particular transfer component.

Figure 20:
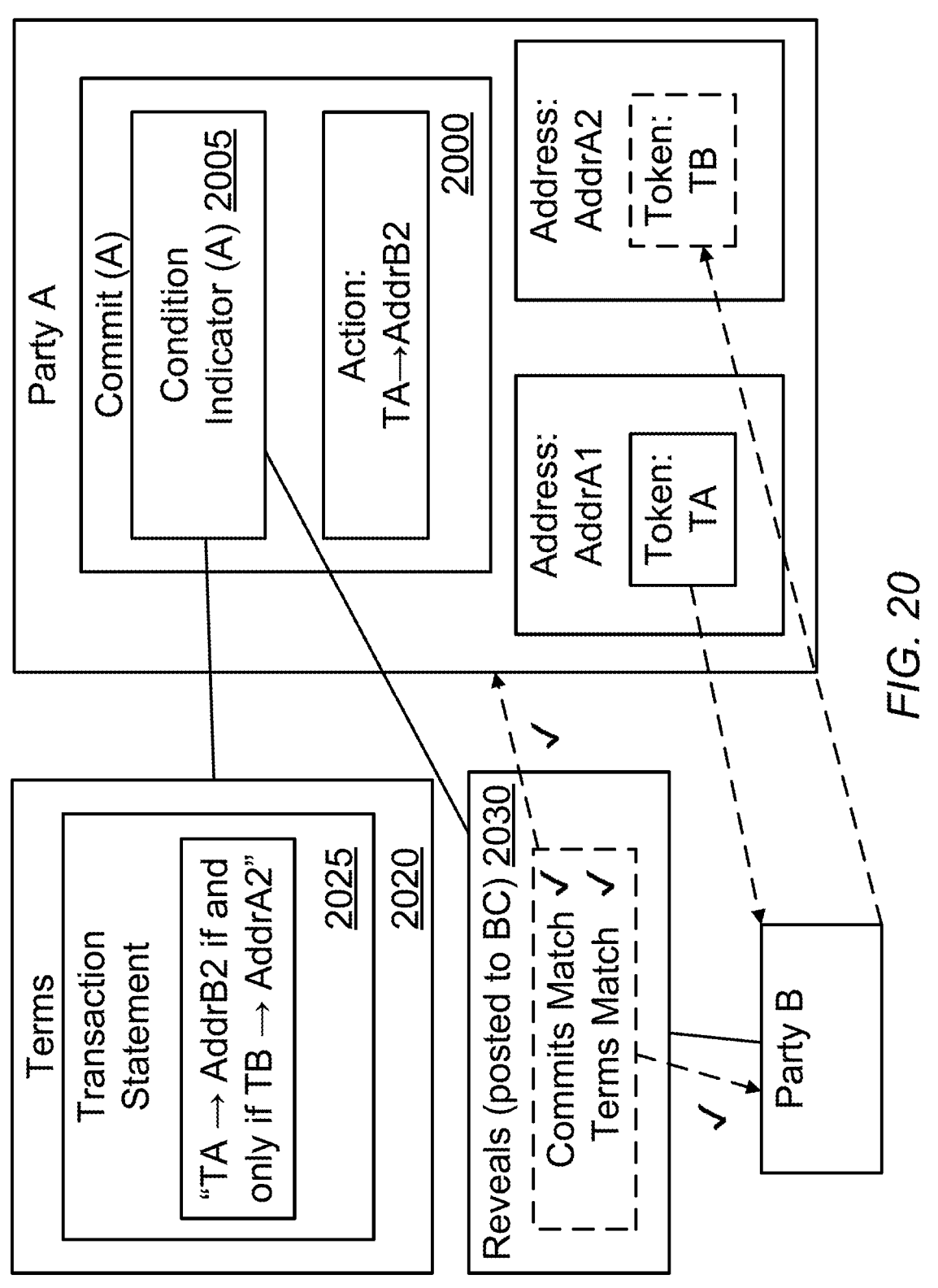
FIG. 20 conceptually illustrates cross-referenced commit transactions, implemented in accordance with multiple embodiments of the invention.

A system of cross-referencing commit transactions, implemented in accordance with various embodiments of the invention, is illustrated in FIG. 20. A commit (transaction) A 2000 from party A includes a condition indicator A 2005 (such as a reference) to terms A 2020 and a requested action (transaction). Systems and methods in accordance with several embodiments of the invention may indicate terms of ownership rights. For example, terms may indicate that transfers are temporary and the token(s) will revert to the owner (sender) after some specified time and/or when some triggering event takes place. In such cases, the recipient(s) may still have the right to transfer the ownership rights, but the terms indicating reverting may still apply. Entities that are initiating transactions with party A (e.g., party B) are able to push additional commit transactions (e.g., Commit B) that have condition indicators referencing their own sets of terms (e.g., terms B). In many scenarios, such as where transactions require multiple discrete actions, terms A 2020 may be the same document and/or code as terms B. Commit A 2000 (and/or commit B) may follow (but is not limited to) the general format shown in FIG. 18.

Commit transactions 2000 may include but are not limited to various combinations of elements based on (e.g., one-way function outputs of) preimages (prelm), message payloads (m), and/or condition indicators. Here Commit A 2000 may include the elements H(prelm), H(prelm+m), H(prelm+ "condition indicator A"), where these three elements may be combined using combination functions (e.g., comb) as described above. In some embodiments, the three one-way functions may be made order-dependent by incorporating order indicators, e.g., H(0,prelm), H(1,prelm+m), H(2, prelm+condition indicator A).

The condition indicator A 2005 may be expressed as a reference to terms A 2020, e.g., the address of their storage location, and/or as a hash digest to the terms A 2020. FIG. 20 illustrates these references as a line. Once the reveal transaction is used (e.g., in FIG. 18), the condition indicator(s) 2005 may be revealed along with the other values. Similarly, a condition indicator may reference terms B.

Commit A 2000 relates to a transaction transferring a token (TA) to party B, conditional on a second token (TB) being transferred to the holder of token TA. However, as mentioned above, some transactions may not be conditional. Before the commits were posted, party A may have associated token TA with an address of theirs (AddrA1), while party B, could have associated TB with address AddrB1. The action statement 2025 of FIG. 20 discloses that party A agrees to transfer TA to party B's address AddrB2, but only once party B transfers TB to party A's address AddrA2. This may (additionally or alternatively) be expressed by encoding action statements 2025 in the relevant terms 2020, e.g., "TA→AddrB2 if and only if TB→AddrA2." For example, this statement may be encoded as (TA, AddrB2, TA, AddrA2).

When the reveal(s) 2030 are posted for Commit A 2000 and Commit B, the commits may be verified. The verifications may evaluate, but are not limited to, whether the reveals 2030 are determined to be well-formed, the corresponding commits are determined to match each other; and/or the commits are determined to abide by the terms 2020 indicated by condition indicator A 2005 and the condition indicator of Commit B. This verification is represented by the dashed arrow between the reveal and the parties in FIG. 20. When this is true, then the two transactions may be performed (as identified by the dashed arrows between party A and party B in FIG. 20).

In many embodiments, additional safeguards may exist, including but not limited to third-party verifications. Third parties (e.g., a consensus mechanism) may verify that the two transactions were (and/or should have been) performed by using the same verifications. Additionally or alternatively, contingent on the verifications being performed, the third parties may record the new ownerships of the associated tokens, associating each with new addresses.

Additionally or alternatively, as discussed above, in accordance with various embodiments of the invention, fungible tokens may be transferred in part. This may be implemented in cases including but not limited to when two or more parts are indicated in commits.

Figure 21:
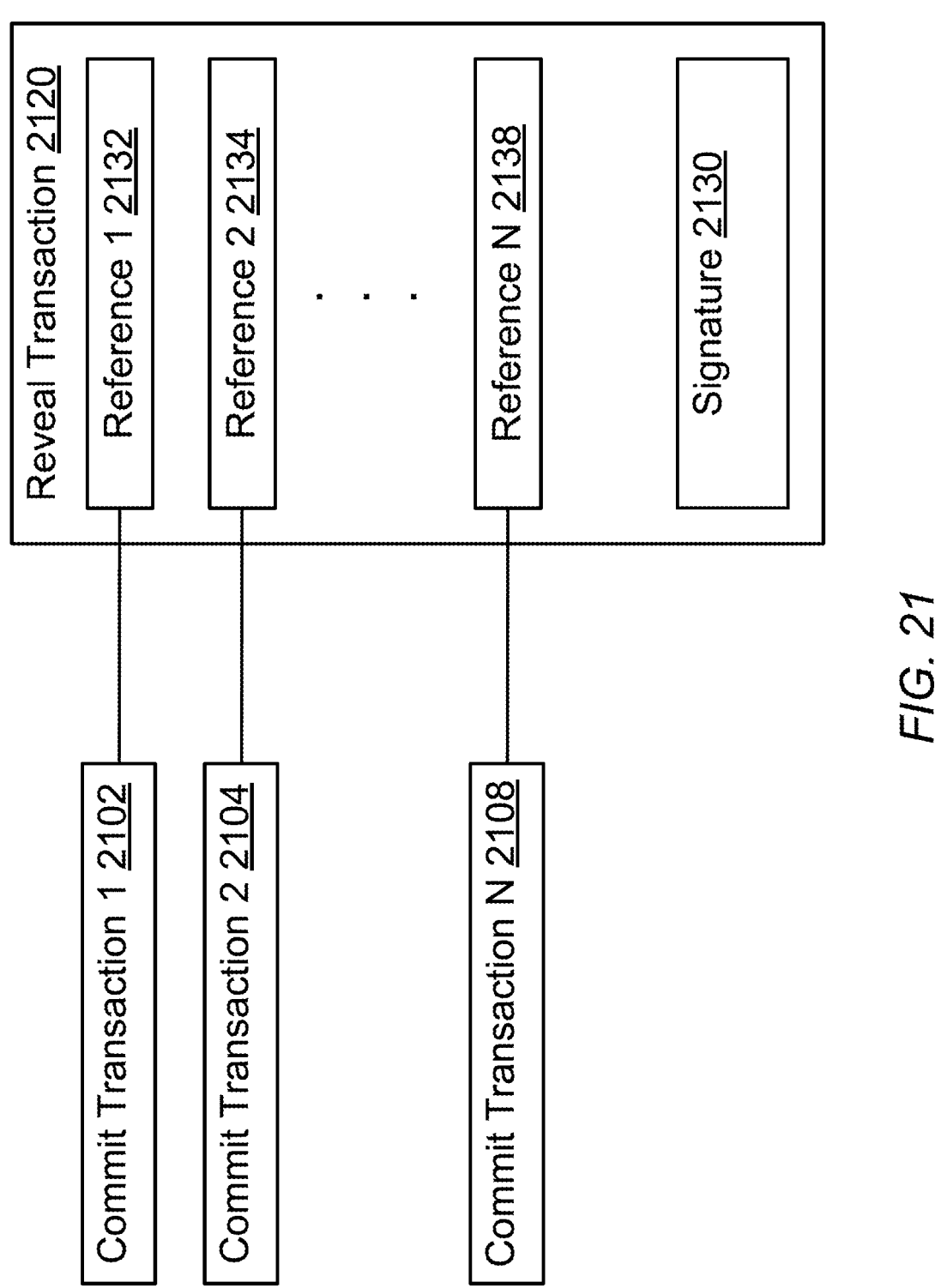
FIG. 21 illustrates a multi-element transaction implemented in accordance with several embodiments of the invention.

A multi-element transaction implemented in accordance with some embodiments of the invention is illustrated in FIG. 21. A plurality of N commit transactions, each including one of a plurality of actions illustrated by commit transaction 1 2102, commit transaction 2 2104, through to commit transaction N 2108 may be submitted to a blockchain (e.g., by a singular user). Such multi-element commit transactions may be posted at essentially the same time and/or over a period of time spanning multiple blocks of the blockchain. Subsequently, a reveal transaction 2120 may validate the N commit transactions. In accordance with some embodiments, a singular reveal transaction 2120 may apply to each of the N commit transactions. Additionally or alternatively, reveal transactions 2120 may include but are not limited to: a first reference 2132 to commit transaction 1 2102, a second reference 2134 to commit transaction 2 2104, through to an Nth reference 2138 to commit transaction N 2108. The reveal transactions 2120 may include (e.g., reveal) signatures 2130, which may include preimages and hashes of each of the plurality of actions combined with the preimages.

In some embodiments, a first individual may produce and submit a commit transaction to the blockchain, including an action and a hash (CX) of the action combined (e.g., concatenated) with an output (OX); meanwhile, a second individual may produce and submit a reveal transaction for the commit transaction, wherein the first entity does not know a preimage (PX) for the output, and the second entity does know the preimage for the output. Systems and methods in accordance with many embodiments of the invention may, therefore, be used to facilitate pre-prepared transactions. For example, a party who wishes to have a (fraction of a) token transferred to them may generate a preimage key (x) that may be reconfigured as a new value for each transfer. The preimage key may be generated as a random value and/or a value that may not be predicted by an attacker. In doing so, a function output (e.g., hash) of the preimage key F(x)=y, may be generated that may be made public.

In several embodiments of the invention, individual commit transactions may depend on multiple parties. In accordance with several embodiments of the invention, the commit transactions may specify transfers of digital assets to (and/or from) a plurality of new owners. This may be done, for example, by the commit transaction including an array of recipient blockchain addresses instead of a single blockchain address. This may facilitate scenarios including but not limited to transferring digital assets jointly owned by multiple parties. Such commit transactions may incorporate pluralities of output values and/or blockchain addresses (e.g., belonging to the joint owners, belonging to the recipients). In such cases, the blockchain addresses may be derived (at least in part) from the output values. Additionally or alternatively, commit transactions may be considered "validated" when configuration-based numbers of (a plurality of) reveal transactions are accepted onto the blockchain. The number of reveal transactions involved may or may not equal the number of output values and/or blockchain addresses. This enables M-of-M and/or N-of-M signature schemes, where M is the number of output values and/or blockchain addresses, and N is the number of reveal transactions.

For example, provided for illustrative purposes only and not meant to be limiting in any way, an NFT (non-fungible token) may represent ownership of a resource, such as a patent jointly owned by M inventors. Said ownership may contractually include an agreement that, when N out of the M inventors wish to sell the patent, they may successfully do so. In several embodiments M and N may be coded and/or stored in smart contracts. A first inventor may submit a commit transaction to transfer the NFT representing the patent. The commit transaction may include an array listing the M blockchain addresses, with each blockchain address controlled by one of the M inventors. Subsequently, provided N reveal transactions are submitted by N of the inventors to the blockchain and accepted onto the blockchain, the commit transaction will be validated, and the NFT may be transferred.

Figure 22:
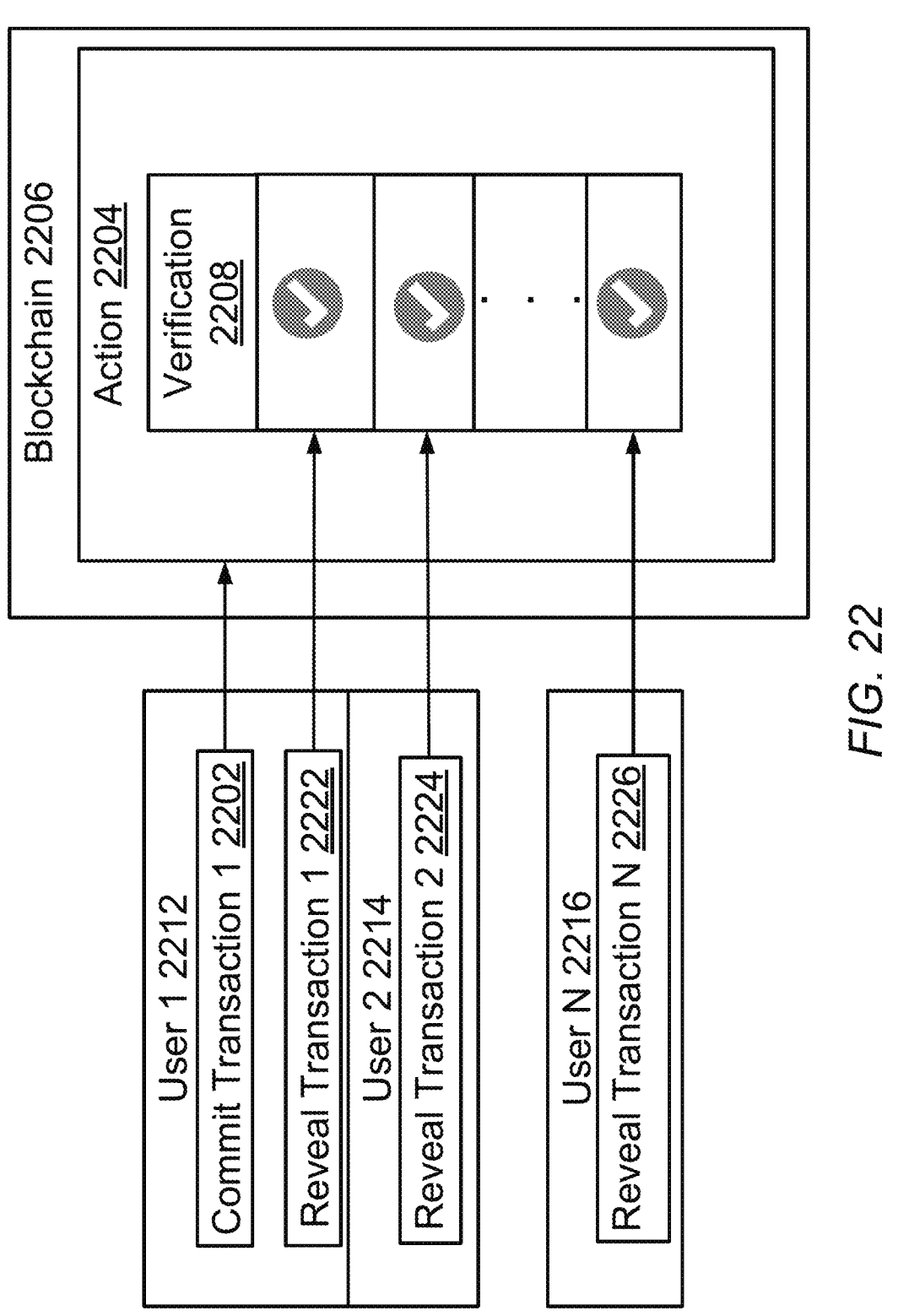
FIG. 22 conceptually illustrates a multi-signature transaction, implemented in accordance with many embodiments of the invention.

An example of a multi-signature transaction, implemented in accordance with several embodiments of the invention, is illustrated in FIG. 22. Multi-signature transactions may use a plurality of reveal transactions 2222, 2224, 2226 to validate singular commit transactions 2202. As mentioned above, a (first) user 2212 may submit a commit transaction 2202 to the blockchain 2206, with the commit transaction 2202 including an action 2204 (for example, but not limited to transferring digital assets to a new owner).

Once the commit transaction 2202 has been successfully published on the blockchain 2206, a "revealing" user (which may be, but is not limited to the first user 2212), may submit a first reveal transaction 2222 partially validating the commit transaction 2202. The first reveal transaction 2222 may (additionally or alternatively) transfer any (or all) digital assets registered (solely) against the public address of the first user to a new first user public address.

A second user 2214 may similarly submit a second reveal transaction 2224, through to an Nth user 2216 submitting an Nth reveal transaction 2226. As mentioned above, the other "revealing" users may represent parties including but not limited to joint owners of the digital assets and/or joint recipients of the digital assets. When a predetermined threshold of required reveal transactions is reached, which may be less than or equal to N, nodes on the blockchain 2206 may consider the commit transaction fully validated, at a base blockchain 2206 protocol level and/or as part of a process encoded in a smart contract. At this point, the action 2204 may be executed, as illustrated by the action validation 2208 indicator of FIG. 22 being completed in full.

In converting to systems implemented in accordance with many embodiments of the invention, users will undergo a transition period while moving from standard ECDSA tokens and/or addresses. One way of doing this may be to transfer their collections of tokens to new addresses (of the format disclosed herein) from traditional addresses en masse. However, during a transition period in which not everybody has abandoned ECDSA-based keys for the purpose of expressing ownership, this may limit users in terms of potential recipients. In such cases, users may instead generate conditional transfers of each of their ECDSA-controlled tokens, to addresses such as those disclosed herein.

The conditional transfers may be recorded on the blockchain(s), but the transfers may be held from completion until triggers are executed. In accordance with some embodiments, users may execute triggers to implement the transfers by publicizing hash function preimages that act as instant triggers. In such cases, all the conditionally transferred ECDSA tokens may be immediately invalidated, with the corresponding preimage-based tokens (implemented in accordance with many embodiments of the invention) validated at the same time.

Any ECDSA tokens that have been transferred (e.g., spent) from the time of the conditional transfer to the triggering of the transfer may be excluded from the impact of such triggers (i.e., ECDSA "invalidation" and CR "validation"). In several embodiments of the invention, this exclusion may not apply to any ECDSA-controlled tokens that are transferred to other ECDSA-based addresses that are controlled by the same party. This may be done, for example, when a user spends a portion of a fungible token, transferring the remainder to an address corresponding to a public key that this same user controls the private key of. In such a partial transfer, it may be indicated what public key corresponds to the same entity as from where the ownership rights are held. Additionally or alternatively, public keys may be generated in a manner that allows them to later prove that they were derived from the same seed as the ECDSA keys whose ownerships were conditionally transferred.

In some cases, transitions from ECDSA systems to systems configured in accordance with many embodiments of the invention may coincide with announcements (of the transitions) at given block heights. After the given block height is reached, ECDSA signatures may be prevented from being used. However, in such instances, assets registered to blockchain addresses derived from ECDSA public keys may be moved to new addresses derived from one-way function outputs through commit transactions including applications of the one-way functions to private ECDSA keys. In some embodiments, corresponding reveal transactions may validate the commit transactions when they include the private ECDSA key(s). Additionally or alternatively, blockchain nodes may verify the commit transactions and act on them when they determine that the private ECDSA keys may be used to derive the blockchain addresses.

Systems and methods in accordance with various embodiments of the invention may be suitable for balances-based blockchains (such as Ethereum) and unspent transaction output-based blockchains (UTXO blockchains) such as Bitcoin. In several embodiments, nodes maintaining and extending blockchains may keep records of revealed outputs (and/or address precursors). In doing so, preimages may be published for each element of a set of revealed outputs (and/or address precursors), to ensure that assets registered against elements of the revealed outputs (and/or address precursors) are subsequently registered against elements for which no preimage has been made public.

In balances-based blockchains, amounts of digital assets (including but not limited to non-fungible tokens, fungible tokens, and/or native cryptocurrency) may be registered on blockchains as balances against blockchain addresses. This may be done, for example, using mapping data structures. When a commit/reveal transaction set transfers different fractions of the amount of the digital assets to a plurality of blockchain addresses, the mapping data structures may be updated to record corresponding changes in balances for each of the plurality of blockchain addresses, where each of the blockchain addresses is derived from the application of one-way functions to as yet unrevealed preimages.

In UTXO blockchains, databases and/or key/value lists (e.g., dictionaries in the Python programming language, objects in JavaScript) may store records of unspent transaction outputs against blockchain addresses. These values may be stored using blockchain addresses as keys, and references to unspent transaction outputs as values. When commit/reveal transactions for blockchain addresses spend UTXOs to transfer digital assets to recipient blockchain addresses, the UTXOs may be marked as canceled and/or deleted. Additionally or alternatively, new UTXOs may be added to the databases and/or key/value lists for recipient blockchain addresses.

Figure 23:
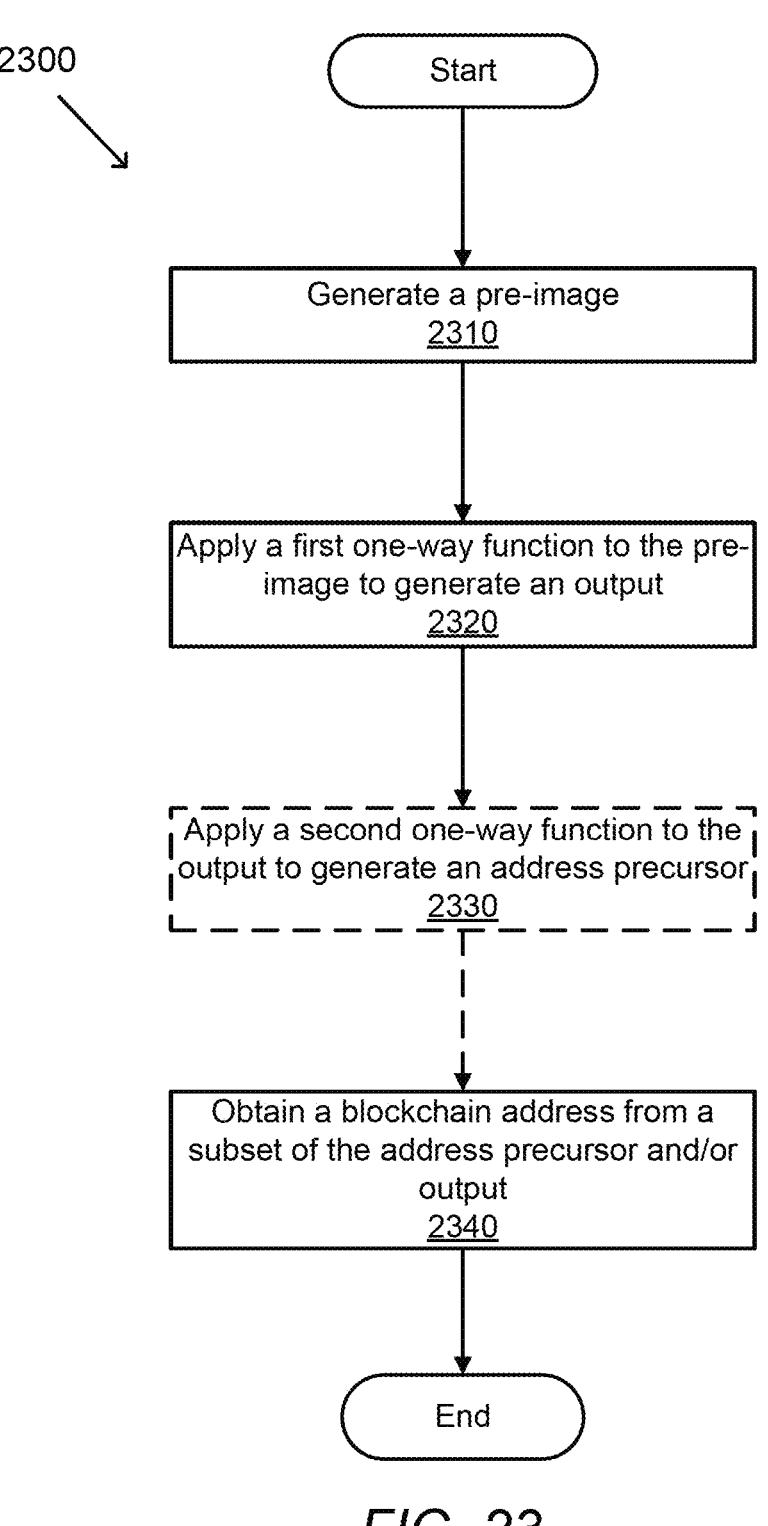
FIG. 23 illustrates a process for deriving a blockchain address in accordance with various embodiments of the invention.

A process for deriving a blockchain address in accordance with miscellaneous embodiments of the invention is illustrated in FIG. 23. Process 2300 generates (2310) a preimage. In accordance with several embodiments of the invention, the preimages may be randomly generated. Additionally or alternatively, preimages may be generated (2310) as integers and/or possess various sizes (e.g., a 256-bit number).

Process 2300 may use the preimage to determine values, from which the blockchain address will be derived. Process 2300 applies (2320) a first one-way function to the preimage to generate an output. In some embodiments. As mentioned above, one-way functions implemented in accordance with various embodiments of the invention may include but are not limited to cryptographic hash functions (e.g., SHA256 and/or Keccak256 hash functions). Process 2300 may apply (2330) a second one-way function to the output to generate an address precursor. In some embodiments, the second one-way function may or may not be the same as the first one-way function. In certain embodiments, this step may be omitted and the address precursor may be the same as the output generated from the first one-way function.

Process 2300 obtains (2340) a blockchain address from (a subset of) the address precursor and/or the output. In some embodiments, the subset of the address precursor may include the ending bits (e.g., the last 160 bits) of the address precursor and/or the output.

Using processes in accordance with miscellaneous embodiments of the invention, digital assets on blockchains may be recorded against blockchain addresses. While a specific process for obtaining blockchain addresses is described above, any of several processes may be utilized as appropriate to the requirements of specific applications. In some embodiments, steps may be executed or performed in any order or sequence not limited to the order and sequence shown and described. In various embodiments, some of the above steps may be executed or performed substantially simultaneously where appropriate or in parallel to reduce latency and processing times. In multiple embodiments, one or more of the above steps may be omitted.

Systems and methods in accordance with several embodiments of the invention may maintain and manage expended address lists. Systems that have generated blockchain addresses from (e.g., randomly generated) preimages may submit commit transactions to blockchains to allow the addresses to be published on the blockchains. Systems may submit reveal transactions including the preimages, from which the blockchain addresses were derived. Doing so reveals the blockchain addresses, so they may be considered as having limited utility.

As such, revealed blockchain addresses may be added to expended address lists. The blockchain nodes and/or smart contracts may use expended address lists to reject (e.g., commit transactions) including actions for blockchain addresses that are expended. In accordance with many embodiments of the invention, expended addresses may be extracted from (e.g., commit, reveal) transactions and/or may be derived from reveal preimages. In some embodiments, outputs of applying one-way functions to the preimage(s) may be stored in the expended addresses lists. The aforementioned approach(es) may be implemented at blockchain protocol level and/or performed by blockchain nodes. Additionally or alternatively, methods in accordance with several embodiments of the invention may be implemented in smart contracts. The smart contracts may include mappings from blockchain addresses to Boolean values. In such cases, "false" may indicate that addresses are not expended, whereas "true" indicates that addresses are expended.

In accordance with miscellaneous embodiments of the invention, processes including but not limited to handling registration of digital assets against blockchain addresses and processing transfers of digital assets may be implemented on top of the Ethereum blockchain. This may be through, but is not limited to the use of smart contracts and Ethereum Improvement Proposal 4337 (EIP-4337) account abstraction system(s). Those techniques are described in V. Buterin et al., "ERC-4337: Account Abstraction Using Alt Mempool." *Ethereum Improvement Proposals*, eips.ethereum.org/EIPS/eip-4337, the disclosure of which is incorporated by reference in its entirety. EIP-4337 provides the capability to build arbitrary verification logic without requiring consensus-layer protocol changes to Ethereum, although specific verification logic may not be provided in the EIP-4337 proposal. A further part of the EIP-4337 proposal discloses "paymasters" that allow user transactions on Ethereum without the user being required to pay gas fees for their transactions, and with paymasters covering the cost.

In accordance with several embodiments of the invention, commit and/or reveal transactions may be submitted as UserOperations. In doing so, paymasters may be implemented to cover gas fees for processing each UserOperation. Additionally or alternatively, smart contract logic may track ownership and transfer of assets against blockchain addresses generated using systems in accordance with some embodiments of the invention.

In accordance with various embodiments, handling registration of digital assets may be done through smart contracts tracking ownership of digital assets registered against blockchain addresses. The blockchain addresses may be generated from outputs including but not limited to those described above in relation to FIG. 23. The smart contracts may include logic to store commit transactions at the smart contract level and/or verify commit transactions in accordance with certain embodiments of the invention.

Figure 24A:
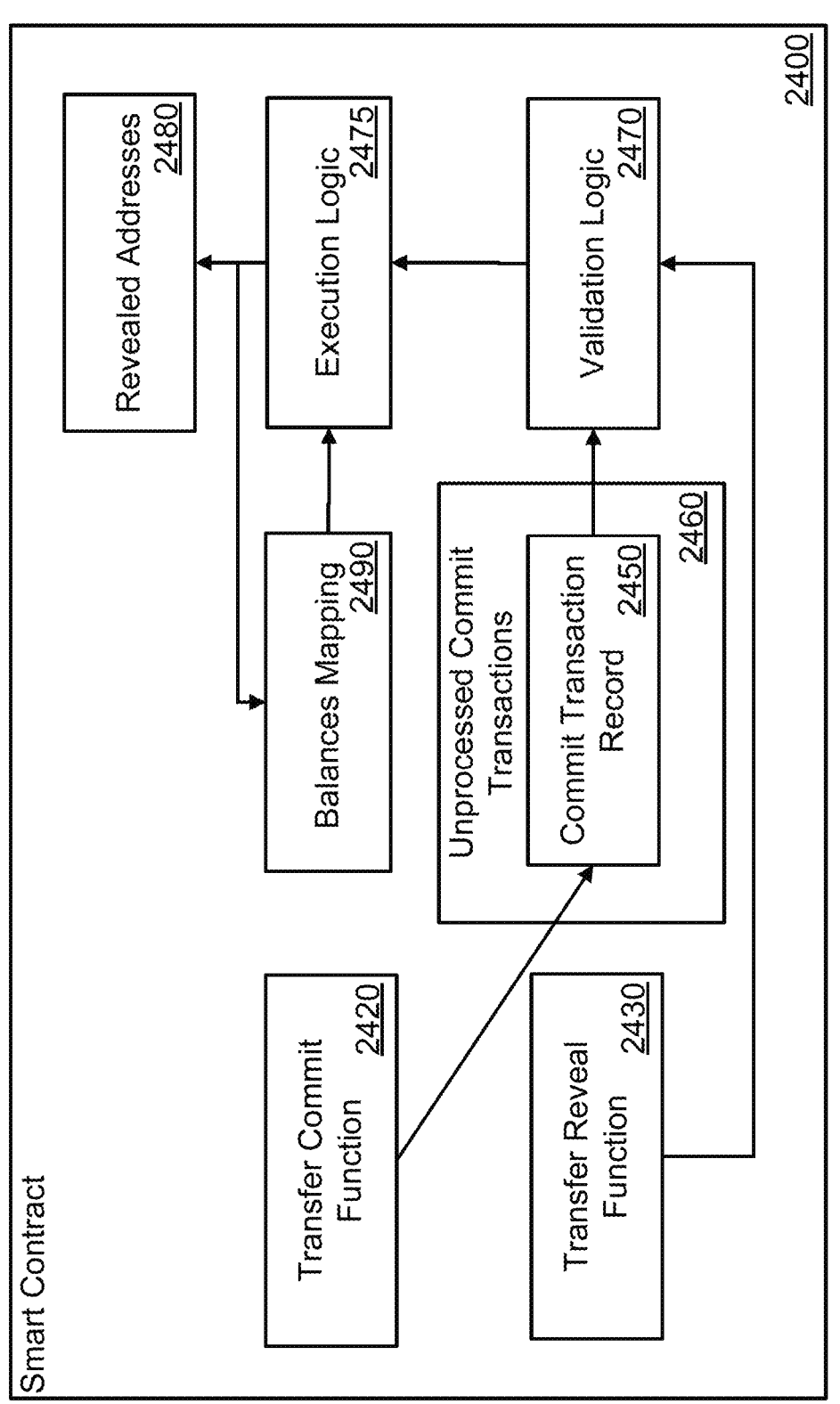
FIGS. 24A-24B conceptually illustrate smart contract architecture implemented in accordance with certain embodiments of the invention.
Figure 24B:
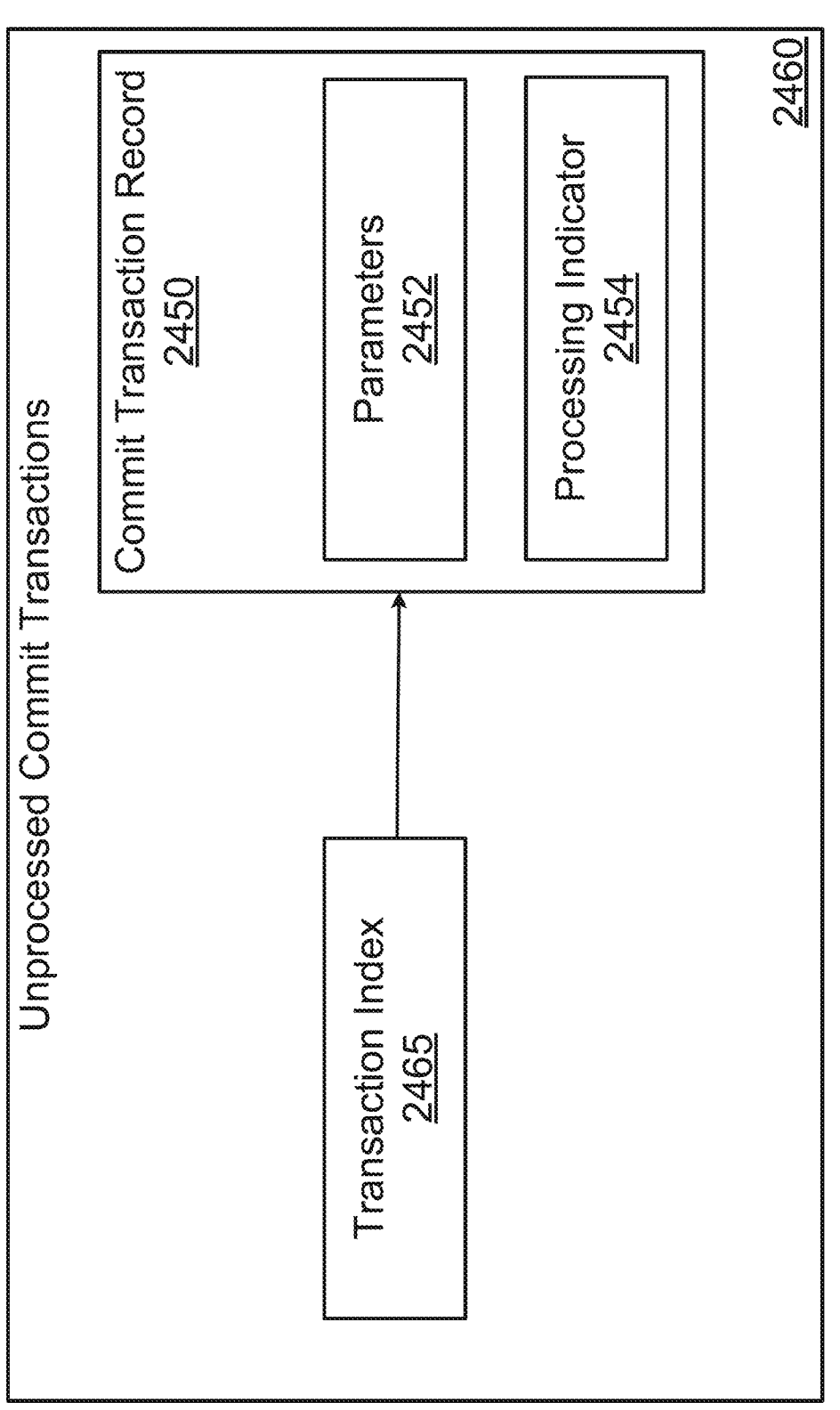

An example of smart contract architectures implemented in accordance with numerous embodiments of the invention is illustrated in FIGS. 24A-24B. Smart contracts 2400 may instantiate tokens including but not limited to fungible tokens (e.g., satisfying the ERC-20 standard), non-fungible tokens satisfying the ERC-721) standard), and/or other token standards and custom token implementations. In FIGS. 24A-24B, a smart contract 2400 used for an ERC-20 token is presented; however, those skilled in the art will appreciate in light of the disclosure that follows that other token types may be implemented in comparable manners.

The smart contracts 2400 may include but are not limited to standard (e.g., ERC-20) functions 2410 (including but not limited to functions that return token names, fractional units of tokens available, and/or token symbols); balance returning (taking blockchain addresses and returning token balances stored against the blockchain addresses); transfer functions 2420, 2430; mappings 2460, 2480, 2490; transaction records (e.g., 2450), and/or support logic 2470, 2475.

Smart contracts implemented in accordance with many embodiments of the invention may store balances of blockchain addresses in balances mapping 2490 data structures. Balances mapping 2490 data structures may act as key/value stores with blockchain addresses as keys and balances as values. As such, queries for balances of blockchain addresses not stored in the balances mappings 2490 may return values of 0. Additionally or alternatively, queries for balances of blockchain addresses that are stored in the balances mappings 2490 may return corresponding stored values (e.g., 10 ETH).

As the present disclosure discloses using commit transactions (specifying actions) followed by reveal transactions (validating the commit transactions and triggering the actions), smart contract architectures implemented in accordance with various embodiments of the invention may deviate from the (e.g., ERC-20) standard. In particular, transactions including but not limited to actions transferring token amounts from sender blockchain addresses to recipient blockchain addresses may require multiple separate calls to the smart contracts 2400. Specifically, singular actions may depend on a call to a transfer commit function 2420 and a call to a transfer reveal function 2430.

Generation of commit transactions 2450 may be initiated by calling transfer commit functions 2420. These calls may incorporate parameters that may include (but are not limited to) sender addresses, recipient addresses, and amounts of tokens included in the corresponding transactions. In some embodiments, users may call functions of smart contracts 2400 using systems including but not limited to digital/blockchain wallets.

Generation of the corresponding reveal transactions may be initiated by calling transfer reveal functions 2430. These calls may incorporate parameters that include (but are not limited to) preimages of the sender and/or recipient addresses; and/or transaction identifiers.

Validation logic 2470 may use the transaction identifiers to retrieve the commit transaction 2450 from the unprocessed commit transaction 2460 (e.g., to perform the relevant validations). Validating a given commit transaction 2460 may include but is not limited to: verifying that the sender address holds a balance that meets/exceeds the amount listed in the balances mapping 2490; verifying that the preimage used in calling the transfer reveal function 2430 may be used to derive the sender address from the commit transaction 2460 (e.g., using a one-way function); and/or verifying that the sender address, recipient address, and change address are not stored in the revealed addresses 2480 data structure (e.g., that none of the sender address, the recipient address, and the change address map to "true" or "1" in the revealed addresses 2480).

When the validation logic 2470 determines that the validation is successful, the validation logic 2470 may pass the parameters of the commit transaction 2450 and the reveal transaction to execution logic 2475. The execution logic 2475 may be configured to implement the transaction and/or change the mappings in response to the transaction through actions including but not limited to: adding the sender address to the revealed addresses 2480, changing the balance in the balances mapping 2490 of the recipient and/or sender by the transaction amount; and/or removing the associated commit transaction from the unprocessed commit transactions 2460 mapping.

FIG. 24B illustrates the mapping data structure of unprocessed commit transactions in more detail. In accordance with some embodiments of the invention, the unprocessed commit transaction 2460 mapping may be associated with specific smart contracts and/or operate independently (the example displayed in FIG. 24B being the former). Details on the commit transactions 2450 may be stored in the unprocessed commit transaction 2460 mappings, including but not limited to the parameters to the transfer commit function calls in mapping data structures of unprocessed commit transactions 2460.

Additionally or alternatively, commit transactions 2450 may be indexed through transaction indices 2465. In some embodiments, transaction indices 2465 may be outputs of cryptographic hash functions applied to at least some elements of the commit transaction 2450 records. In response to calling transfer commit functions, transaction indices/identifiers may be generated to index the corresponding commit transactions. Potential transaction identifiers may include but are not limited to cryptographic hashes (and/or one-way function outputs) of: sender addresses, recipient addresses, amounts, nonces, contract identifiers, timestamps, and/or counters.

As mentioned above, when a commit transaction is received by a smart contract (e.g., 2400), for example, through a call to a transaction commit function (e.g., the transfer commit function 2420 of FIG. 24A), parameters to the transaction commit function may be extracted and stored in a data structure for unprocessed commit transactions 2460. The entries to unprocessed commit transaction 2460 mappings (commit transaction 2450 records) may include but are not limited to mappings, keys/stores (such as for a Python dictionary and/or a JavaScript object), arrays, lists, database entries, etc. Additionally or alternatively, commit transaction 2450 records may include processing indicators 2454 that indicate when the corresponding commit transactions have been validated. The processing indicators 2454 may include Boolean values set to "false" when the commit transaction 2450 is first added to the unprocessed commit transactions 2460, and which may later be set to "true" (e.g., when a corresponding reveal transaction is received, validated, and/or acted on).

Additionally or alternatively, in accordance with multiple embodiments of the invention, standard techniques such as smart contracts, soul-bound tokens, and more may be combined with the disclosed technology. Implementations of soul-bound tokens are disclosed in U.S. patent application Ser. No. 18/777,298, titled "Systems and Methods for Token Use and Protection Using Blockchain," filed Jul. 18, 2024, the disclosure of which is incorporated by reference in its entirety.

An example of a text file, representative of code implemented in accordance with several embodiments of the invention is illustrated in FIGS. 25A-25C. While the code represented in these figures is depicted in the Solidity programming language, in accordance with various embodiments of the invention, any of a variety of programming languages may be used to implement systems in accordance with many embodiments of the invention. For example, the programming languages used may include but are not limited to Ethereum virtual machine (EVM) languages, programming languages used to generate smart contracts, programming languages usable alongside Web3 configurations, and/or object-oriented programming languages.

C. Blockchain Wallet Architectures

In some embodiments, blockchain wallets may be configured to directly react to received (singular) transaction requests from users (including but not limited to requests to transfer digital assets from sender addresses in blockchain wallets to recipient addresses). In such cases, blockchain wallets may automatically submit commit transactions and/or reveal transactions on the users' behalf to blockchains. On receiving the transaction requests, the blockchain wallets may be configured to perform processes including but not limited to submitting the commit transactions, monitoring the blockchains to confirm that the commit transactions are included in blocks on the relevant blockchain(s), and/or submitting reveal transactions thus completing the user requests.

In monitoring blockchains, blockchain wallets in accordance with multiple embodiments of the invention may wait for a certain number of blocks to be added to the blockchains (e.g. to protect against a forked chain event resulting in the commit transaction being removed from the blockchain). Additionally or alternatively, when forked chain events occur, the blockchain wallets may retransmit the commit transaction(s) until they are properly included on the blockchain(s).

Hierarchical deterministic wallets, as defined by the Bitcoin Improvement Standard 32 (BIP-32) and Bitcoin Improvement Standard 44 (BIP-44) are especially common wallet implementations. These wallets provide a standard for generating a plurality of private keys from an initial master seed. An advantage of hierarchical deterministic wallets is that a specific blockchain wallet may be re-created from just the master seed, which may be generated using a seed phrase.

Hierarchical deterministic wallets implemented in accordance with various embodiments of the invention may therefore follow a variation of the BIP-32 method to generate private keys. However, the private keys may be used as preimages for wallets. Additionally or alternatively, applying one-way functions to the private keys may be used to produce outputs for uses as disclosed above. This may be particularly applicable to Bitcoin, where traditionally a wallet-generated transaction moves any remaining bitcoin after the main transaction to a new Bitcoin address for security.

Figure 26:
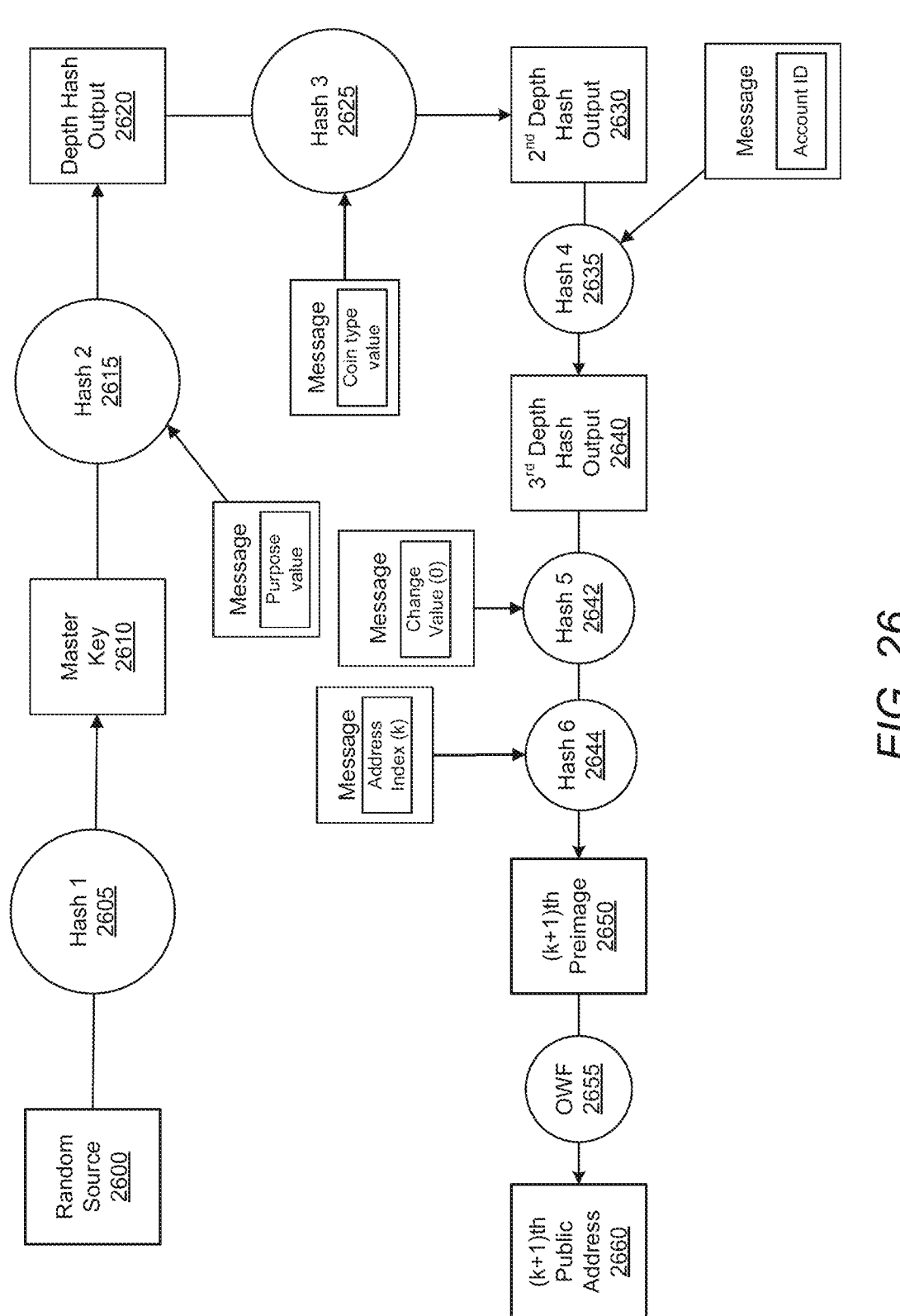
FIG. 26 illustrates a hierarchical deterministic wallet implemented in accordance with a number of embodiments of the invention.

A hierarchical deterministic wallet, implemented using configurations in accordance with a number of embodiments of the invention, is illustrated in FIG. 26. Hierarchical deterministic wallets may determine new public addresses to ensure security, based on randomized information. As mentioned above, random sources 2600 may be generated through modes including but not limited to pseudo-random number generators (PRNG), quantum random number generators (QRNGs), external sources of entropy, and/or other random processes.

The random sources 2600 may be hashed using cryptographic hash functions and/or hash-based message authentication codes (e.g., HMAC-SHA512) to produce master keys 2610. In FIG. 26, a first hash, Hash 1 2605 is used in accordance with the BIP-32 standard. For purposes of illustration HMAC-SHA512 may be used in this disclosure, but those skilled in the art will appreciate that any cryptographic hash function and/or hash-based message authentication code may be used to replace HMAC-SHA512.

The master key(s) 2610 may be hashed again, using a second hash, Hash 2 2615. Additionally or alternatively, although the hash functions are expressed as being distinct (Hash 1 2605, Hash 2 2615, Hash 3 2625), in accordance with multiple embodiments of the invention, hashes may be reused. In several embodiments (e.g., in FIG. 26), master keys may be hashed with messages including purpose values. The purpose values may be configured to comply with the BIP-32 standard (e.g., using the BIP-44 standard). In accordance with some embodiments, the ending bits of some or all hash outputs may be modified (e.g., discarding the last 256 bits) to produce depth hash outputs of a set length (e.g., a length of 256 bits). Here, a first depth hash output 2620 may be produced.

The first depth hash output 2620 may be hashed using a third hash, Hash 3 2625. In many embodiments, the first depth hash output 2620 may be hashed with message(s). As shown in FIG. 26, a message may (additionally or alternatively) include coin type values (and/or token-type values— e.g., cryptocurrency). In such cases, to comply with the BIP-32 standard, messages may include registered coin/ token type identifiers, for example, 0 for Bitcoin and/or 60 for Ethereum. In accordance with numerous embodiments, the hashing may produce a second depth hash output 2630.

The second depth hash output 2630 may be hashed using a fourth hash, Hash 4 2635. In some embodiments, the second depth hash output 2630 may be hashed with message (s) that (additionally or alternatively) include account identifiers (including but not limited to blockchain addresses). In accordance with many embodiments, the hashing may produce a third depth hash output 2640.

The third depth hash output 2640 may be used to produce a preimage 2650 used to produce the public address. In doing so, the third depth hash output 2640 may be hashed using a fifth hash, Hash 5 2642 and a sixth hash, Hash 6 2644. The third depth hash output 2640 may be hashed (by Hash 5 2642) with a message including a change value. In multiple embodiments, the change value may be set to 0. Additionally or alternatively, the output may be hashed using Hash 6 2644 along with (a message including) an address index. In this case, the output may (e.g., be modified to) produce a preimage. In accordance with several embodiments, in producing preimages, a (k+1)th preimage may be generated with an address index of k, where k may be an integer. As such, a first preimage 2650 for the coin/token type value, may be generated with an address index of 0.

Public addresses may be generated using a one-way function OWF 2655 applied to preimages. For example, a (k+1)th public address 2660 (i.e., O(k+1)) for a given coin/token type and account, generated from the third depth hash output 2634 may be generated by applying the one-way function (OWF 2655) to the (k+1)th preimage 2650. As such, a first public address O(1) for a given coin/token type and account, generated from the third depth hash output 2640, may be generated by applying the one-way function 2655 to the first preimage.

While a system for generating public addresses is described above, any of a variety of approaches may be utilized as appropriate to the requirements of specific applications. In certain embodiments, the number of involved hash functions may be increased or decreased and/or the messages may have different components. The systems may be executed or performed in any order or sequence not limited to those shown and described.

CR signatures implemented in accordance with various embodiments of the invention are not limited to use within NFT platforms. Accordingly, it should be appreciated that digital signature alternatives described herein may also be implemented outside the context of blockchain and/or unrelated to token transactions. Moreover, any of the configurations described herein with reference to FIGS. 18-26 may be utilized within any of the NFT platforms described above.

NFT Platform Publicly Verifiable Asset Linkage

One long-felt need in the context of distributed computation, including but not limited to blockchain-based commerce, is the failure to create a link between the performance of a target entity and a token that represents monetary value, without the sale of shares, securities, or other types of representation of ownership of or claims on the target entity. This problem is addressed herein.

Another problem this disclosure addresses is abuse (such as cheating) in a distributed and asynchronous environment, where packets may be lost, delayed or manipulated, and where protocol participants may intentionally drop, delay or modify data in order to gain benefit acquired at the cost of other participants. This problem is also addressed herein.

Yet another problem addressed herein is the creation of recommendation mechanisms that may not be freely manipulated (as today's reputation system may), and which may be used in non-centralized environments, e.g., based on technologies such as blockchain technology, where a central authority is not available to review and optionally delete recommendations.

One benefit of the disclosed technology is that it enables the creation of tokens that are not meme tokens (as they do relate to the performance of a target other than itself) but are also not securities in that they do not derive their value from the value of the target, but instead, from a (prespecified but potentially arbitrary and subjective) valuation of the target.

The disclosed technology enables flexibility in terms of classification of tokens. Under the Howey test, a token deriving rather than reflecting the value of the target may qualify as a security or investment contract, as tokens are purchased (an investment of money), directly represent value of the target entity (a common enterprise), and token price increases would represent gains (an expectation of profits), with no effort from the token holder (from the efforts of others). The disclosed technology would enable tokens that meet the common enterprise requirement (i.e., are considered securities) as well as tokens that do not meet the common enterprise requirement (i.e., are not considered securities).

The disclosed technology may also be used to implement tokens that are not related to assets, e.g., as a tool for horse betting. Furthermore, the disclosed technology may be used for the exchange of any type of tokens in a manner that implements fairness in the potential absence of synchronicity, e.g., what is commonly referred to as a fair exchange. Fair exchange traditionally requires either the existence of a trusted third party or a gradual release of two digital signatures, the latter requiring extensive interaction between the two or more parties involved in the exchange, which is not practical in distributed environments such as those relying on a blockchain for recording of events.

Another benefit is that it enables very flexible techniques for generating derivative value, where the derived quantity may be managed by a party different from the target to which the non-derivative opinions are related. This may be used as a method to bill for information services. It may also be used to automate a reward system related to provision of services, where an example service provider is a bounty hunter that identifies facts.

Yet other benefits are obtained from the use of the disclosed technologies, which may be applied to other distributed contexts wherein complex interactive protocols have to be executed in environments with no inherent trust in any one party.

The techniques disclosed herein are improving in multiple ways on the 2002 publication titled "Financial Instruments in Recommendation Mechanisms" by Markus Jakobsson, the disclosure of which, specifically as it relates to the futures-based recommendation mechanism, is incorporated by reference in its entirety. In doing so, systems in accordance with some embodiments may obtain new functionality and stronger security in a computational setting not addressed by the 2002 publication. The underlying component linking an opinion to a commitment of funds from the 2002 publication is expanded on herein, and the expanded solution is modified and improved to enable asynchronous commitments, blockchain-based communication methods, and techniques to address the risk of cheating in distributed environments. A person of skill in the art will recognize that these enhancements are simply exemplary and not limiting. The resulting technology thereby successfully addresses a problem the original publication did not, while strengthening security in a more vulnerable computational environment.

Whereas the disclosed technology may be used to link two assets, in the manner that will be described and illustrated with examples herein, it may also be used to link an asset to any entity or quantity for which a feature may be expressed and estimated. This will be described herein as well, and will use the same or analogous techniques to implement as the embodiments in which two assets are linked. Moreover, and as will be understood by a person of skill in the art, an asset, such as a token, may also be linked to a multiplicity of assets, entities and/or quantities using analogous techniques.

The disclosed technologies find applications in many different settings, such as to implement insurance policies in an untrusted and distributed environment, as well as other applications described herein.

A. Targets, Features, Bids and Bidders.

One aspect of the disclosure is a target. A target is an entity, whether physical or logical, that users and bots may express opinions about, e.g., in terms of whether one or more features associated with the target will become enhanced onwards. For example, the target may be a person, and the associated feature is that the target (i.e., person) will run faster in the next race than in the previous race. As another example, the target may be a company and the associated feature is a score, where an enhancement of the score indicates that the target (i.e., company) will be more successful according to some metric, i.e., license one of its technologies to a competitor or have one of its patent applications issue. As yet another example, the target may be a collection of companies and the feature is a weighted stock price of the companies in the collection, according to some predetermined weighting formula. Here, the feature being enhanced corresponds to this weighted price increasing.

A bidder is an entity, again either physical or logical, that wishes to express an opinion about the target. The opinion is expressed in the form of a bid, where this is associated with the conditional surrender of some specified resource, e.g., a loss of ownership rights to a token or parts thereof, where such token may be staked as a result of the generation of the bid. The bid is also associated with a conditional gain of a specified resource, e.g., the obtaining of rights to a token or parts thereof, where the obtaining of rights may be automated and conditioned on the evaluation of a contract associated with the bid, with the target, and/or the feature or features. An opinion may be information expressed by a human user and fed to a software or hardware agent associated with the user; it may also be algorithmically determined by an agent with access to inputs related to the target and/or the feature(s). These inputs may be represented on a blockchain, but may also be obtained from other data sources, including non-public data sources. The processing of the inputs determines a likelihood of one or more predictions, where these predictions in turn correspond to future states or expressions of the features of the target in question.

Figure 31:
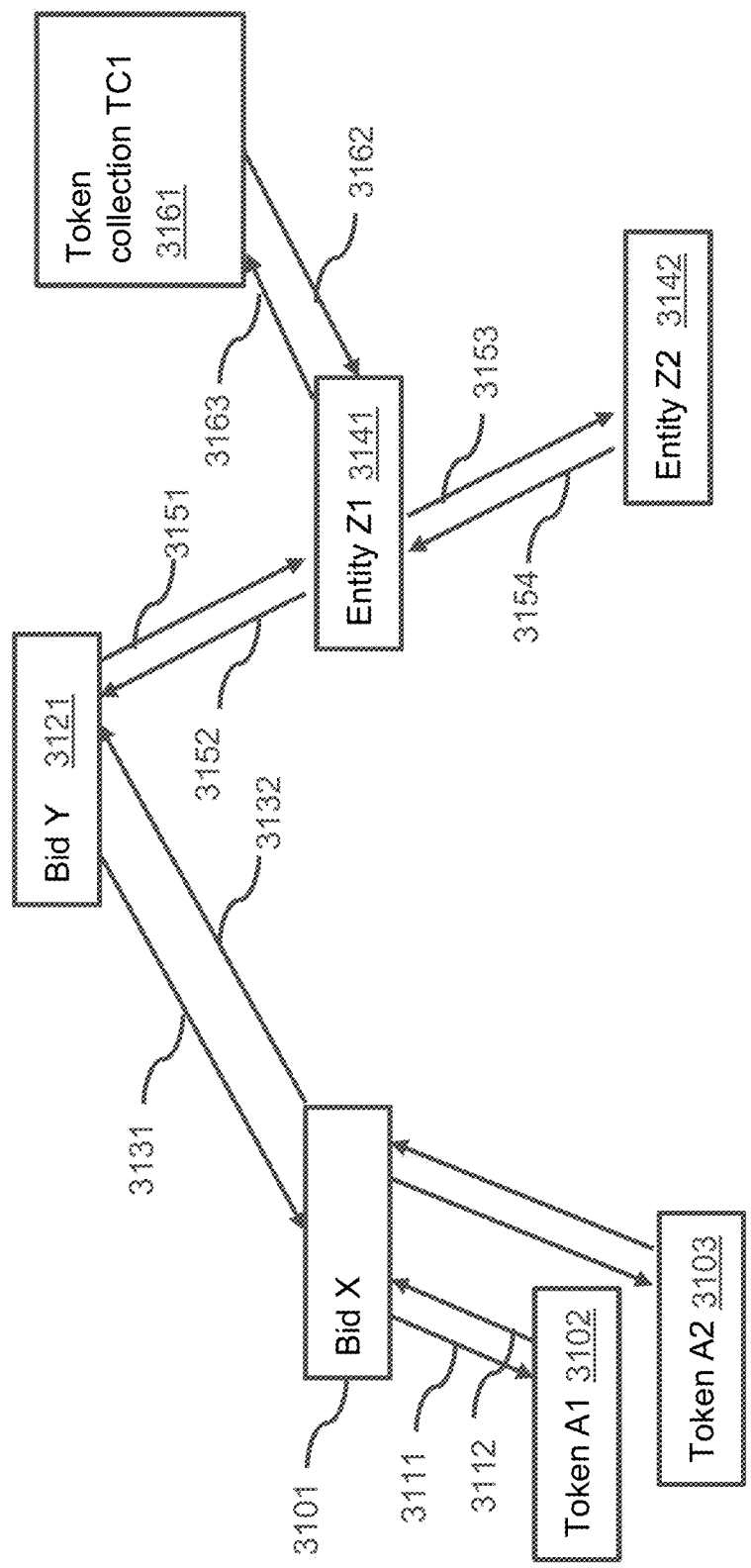

In one alternative application, the bidder is a user or organization that wishes to purchase insurance. In this context, the bid may be an insurance offer from an insurance company, and the counter-bid a request to purchase such insurance. To simplify the denotation, as we describe the technology underlying such applications, we will still use the same terminology as described above, e.g., bid and counter-bid. In this disclosure, we may sometimes refer to both "bids" and "counter-bids" simply as "bids." Bids correspond to one or more tokens, which may be connected in a graph structure (e.g., as illustrated in FIG. 31.) Bids may, furthermore, not only refer to financial transactions, but also assertions, promises, and expressions of conditional transfers, including of access rights.

B. Promise Tokens

In one embodiment, an insurer may commit a full amount of payout of the policy, where the payout (i.e., transfer of funds) would be governed by a policy that takes as input an evaluation by a specified party, which may be the insurer or a trusted third party. The full amount of the payout could be represented by one or more tokens that are conditionally transferred to the insured party, based on the policy. While in many cases disclosed herein, funds (or other resources) may only be committed once, to avoid double-spending, this is not practical in some settings. Instead, the insurer may commit to paying the insured up to a specified amount, where this promise is represented as a token associated with, referring to or including the terms of the insurance. In addition, a re-insurer or other trusted third party may commit to paying the insurer a specified amount, in a similar arrangement, which may be hierarchical and with multiple levels. One or more of these promise tokens may refer to a pool of tokens that anybody may verify still belonging to the insurer or re-insurer(s). These may be represented as an amount and one or more addresses where the tokens are held, in order to allow replacement of tokens within this pool. Since the insured amounts of one or more policies may be publicly audited, and the amount of the funds in the pool may be determined, it is possible for a third party auditor (including a potential insured party) to assess the extent to which the insurer and/or re-insurer have what this party determines to be sufficient funds to cover the likely costs of the insurer/re-insurer, based on probabilistic models and risk assessments related to the policies. Aspects of promise tokens and related technologies were disclosed in co-pending application titled "Instant NFTs and Protection Structure" by Madhu Vijayan, Markus Jakobsson, Keir Finlow-Bates and Stephen C. Gerber; "Token Creation and Management Structure" by Markus Jakobsson and Stephen C. Gerber; and "Improved Token and Resource Management" by Markus Jakobsson, and Keir Finlow-Bates.

The use of promise tokens in the context of the instant invention is not limited to the use in the context of insurance, but may be used for any exchange; moreover, the use of promise tokens is not limited to one party of an exchange: The disclosed technology enables an arbitrary graph of conditional commitments to be established, where the validity of such a graph may be determined based on the collection of nodes in the graph and their associated committed resources, such as tokens. An example graph is shown in FIG. 31, described below.

Figure 27:
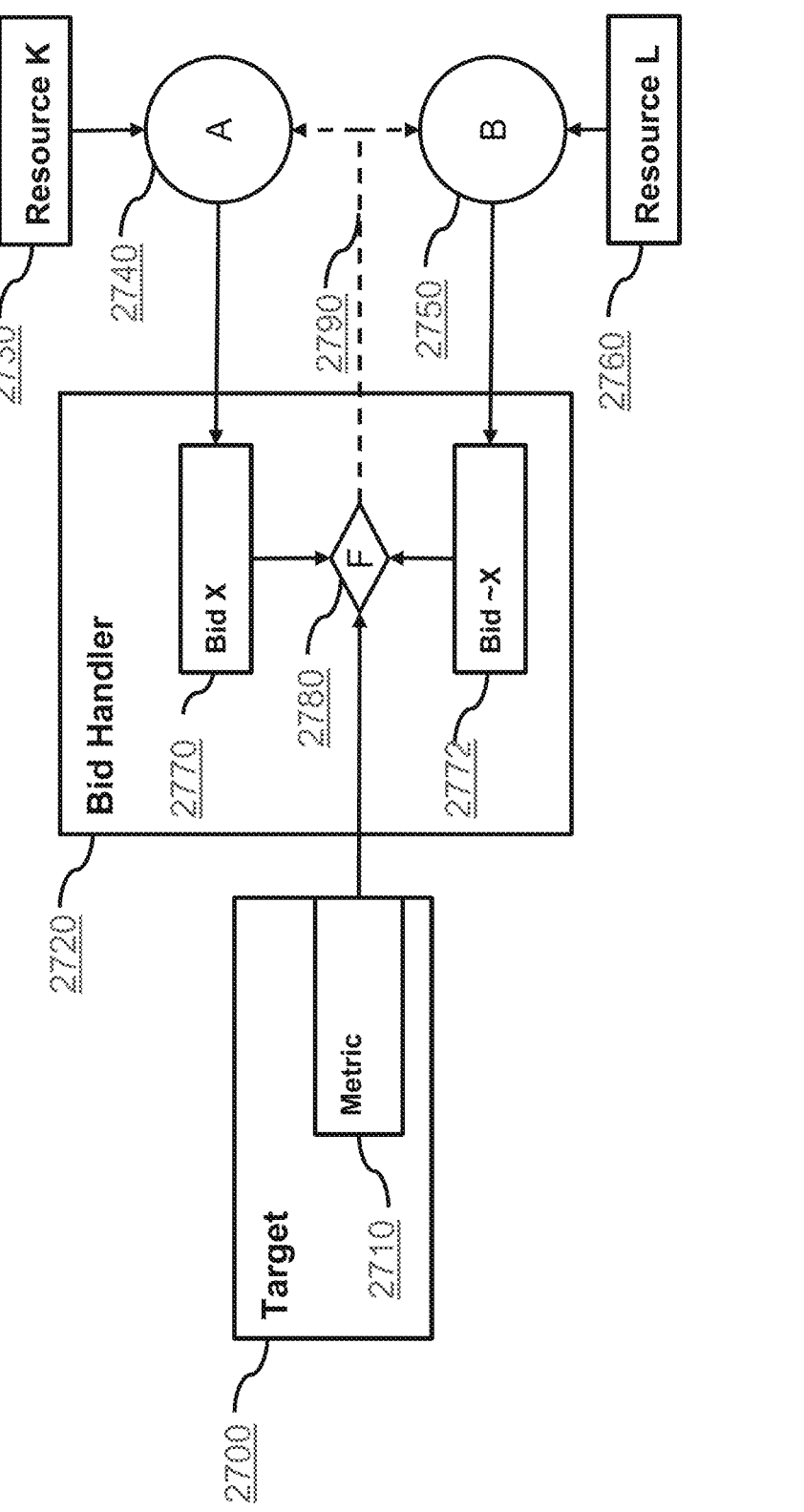
FIG. 27 conceptually illustrates the allocation of resources to bids implemented in accordance with several embodiments of the invention.

In FIG. 27 an exemplary embodiment, provided for illustrative purposes only and not meant to be limiting in any way, of a target 2700 with a metric 2710 on which entities may bid is presented. The embodiment may include a bid handler 2720, which in some embodiments may include a smart contract on a blockchain. A first resource K 2730 owned by a first entity A 2740 may be committed to a bid X 2770 in the bid handler, with the bid X 2770 relating to the metric 2710 of the target 2700, for example but not meant to be limiting, that the metric 2710 will increase. A second entity B 2750 may commit a second resource L 2760 to a counter-bid represented by bid ~X 2772), which in the example would equate to the metric 2710 remaining the same or decreasing. The bid handler 2720 may record bid X 2770, bid ~X 2772), and may hold the first resource K 2730 and the second resource L 2760 in escrow. The bid handler 2720 may include a comparator F 2780 including function- ality for determining if behavior of the metric 2710 matches bid X 2770 or bid ~X 2772), and on making a determination, may close bid X 2770 and bid ~X 2772) and transfer first resource K 2730 and second resource L 2760 to either first entity A 2740 or second entity B 2750 depending on whether bid X 2770 or bid ~X 2772) was successful.

In other embodiments, a proportion of first resource K 2730 and/or second resource L 2760 may be returned to each of first entity A 2740 and/or second entity B 2750, with the proportion calculated from an amount by which the metric 2710 has changed.

In some embodiments, the bid handler 2720 may claim a pre-determined percentage of first resource K 2730 and/or second resource L 2760 as a fee for processing the bids.

In some embodiments, the bid handler 2720 is a distrib- uted entity, whereas in others it is a centralized entity. In the case of the distributed entity, one way to implement this is using smart contracts that are publicly verifiable.

C. Evaluators

Another aspect of the disclosure is an automated evalu- ation of a feature, where this may be performed at pre- scheduled intervals, and where the evaluation may take as input one or more data elements. One such data element may be a digitally signed record, where the record specifies (explicitly or implicitly) or more targets, one or more features, and one or more expressions of opinions. Another representation of such a data element is one or more data elements that have been attested by one or more trusted parties, and stored on a blockchain. Examples of trusted parties include distributed parties that operate using a con- sensus mechanism, or a participant that has staked an asset that may be taken away from him, her or it if a collection of peers agree to do so, or a party that derives its trust from having a reputation of providing valid assertions only, for example, a blockchain oracle. The evaluation of the features is different from the determination of the opinion, as the opinion is a probabilistic statement about the future, whereas the evaluation of the one or more features is deterministic and related to the past, including the recent past. The evaluation of features, e.g., by a trusted party, results in a publicly determinable state that is used as the input to the conditional surrenders of assets, the conditional receipt of assets, or any other modification of access or ownership rights associated with the accuracy of one or more bids. Here, the accuracy is determined by comparing one or more opinions and one or more assertions in the form of trusted data about features.

We may refer to parties performing the evaluation of features as "evaluators"; these entities may be centralized or distributed; may obtain human input or be fully automated; may be based on a deterministic algorithm such as an expert system or may be represented as an AI that improves its performance by generating a loss function and determining the correctness of its outputs based on future observations.

D. Example Applications

An interesting result of the disclosed technology is that the features and the bids associated with these may be used as a method to crowd source intelligence generation, where the intelligence relates to a prediction of the state of features associated with targets. As a result, one possible use of the disclosed technology is a recommendation system that may only be manipulated at a cost that depends on the number of participants with knowledge of the underlying likelihoods of the features related to the specified targets. Another result of the use of the technology is a new class of tokens that are neither securities nor meme tokens, but which inherits beneficial properties of both of these classes of tokens. Other uses include conducting crowdsourced political polls for elections, determining public sentiment for sporting events, assessing allocation of resources for public projects, and performing A/B testing on potential products, for example but not limited to, by providing two consumer groups with tokens of commercial value, and providing members of each consumer group with a possibility of allocating some or all of the tokens in return for discounts on future purchases of product A or product B, thus obtaining a relative valuation from the two consumer groups of a value of product A versus product B. A person of skill in the art will recognize that this is a non-limiting list of example uses.

In another application, different users may be allowed to commit to purchasing one or more products at costs speci- fied by the users, based on the committed amounts exceed- ing a threshold value that may be determined after the commitments. This enables a determination of what the market value of a given (potentially hypothetical) product is. The user may specify a time limit or additional conditions identifying when the bid should be considered valid; such conditions may be specified using a smart contract, for example.

E. Example Token Benefits

A token may provide a benefit to its owner. For example, if a party A acquires a token B related to the patent portfolio of company C, then the ownership of B gives A the right to a discount X on a patent license from C. In one embodiment, this discount is paid for by the issuer D of token B, where D may be the same as C but does not have to be. This discount may be paid for by B selling a token B2 of the same type as B, and wherein the discount X may relate to the price of B2, e.g., set to be 10% of the price of B2. This could be seen as the new investor E that acquires B2 is providing the discount to A.

In one embodiment, the issuer D may, in one time period, mint new tokens to match the exact cost of the license discounts paid out in that same time period. This way, the issuer D will not run out of tokens over time. In one embodiment, the discount X associated with C diminishes over time, e.g., start at 10% of the price of the market price of the token, then one year after minting the discount is reduced to 9.5%, and the next year to 9% of the market value of the token, and so on until the token no longer provides a discount. This could be put in place to mirror a diminishing value of a resource, e.g., to mirror the fact that patents expire or real estate (which is another form of asset that tokens may be linked to) diminishes in value, at least in some situations, due to wear and tear of buildings. Any policy may be used to tie the discount to an observable quantity, such as a value of a stock, the rate of inflation, the number of gold medals acquired by a given Olympic team, etc.

F. Example Token-Based Coupons

The target of the discount, as described above, could be determined by a policy or be stated in the token, and may provide an opportunity for advertising in that it may be used as a coupon that provides its holder with a discount, e.g., upon surrendering of the coupon. Other relevant technology for advertising as disclosed in co-pending application titled "KYC-Enhanced Blockchain Technology with Applications to Advertising and Security" by Keir Finlow-Bates and Markus Jakobsson; "Automated Blockchain Based Recommendation Generation, Advertising and Promotion" by Markus Jakobsson and Stephen C. Gerber; "Targeted Execution Environment" by Markus Jakobsson; and "Advertisement Portability Methods" by Markus Jakobsson and Stephen C. Gerber. In one embodiment, such coupons may be tied to a given user, a concept referred to as being "soulbound" or "anchored." Anchored tokens were disclosed in provisional application 63/213,251 filed on 22 Jun. 2021, titled "Token Creation and Management Structure", by Markus Jakobsson and Stephen Gerber.

G. Access Delegation

In one embodiment, the owner A of a token B, as described above, gives the owner the right to delegate the resource access rights associated with B to a third party, e.g., in response to receiving a payment or other benefit from such party. For example, the owner A may have received a discount to a resource, such as a patent license. Instead of exercising this right, A may enable a third party to exercise it. When the token B has the capability of this right being delegated, we refer to it as having a delegatable benefit, whereas when it does not, we refer to it as having an anchored benefit. One special form of anchored benefit is one that never may be transferred to a third party, including at the transfer of the token B to this third party, or staked on behalf of the third party. Another option is for the rights associated with token B to be transferable but not immediately accessible after the transfer. They may, for example, enable access rights two months after the transfer. This may be controlled by a policy associated with B. This policy may associate the right with party A even after the transfer of token B, or for a set time period after the transfer, or until a condition specified in the policy associated with B is satisfied.

H. A Hierarchy of Tokens.

In one embodiment, a right is implemented as a token R, and the right is associated with another token, such as token B described above, e.g., by R being assigned to the ownership if B, which may be done by indicating the ownership of R as being a unique identifier associated with B, e.g., a public key, a serial number, or a location on a blockchain or other distributed storage such as the IPFS. This enables arbitrary policies to be implemented for both R and B, whether these policies are linked to each other or not. For example, it could result in a delayed transfer of R after B has been transferred. This is not limited to two-level hierarchies, as will be understood by a person of skill in the art. Some of the associated policies may dictate that a token gets transferred along with its owner-token, other may indicate a delayed or conditional transfer, and yet others may be anchored, whether to a given token in the hierarchy or to the owner of the top-most token, e.g., B in the example with only two levels. Tokens owning tokens was disclosed in co-pending application titled "Systems and Methods for Token-based Asset Ownership." The transfer of R after a predetermined period of time may be enabled through an auto-executing smart contract, as disclosed in co-pending application 63/609,747 titled "Trustee-Monitored Wallet Transactions" by Markus Jakobsson and Keir Finlow-Bates filed on 13 Dec. 2023.

In one embodiment, the token that is transferred is a multiplicity of tokens or associated rights, whether these are independent from each other and simply conveyed in the same transaction, or if they are structured in a hierarchy of tokens (and associated rights), where one token controls, gives rights to, or obtains rights from another token.

I. Complex Structures

In one embodiment, a token of type A is used to reward bidders that make accurate bids, e.g., by minting or transferring elements of token type A to such bidders. The cost charged to make a bid may also be expressed in terms of token A, in which case the value of the token of type A becomes an indicator of the interest in making bids. Alternatively, the cost charged to make a bid may be expressed in the form of the staking of a token of type B, where A and B are distinct. This gives rise to a market for exchanging token of type A with other types of assets, including token of type B. A bid may relate to a target that is a token of type A, corresponding to an expression of a likely trend for the tokens used as reward in other usages of the technology. This does not require any collaboration between the issuers of tokens of type A and the issuers of the tokens in this latter bid; nor does it require any collaboration in terms of the trusted entities (whether distributed or not) that underlie the determination of what opinions were valid (i.e., matched the features to which they were related.) The creation of complex structures may be performed to create outputs that are used for the training of an AI, where the AI may be used to determine values of resources, interest rates, or be used to identify anomalies, fraud and/or changes in behavior of monitored elements.

J. Implementations Using at Least One Contract

The execution of the agreement may be implemented using at least one contract. Two parties agree on a condition C, which specifies under what conditions a payment will be made to the first party vs to the second party. For example, C may specify that at the end of the month, if the number of issued patents of a specified organization X exceeds Y, then the first party is paid a first amount, and otherwise the second party is paid a second amount that may be different from the first amount. The two parties may agree that for them to agree to C, the first party will pay a third amount while the second party will pay a fourth amount. The currency of these four amounts (e.g., the first to the fourth) may be in different currencies or may be in the same currency. For example, a first user may be required to pay a second user ETH 2 if the second user's bid matches the condition of C, whereas the second user must pay the first user ETH 3 if the first user's bid matches C. This may be achieved by the first user making a conditional payment of ETH 2 to the second user, and the second user making a conditional payment of ETH 3 to the first user. However, it may also be achieved by the first user making a non-conditional payment of ETH 2 to the second user, while the second user makes a conditional payment of ETH 5 to the first user. Here, the conditions used in these two payments are opposites, which we may describe as the conditions being "C" vs. "not C". Alternatively, a condition C may reflect the identities of both parties and which one wins when the condition of C is matched, with the other winning when that condition is not matched. It should be noted that the two bids need not use the same currency for the commitment/transfer as the other, nor does one bid have to use only one currency. For example, a first party may set a non-conditional payment of BTC 1.2 to the second party, and a conditional payment of ETH 0.25 to the second party, based on the condition C, while the second party may set a conditional payment of $4.25 ETH to the first party based on the condition C. The non-conditional payments may be recorded after the conditional payments are committed to, and the conditional payments including in the description of the condition that the non-conditional payments are committed to within a set amount of time from the non-conditional payment. Just like two parties may join a conditional payment such as one described herein, three or more parties may do this, relative to one and the same collection of payments and/or conditional payments being committed to. One party may create a collection of possible conditions C1, C2, . . . . Cn, which may be stored along with information of the last offers made by participants, where we call a conditional payment that is not reflected by one or more corresponding counter-bids a failed offer, and one that did result in a match a successful offer.

Conditional payments and related methods were disclosed in co-pending application titled "Conditional Transaction Tokens" by Markus Jakobsson; and in "Token Creation and Management Structure" by Markus Jakobsson and Stephen C. Gerber, the disclosure of which is incorporated herein by reference in its entirety.

K. Votes and Poll Responses.

The disclosed technology may be used to transfer rights to cast votes or respond to polls and surveys, where such rights may be expressed in a form associated with a token, and where this token is transferred to a recipient and wherein the token may be anchored to the recipient entity. The anchor corresponds to a situation in which tokens may not be transferred to others. Alternatively, the token may be transferable but the associated rights are not. In some contexts, limited transferability may be desirable, wherein a recipient may request to transfer a token or associated rights to a specified trustee entity.

In some embodiments, the right may enable a rights holder to submit a response, which may be encrypted, to a designated response address, which may be an entity that causes the collection of received responses to be tallied. The tallying my be performed after a collection of responses are disassociated from their representative entities having cast the corresponding votes; this may be performed using a mix network, such as disclosed in the 2003 publication titled "Making Mix Nets Robust For Electronic Voting By Randomized Partial Checking" by Markus Jakobsson, Ari Juels and Ronald L. Rivest, the disclosure of which is incorporated herein by reference in its entirety.

L. Template Contracts

A template contract is a contract that may be customized, e.g., by specifying thresholds, quantities, beneficiaries, and dependencies. To simplify the denotation herein, we will use template contracts and contracts interchangeably, with the understanding that a bid includes at least one contract template that has been customized at least to the extent of being possible to evaluate in terms of an outcome based on a condition. A template contract may be customized, for example, to specify the beneficiary of the outcome, i.e., what party will profit based on at least one underlying set of observations and the associated customized template contract. A dependency, which is optional, is an added requirement for the validity of the contract, where this requirement may state that there is a corresponding matching bid, e.g., a bid referring to the contract but with a beneficiary that is selected if and only if the beneficiary identified in the bid that is being matched does not obtain the payout associated with winning the contract. A dependency may also state a fraction of an amount to be associated with a matched counter-bid, based on an amount specified in the bid and an amount specified in the counter-bid. For example, a bid may include a contract that identifies the transfer of 5 units of an asset class Y to a counter-bidder making a bid of X, based on a condition specified in or implicit in the contract of the bid. The dependency may then clarify that a counter-bidder making a bid of X/2 would obtain 2.5 units of Y if the condition is satisfied. Dependencies may not always imply linear scaling, however. For example, a dependency may specify that the counter-bidder making a bid of X/2 would only obtain 2 units of Y if the condition is satisfied. As another example, the dependency may specify that the bid is only valid if one or more counter-bids satisfying a given requirement are made, e.g., that a total of X is pledged or transferred in one or more counter-bids, meaning that a lone counter-bid of X/2 is not sufficient to make the bid and the counter-bid a valid pair. Invalid pairs do not result in conditional transfers, based on the outcome of the determination associated with the contract(s).

In some embodiments of the present disclosure, policies or conditions associated with the contract may be altered by bids made, e.g., based on one or more policies or formulae associated with the contract(s) associated with the bids. For example, a contract may implement one payout structure if all bids are made using fungible tokens, but a second payout structure if a bid is may that includes a non-fungible token. In another example, another payout structure may take effect if the total sum of extant bids exceeds a predetermined number, or a number determined from other data retrieved from a blockchain, either before, during, or even after bidding is taking place. Changes to payout structures may include one or more of: adopting a different scaling model, excluding a subset of bids (or all bids) based on criteria applied to each bid, altering transaction fees claimed from transactions placing bids or dispersing payouts, altering criteria for conditional transfers, or some other payout structure.

M. Example Links

The disclosed technology links one asset (such as a token or a record on a blockchain) to an entity, whether physical or logical. An example physical entity is a racehorse, wherein the link may relate to the performance in a specified race of the race horse to a token that represents a bet related to the race horse. An example logical entity is an enterprise, with the link relating the performance of the enterprise to a token, such as a non-fungible token (NFT) or a crypto currency token. In this latter case, the performance may, for example, be a function of the number of issued patents of the enterprise, the number of licensees of the enterprise, the number of full-time employees of the enterprise or the growth of the enterprise relative to a specified competitor, the growth being measured in revenues, or any combination of such predicates.

N. Example Rights.

In one embodiment, an owner of a token, such as one of the above-mentioned tokens, may result in a payment of a specified amount and the associated cancellation of the token. Alternatively, the token may be imbued with a validity that is based on the outcome of the associated contract, wherein invalid tokens have a first financial value and valid tokens have a second financial value, and wherein the first financial value could be zero while the second financial value could be set by a marketplace.

In one embodiment, the owner of a token may be given a right to access a resource related to the entity that the token is linked to. This resource may be a quantity of stock in the enterprise, the right to cast a vote for the board of directors of the enterprise, to receive a service generated or provided by the company. In another embodiment, the owner of the token would have no such rights at all. In yet another embodiment, the owner of the token may not be given access to the resource, but may be given access to rights associated with the resource, for example but not meant to be limiting in anyway, a token may correspond to a voting right for a share in a company, but which does not correspond to ownership of that share.

In some situations, the issuer of the tokens that are linked to an entity may have a relationship to or be the same as this entity, whereas in another situation, there is no such relationship, and the entity is not in any way involved in the generation of or management of the tokens.

O. Physical Access Rights.

Whereas a large portion of the examples herein relate to access to digital resources, the disclosed technology may also be applied to control access to physical resources. One example of a physical resource is the interior of a home or business, where the access control corresponds to unlocking a door. Another example of a physical resource is a membership in a shopping club that offers its members groceries at a discount.

To tie a token B to a user A with ownership rights to B, a biometric token may be associated with A. Biometric tokens were disclosed in co-pending application titled "Biometric Authentication using Privacy-Protecting Tokens" by Markus Jakobsson, the disclosure of which is incorporated herein by reference in its entirety. Biometric tokens may be tied to a specified user using the techniques disclosed in, e.g., co-pending application 63/213,251 filed on 22 Jun. 2021, titled "Token Creation and Management Structure", by Markus Jakobsson and Stephen Gerber, the disclosure of which is incorporated herein by reference in its entirety.

P. Example Types of Assets, Rights and Resources.

An asset may be a fungible or a non-fungible token, a digital representation of a promissory note or similar instrument, or a logical resource such as a wallet with its contents and access capabilities. Example resources include but are not limited to rights to transfer assets, rights to access digital resources, rights to access physical resources, along with the related resources. A right may be an access capability to a token or resource, and a resource may be a container of tokens, data (including DRM protected data), or capability to execute a given script in a specified computational environment. A person of skill in the art will recognize that these are all non-limiting examples identified herein for illustrative purposes.

Q. Proxy-Based Bids

Two or more parties may commit funds to be kept by a trusted proxy, along with descriptions of conditions related to the transferred funds, and wherein the trusted proxy decides of when a condition may be evaluated, and determines what party should receive what amount as a result of the determination. The trusted proxy may be a centralized or a distributed party, and may correspond to a staking-based consensus mechanism.

Users may also generate bids that correspond to payments made to each other, wherein one or more of the payments will be reversed, based on conditions associated with the bids, e.g., identified in the payment request. Here, the reversal may be performed by a trusted entity, such as a proxy corresponding to a consensus mechanism. One example way to reverse transactions was disclosed in co-pending application titled "Bound blockchains and autonomous smart contracts" by Keir Finlow-Bates and Markus Jakobsson, the disclosure of which is incorporated herein by reference in its entirety.

Transactions may also be reversed using a watchful mechanism, wherein the condition C dictates what transaction(s) will be reversed. Watchful technology was disclosed in co-pending applications titled "Watchful Consensus Mechanisms" by Markus Jakobsson and "Using Watchful Bridging for Blockchain Fraud Prevention" by Markus Jakobsson, Stefan Dufva, Keir Finlow-Bates and Guy Stewart, the disclosures of which are incorporated herein by reference in their entireties.

R. Specifying Beneficiaries and Addressing the Lack of Concurrency

A first bid may specify the identity, e.g., a public key or wallet address of the bidder, enabling the corresponding first bidder to be named as a recipient of funds, given the triggering of the associated conditions, for a counter-bid that matches the first bid. However, if the first bid causes the party performing the counter-bid to become the beneficiary of the associated funds transfer related to the first bid, then the identity of the counter-bidder needs to be known by the first bidder and specified in the first bid, or the first party to generate and record a counter-bid matching the first bid will become the beneficiary by virtue of naming or referencing the first bid as part of the counter-bid, and by specifying the identity (e.g., public key or wallet address) associated with the counter-bidder in the counter-bid.

In some situations, multiple counter-bids may match a bid, e.g., by the bid inviting a first quantity of counter-bids (e.g., for a specified value or of a specified number of units), and then a corresponding number of (potentially unrelated to each other) counter-bids being made and recorded, said corresponding number matching the quantity or value specified in the bid. To the extent that the counterbids correspond to a greater quantity than invited by the bid, the first counter-bids to be recorded are fulfilled, and a remaining number may be fulfilled in part. Alternatively, in a situation of oversubscribed counter-bids, other tie breaking mechanisms may be used, e.g., allowing each counter-bidder a fraction of the bid that causes all counter-bidders to obtain some fractional participation. Alternatively, a counter-bid made in excess of a previous bid may be seen as an invitation for matching counter-counter-bids, which would profit under the same condition as the original bid.

A bidder may be a different entity from the beneficiary of a given conditional transaction, which finds applications in insurance, wherein a first party may negotiate and pay for an insurance policy, corresponding to making a bid or a counter-bid, and specifying a third-party beneficiary to be provided a benefit if some condition specified in the bid and/or counter-bid are satisfied. Methods to implement insurance has also been addressed from different manners, while still compatible, in co-pending application titled "Trustee-Monitored Wallet Transactions" by Markus Jakobsson and Keir Finlow-Bates; and "Token Insurance Technique" by Keir Finlow-Bates and Markus Jakobsson, the disclosures of which are incorporated herein by reference in their entireties.

Figure 28:
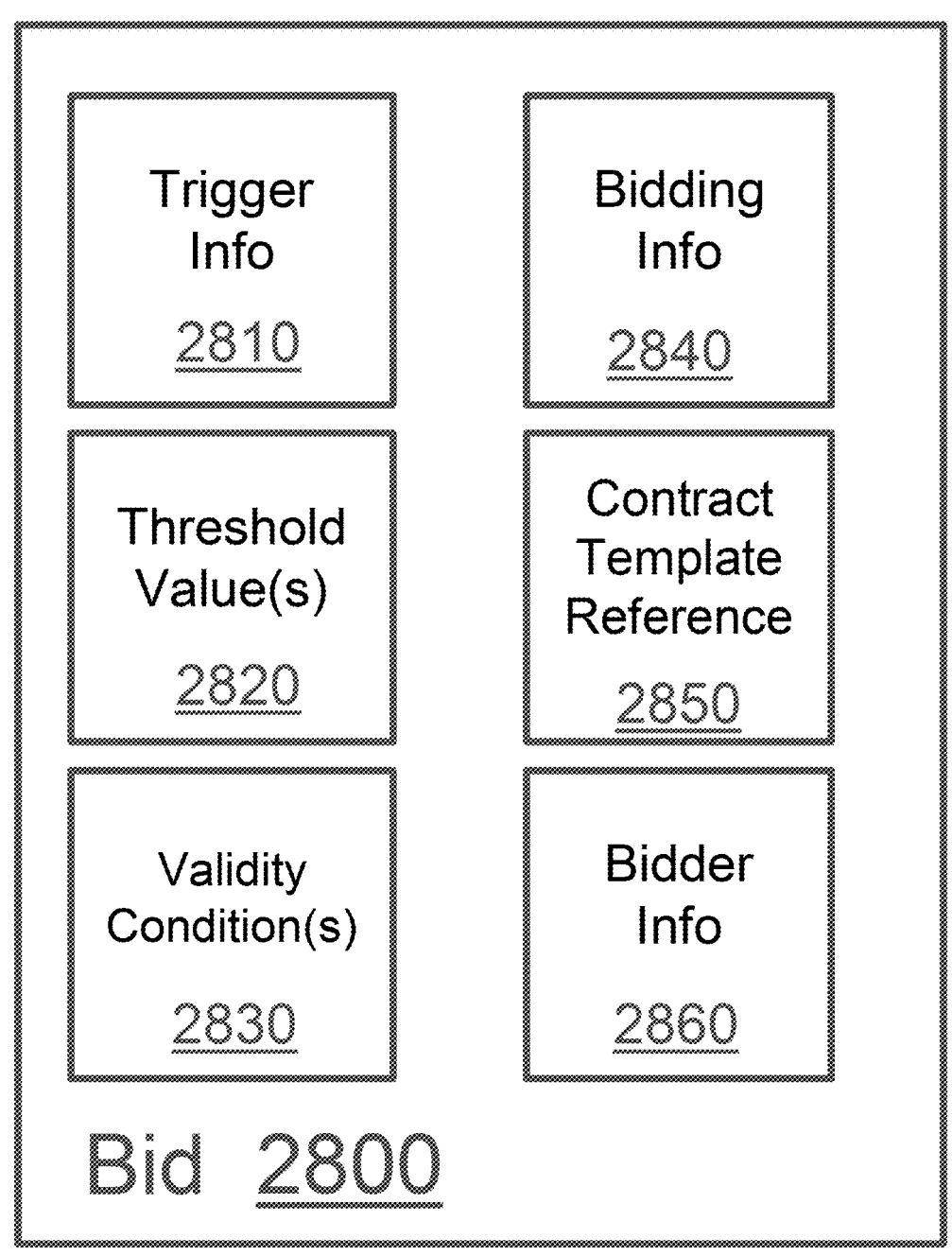
FIGS. 28-29 illustrate bidding configurations implemented in accordance with many embodiments of the invention.

FIG. 28 illustrates a bid 2800, including trigger info 2810, threshold value(s) 2820, validity condition(s) 2830, bidding info 2840, contract template reference 2850 and bidder info 2860. The trigger info 2810 may identify one or more events that will cause an evaluation of whether a bid has been won by one or more bidders, such as the observation of a given event, the absence of a given event at a specified time, or one or more events and/or absences of such. The threshold value(s) 2820 identifies thresholds that are associated with a given bidder, identifying values or ranges of values for observed quantities that lead to a win for the bidder. The threshold value(s) 2820 may be expressed as a function of observed quantities. The validity condition(s) 2830 specify when a bid is valid, e.g., under the condition that a matching counter-bid was recorded within a specified time period, and that this counter-bid satisfies some criteria such as the value being committed. The bidding info 2840 may include the value committed, such as 3 ETH or 1.23 BTC. The contract template reference 2850 indicates or specifies a general outline of the terms of the trade, to which the trigger info 2810 and threshold values 2820 are applied to allow for an evaluation of what party or parties won. The contract template reference 2850 may also indicate the conditions under which counterbids must be made, e.g., the duration of a time interval after the recording of bid 2800 during which a counter bid may be recorded and be considered in the context of bid 2800. The contract template reference 2850 may also specify events before which bids must be made. The bidder info 2860 may specify the identity of the bidder, e.g., a name, an email address, a wallet identifier, one or more public keys, or any unique identifier used for the purpose of determining identity.

S. Hidden Bids

A contract C may be configured by adding references to triggering events; policies determining who "wins" based on one or more triggering events being observed; threshold values (such as values indicating how to evaluate the policies); conditions identifying when C is valid (e.g., based on a minimum number of bids and/or counterbids); specifications determining how bids may be made, including when, and more. In one embodiment, one or more parties may commit obfuscated bids by providing, at a first time T1, a bid B1 that includes an obfuscated component, such as an encrypted component or a hashed component. One such example component may indicate an amount, one or more threshold values, or other terms associated with the contract. At a second time T2 after T1, information is provided that enables the de-obfuscation and verification of the previously obfuscated component, thereby enabling a cleartext bid B2 to be generated from B1 and the provided information. Alternatively, the component may be obfuscated by having it encrypted and provided to an escrow authority that will decrypt it given a triggering condition associated with C. In some instances, only "winning" bids are decrypted, enabling the bidder behind the hidden bid to maintain secrecy related to at least some portion of the bid until it is determined that the bid is winning. The determination of what bids are (or potentially are) winning may be performed by the escrow authority, as will be understood by a person of skill in the art. Relevant escrow technologies are disclosed in co-pending applications titled "Escrowed Wallet and Transaction Tracking Technology" by Markus Jakobsson; "Automated Wallet and Transaction Control" by Markus Jakobsson, Kenneth Rosen and Keir Finlow-Bates; "KYC-Enhanced Blockchain Technology with Applications to Advertising and Security" by Markus Jakobsson and Keir Finlow-Bates; "Improved Token and Resource Management" by Markus Jakobsson and Keir Finlow-Bates; and "Improved Token and Resource Management" by Markus Jakobsson and Keir Finlow-Bates, the disclosures of which are incorporated by reference in their entireties. All of these, as well as the other cited co-pending applications, are incorporated by reference. Where bids are described in the instant disclosure, it would be understood by a person of skill in the art that a hidden bid may be used instead of one that is not hidden. It will further be understood that there are multiple alternative ways of using encryption, obfuscation, hash functions, trusted hardware, and trusted third parties such as escrow entities to implement the effective hiding (or obfuscation) of one or more aspects of a bid, including terms, amounts, triggering conditions, identities of bidders, and more; and that the detailed approaches are merely illustrative. Hidden bids have applications to a wide range of uses including auctions, property purchases, charity events, obtaining placements in an educational institution as a student, appointing persons to positions of authority in institutions or corporations, club membership, and so on.

Figure 29:
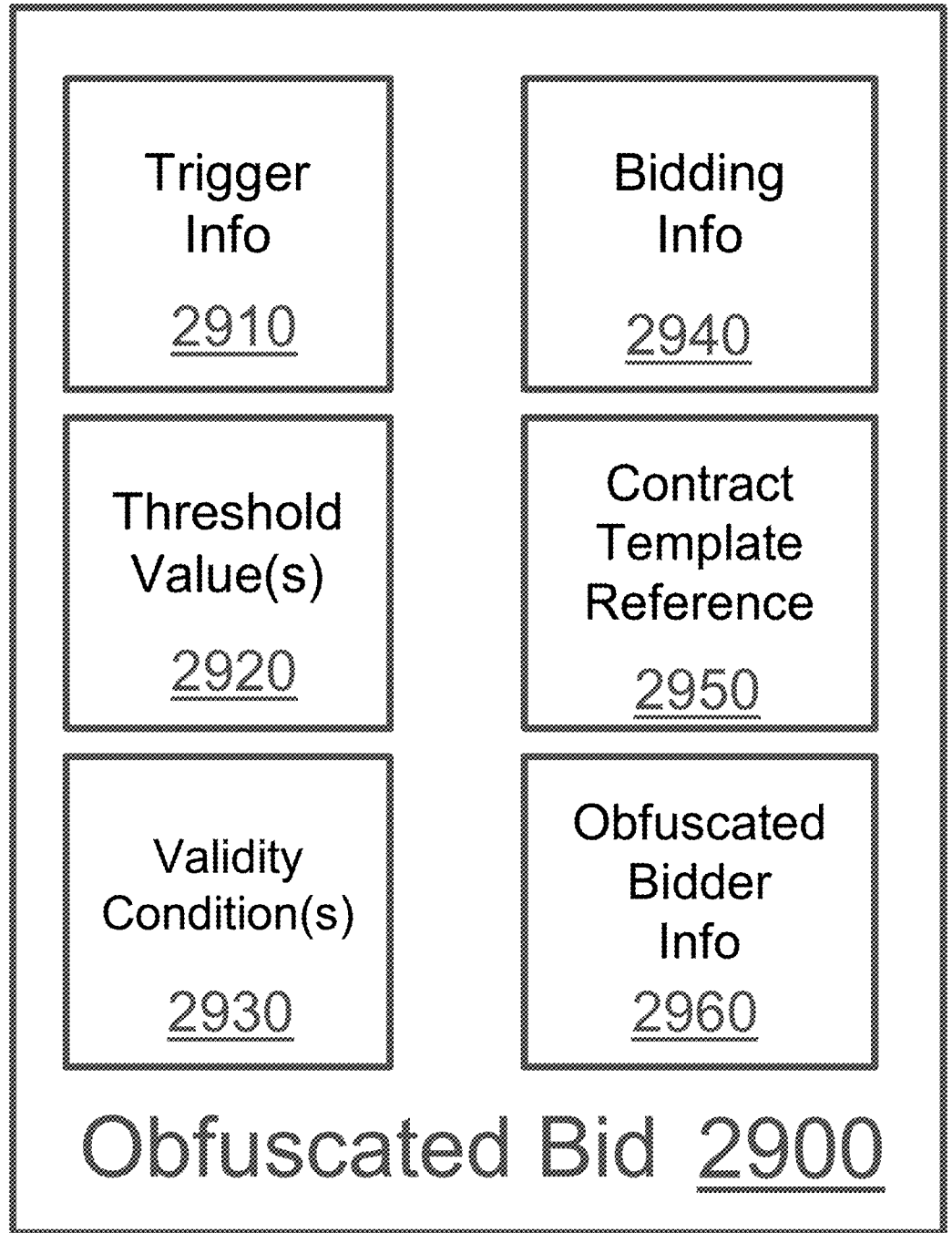

FIG. 29 illustrates an example hidden bid 2900. In this illustrative but non-limiting example, trigger info 2910 is shown as non-obfuscated, and corresponds to trigger info 2810; non-obfuscated threshold value(s) 2920 corresponds to threshold value(s) 2820; non-obfuscated validity condition(s) 2930 correspond to validity condition(s) 2830; non-obfuscated bidding info 2940 corresponds to bidding info 2840; non-obfuscated contract template reference 2950 corresponds to contract template reference 2850; and obfuscated (e.g., encrypted) bidder info 2960 is an obfuscated representation of information such as bidder info 2860. In this example, all information of the bid is accessible to the public, except the information related to the identity of the bidder, which is encoded in bidder info 2960. In one example embodiment, only the bidder may reveal its identity, e.g., by identifying a public key and a nonce which, if hashed, becomes the bidder info 2960. This would enable the user with the private key corresponding to the revealed public key to control the ownership of the one or more tokens provided to him or her as a result of winning the bid. In another example embodiment, bidder info 2960 is an encryption of the public key, wallet identifier or other unique and personal identifier of the user to which the token(s) will be assigned, where the encryption of this information is performed using the public key of a trusted third party, such as an escrow authority.

In one example embodiment, bidding info 2940 includes both the amount committed and information about the committed tokens, e.g., their public keys or other identifiers. The information about the committed tokens may correspond to an escrow authority that receives funds and commits funds, in order to decouple the identity of the bidder from the bid. The bidding info 2940 may also include encrypted transfer requests of tokens along with proofs that these encrypted transfer requests are well-formed and correspond to legitimate resources. In other example use situations, bid 2900 includes additional elements, and one or more of these are obfuscated, e.g., in a manner as described above or variations in which other combinations of information or elements are obfuscated, whether by encryption, use of hash functions, or by the involvement of one or more proxies.

T. Example Use

An example of bids with lack of concurrency may concern an election for a president. In this example, there may be two candidates-candidate A and candidate B. A first bid may be made betting on candidate A being elected by bidder M. A first counter-bid may subsequently be made at a later date by counter-bidder N that candidate B will be elected (or, similarly, that candidate A will not be elected). The identity of bidder M and counter-bidder N may be revealed through the placing of the bids, for example, through blockchain transactions digitally signed by M and N, thus revealing the public keys of M and of N. In some embodiments M and N may receive tokens representing their bids that may be able to be cashed in after the election, depending on which candidate wins. This example use scenario may have benefits for surveys and other statistical analysis of the opinions and beliefs of the population, including as a method of polling potential voters (who are the only one provided with the tokens), which may indicate demographics but not other PII (personal identifiable information). Tokens used in the betting may be distributed by different polling organizations, each one with potentially different associated demographic indicators, some of which may be encrypted so that only a pre-specified entity may decrypt them.

In an embodiment, bidding may be implemented through a use of a smart contract which is now disclosed. If, in our example, x is a token representing candidate A winning, and y is a token representing candidate B winning, bidder M may initiate proceedings by, for example but not limited to, instantiating the smart contract with 100 tokens of type x, 10 tokens of type y, and a prize-pool of 100 USDC. The 90 tokens of type x and 10 tokens of type y form a liquidity pool for the smart contract. M also mints 100 tokens of type x and 10 tokens of type y, and transfers ownership to M. This represents M's claim on the prize-pool. Other bidders may then choose to buy quantities of either token X or token y, at a cost of 1 USDC per token. After the election is completed, an oracle may provide the smart contract with the identity of the winner. If A wins, tokens of type y become valueless and tokens of type x may be exchanged at a rate of the size of the prize pool divided by the number of x tokens held outside of the smart contract per x token, and vice versa, if B wins, tokens of type x become valueless, and tokens of type y may be exchanged at a rate of the size of the prize pool divided by the number of y tokens held outside of the smart contract.

If no one bids, after the election, if A wins then M may trade their 100 x tokens for the 100 USDC prize pool, and if B wins then M may trade their 10 y tokens for 100 USDC prize pool.

If N believes that candidate B will certainly win, then N may buy all 10 tokens of type y for 10 USDC, making the prize pool 110 USDC. After the election, if A wins, then M may trade their 100 x tokens for 110 USDC, making a 10 USDC profit. Whereas, if B wins, then M may only trade their 10 y tokens for 55 USDC, making a 45 USDC loss, and N may trade their 10 y tokens for 55 USDC, making a 45 USDC profit on the wager.

U. Example Applications

Another example application is to use the closing prices associated with a series of contracts, such as C, related to a specified resource R, as a function of time, to determine a public sentiment associated with R. Here, the sentiment is expressed as a value that reflects a price that is the average, median, etc., over time. The volume of exchanges over time, e.g., measured in financial commitments per time quanta of specified durations, may be used as an indication of the certainty of the sentiment, allowing the expression of the sentiment with a certainty corresponding to a significance level.

Changes in sentiment may be compared across different resources R1 and R2, or for the same resource R related to two or more different time horizons for the sentiment. The use of the sentiment includes but is not limited to recommendation mechanisms, indicators of trust, as well as a loss function used to train AIs. For example, two or more weather reports may be rated in terms of users' trust in them, where the sentiment describes how well users believe the reports describe reality. This method may also be used in situations where there is no notion of baseline truth, or where this may not be practically determined.

V. Creating Simultaneity and Avoiding Abuse

Bids are useful when matched with other bids. However, one or more first bidders may not be assured of one or more second bidders generating bids that match the bids of the one or more first bidders, where we say that two or more bids match each other if they correspond to each other, e.g., are made relative to each other. We may also refer to a first and a second bid that match each other as being a bid and a counter-bid, where the counter-bid relates to the bid. The first bid may be made by a party not aware of the second bid or of the party that will generate it, or it may be made after the first and second bidder agreeing to generate the corresponding bids.

The asynchronous aspects of bidding could, if not protected against, be abused. For example, a cheating participant could appear to make a matching bid but then not do it, hoping to profit from the asymmetry. In such a situation, the bid that was made should not cause a transfer of funds. We say that this bid is not matched, which means that it becomes invalid. Another type of abuse may be for a party to make a bid after a long enough time that he learns information that benefits him in the making of the bid, or allows him to back out of making the bid if the situation is not favorable. Such a delayed counter-bid creates an unfair situation.

One approach to address unfairness and abuse is to make the bids, which are conditional payments based on a condition C, also be conditional on being matched, e.g., on the existence of a counter-bid. This counter-bid could be required to be recorded before a given time or before a given event takes place. This may be caused to happen after a given time, e.g., specified in the bid, where time could be relative to network time, to a count of transactions of a specified type, or to a triggering event specified by or implicit in the bid. The condition C may specify when a counter-bid must be recorded to be valid, where the absence of a valid counter-bid causes the bid to be invalid.

For example, a bid may include a nonce, and the bid may not be considered valid unless a counter-bid is made that also includes the nonce. In other embodiments, the bid and counter-bid may only be validated through a commit-reveal strategy. For example, the nonce may be an output of a cryptographic hash function, and the bid and the counter-bid may only be considered valid if a preimage of the nonce is subsequently provided. Similarly, a double commit-reveal strategy may be used, in which the counter-bid may include the nonce and a second output of a cryptographic hash function, and the bid and counter-bid may only be validated if both the preimage of the nonce and the preimage of the second output of the cryptographic hash function are provided.

Another approach involves the use of an escrow entity that collects two or more associated requests, evaluates them to determine whether there is a match, and if so, causes the matching requests, which may include bids and which may be in part encrypted, to be recorded. Techniques useful for escrowing of information are disclosed in co-pending application "Escrowed Wallet and Transaction Tracking Technology" by Markus Jakobsson, the disclosure of which is incorporated herein by reference in its entirety.

The escrow entity may be an off-line entity that only gets involved in case of a dispute. In such as situation, each bidder would generate encrypted bids, where these are encrypted at least in part using a public key of the escrow entity; prove to at least some of the other one or more bidders that the ciphertext is a valid bid; receive a counter-bid; and, release the plaintext version of its bid. If the party refuses to release the plaintext, the escrow entity may be requested to decrypt the ciphertext, and optionally to levy a penalty on the cheating bidder.

In one embodiment, a trusted wallet associated with a user is used to generate and/or commit to a bid, where the trusted wallet includes a secure computational enclave, which may be implemented in special-purpose hardware; software that is protected against abuse; or a combination of these. The trusted wallet outputs a bid, which may be encrypted, and the bid is transmitted to a party wishing to generate a counter-bid. The encryption may be performed using a public key of this party, which may also be a trusted wallet. The recipient generates a counter bid and verifies that the bid and the counter bid match, after which it causes the two to be recorded. In some implementations, one or more of the two or more trusted wallets in this example are replaced by a hosted service that is trusted by the users to act on behalf of them by performing the verifications and not enabling cheating by any party.

Figure 30:
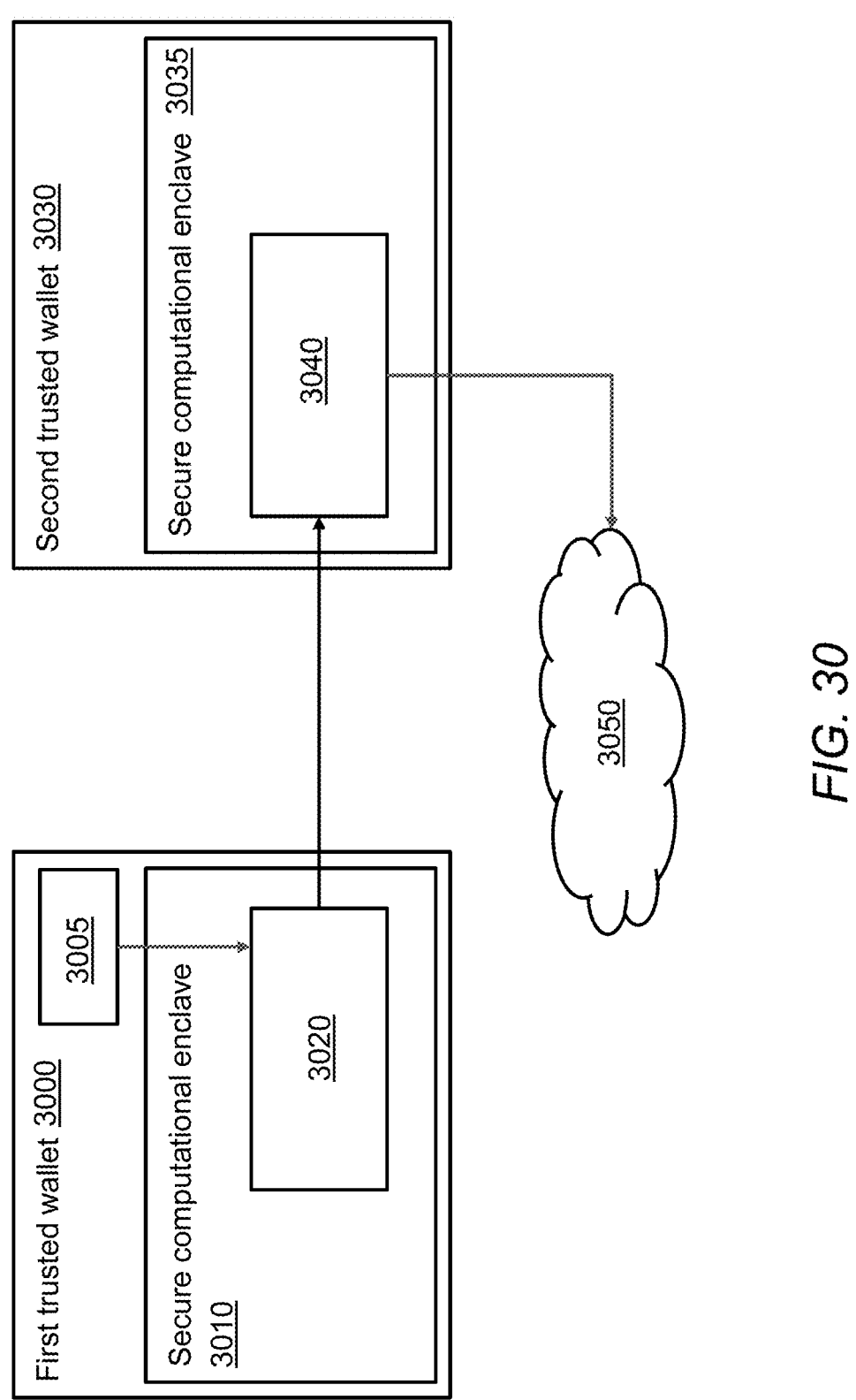
FIGS. 30-31 illustrate examples of the relationships between bids implemented in accordance with numerous embodiments of the invention.

In FIG. 30 an embodiment of a bid and a counter-bid between a first trusted wallet 3000 and a second trusted wallet 3030 is presented for illustrative purposes only and is not meant to be limiting in any way. In the embodiment the first trusted wallet 3000 may include a bid triggering component 3005 that may determine a need for a bid. The bid triggering component 3005 may be triggered through an external input from an outside entity, for example but not limited to: a user interacting with a user interface, or from trading software. The bid triggering component may construct a transaction including the bid, and may pass the transaction to a secure computational enclave 3010, which in some embodiments may digitally sign the transaction, and/or encrypt the transaction, either with a private key of the first trusted wallet, and/or a public key of the second trusted wallet, producing a first secured transaction 3020. The first trusted wallet may then transmit the first secured transaction 3020 to the second trusted wallet 3030. On receiving the secured transaction 3020 the second trusted wallet 3030 may decrypt and inspect the secured transaction 3020 to determine the bid and generate a counter bid, which may be verified to ensure the bid and counter-bid match. A second secured transaction 3040 including the bid and the counter bid, may then be encrypted with one or more of a public key of the first trusted wallet and a private key of the second trusted wallet. The second secured transaction 3040 may then be recorded, with, in some embodiments, a recording location including a data store accessible by both the first trusted wallet 3000 and the second trusted wallet 3030, for example but not limited to a shared database, shared file space, or a blockchain.

In one embodiment, the wallet 3000 includes or is connected to a presentation module, where the presentation module includes a user interface and an analysis component that assesses one or more bids, their associated policies and contexts, and provides guidance to a user. The guidance may be in the form of determining whether the inputs (e.g., bids) correspond to one or more policies associated with the user; if the inputs match a risk model determined from prior user interactions; whether the inputs match a profile selected or created by the user, and whether there are options for the user to consider. Such options may result in a configuration of an associated bid or counter-bid, or a rule that determines under what conditions (e.g., improved terms due to additional bids) a user should be contacted about reconsidering a bid or for which the analysis component should automatically generate a bid on behalf of the user.

Improved wallet-related technology implementing the instant invention may be built upon other related functionality, such as what is disclosed in co-pending applications such as "Anti-fraud wallet technology" by Markus Jakobsson and Keir Finlow-Bates; "Trustee-Monitored Wallet Transactions" by Markus Jakobsson and Keir Finlow-Bates; "Improvements to blockchain wallet technology" by Keir Finlow-Bates and Markus Jakobsson; "Automated Wallet and Transaction Control" by Markus Jakobsson and Keir Finlow-Bates; "Blockchain wallet for adding wallet identifying data to transactions" by Keir Finlow-Bates; "Profile-Based Wallet Selection and Use" by Markus Jakobsson; "Instant NFTs and Protection Structure" by Madhu Vijayan, Markus Jakobsson, Keir Finlow-Bates and Stephen C. Gerber; "Escrowed Wallet and Transaction Tracking Technology" by Markus Jakobsson; "Vulnerable Wallet Resource Control" by Markus Jakobsson; "Wallet with Modular Rights Management" by Markus Jakobsson and Keir Finlow-Bates; "Crypto Wallet Improvement Technology" by Markus Jakobsson and Keir Finlow-Bates, "Custodial Wallet Sub-Accounts" by Markus Jakobsson; and "Immersive Personalized NFT Wallet Interactions" by Ajay Kapur, Markus Jakobsson, Stephen C. Gerber, Perry R. Cook and Joe M. Rohde, the disclosures of which are incorporated herein by reference in their entireties. Other related and relevant disclosures related to these are also compatible with the disclosed technology, and may be used in combination with it, as will be understood by a person of skill in the art. These applications, as well as other applications referenced herein, are incorporated by reference.

W. Basket Tokens

In one embodiment, a first collection of tokens T1 issued by organization O1 relate to one or more resources R1, and a second collection of tokens T2 issued by O2 relate to one or more resources R2. Here, T1 may be the same as T2, but does not have to be, and O1 may be the same as O2, but does not have to be. A third collection of tokens T3 issued by organization O3 relate to one or more resources R3, where R3 includes tokens from T1 and tokens from T2. Thus, T3 is an assessment of a basket of tokens, including T1 and T2, and their underlying resources R1 and R2. The proportions of tokens T1/T2 may be algorithmically determined, e.g., according to a formula included in or associated with T3. One such formula would be to balance the ownership of T1 and T2 so that the two sets of tokens being owned have the same or similar value, according to some exchange, at given points in time. The proportions could also be balanced to reflect more of the type of token that is assessed to be most likely to make gains in terms of value onwards, where the determination may be made according to a policy maintained by O3, a set of owners of T3, or party associated with such.

X. Linking Tokens

One way of linking two tokens, such as Ta and Tb, is to transfer the ownership of Ta (for example) to Tb by assigning Ta to a unique identifier associated with Tb. Ta may, for example, represent a right that, by transferring of ownership (whether in part or in full) to Tb, enables Tb (as well as entities owning Tb) to exercise the right associated with Ta.

It is well understood that if Tb is a fungible token, then one of a large number of possible fractions of ownership may be transferred from the owner of Tb to Ta, e.g., by using a private key or contract associated with Tb to generate an assignment, e.g., a digital signature, on Ta's identifier.

If Ta is a non-fungible token, it is clear that the entirety of Ta may be assigned to Tb. However, a novel aspect of this disclosure is the notion that a right associated with Ta may be assigned to two or more entities (such as tokens), even if Ta is non-fungible. This is done using the same mechanism as disclosed above, but with the difference that the transfer of rights associated with the Ta enables repeated multiple such assignments. A policy associated with Ta may determine how many may be made. This may be done whether Ta is fungible or non-fungible. Whereas rights associated with Ta may be transferred, e.g., to Tb or to another entity such as a wallet, the continued transfer may be controlled using at least one policy associated with one of Ta or the assignment of the rights of Ta to the recipient entity, which may be done by digitally signing an identifier of the recipient along with a statement identifying the policy for further transfers. The policy for further transfers may state, for example, that the recipient may not transfer the rights to others, but that the transferred rights become anchored to Tb. They may also become anchored to an entity to which Tb belongs, e.g., another token or a wallet. The policy may, alternatively, state that the recipient may reassign the rights, but in so doing, will lose the rights associated with Tb when this transfer is done. Yet alternatively, the transferred rights may be transferred to another entity, e.g., Tc, but yet another policy associated with the rights may apply to Tc. This other policy may be selected and specified by Ta, or by Tb, or be a property associated with the specific type of rights. For example, some rights may expire after a certain time or when a specified triggering event is observed.

Another type of link between two tokens (such as Td and Te) is that a recipient token Td claims the token Te, which may signify that Td agrees to some terms associated with Te. Whereas the transfers described above are what one may call "push" transfers, this transfer between Td and Te may be described as a "pull" transfer. Td may agree to a set of rules specified by Te, for example, by generating a "transfer" assignment, e.g., using a private key of Td, or a contract used by Td. This technique may also be applied to an arbitrary entity E instead of Td, where E may be a wallet or a marketplace, for example.

In some embodiments, a combination of a pull and a push transfer is performed. For example, one entity Td may both issue a pull and a push transfer relative to Te, which corresponds to Td agreeing to some terms (the pull) as well as assigning some rights (the push). At the same time, Te may (or may not) generate one or more of a pull or a push transaction, including to Td. A given token, or other arbitrary entity E, may perform one or more pull and/or push transfers to other entities, where the resulting graph of assignments generates a graph that determines the relationship of the entities with respect to rights, commitments, and/or other properties that are associated with the pull and push actions.

Y. Example Smart Contract

There are many ways smart contracts may be used to implement the disclosed technology. In one embodiment, two or more (such as n) parties which we refer to by Pi, where i is a number, generate private keys Xi and associated public keys Yi, and generate or configure a contract CON that specifies that "If condition Ci is satisfied then assets A1 . . . . An are assigned to public key Yi". Here, Ci would correspond to a publicly verifiable condition. In addition, the contract may specify that it is only valid with respect to party Pi if Pi transfers ownership of an asset Ai (e.g., a token or portions thereof) to CON. Note that it does not matter that CON is not an entity, has no computational capability, etc. This transfer would have to be performed within a given time, for example, as described above. After all the submitted bids are identified, they are assigned to CON. After the conditions have been evaluated, e.g., a triggering event has taken place, the assets A1 . . . . An are assigned to the public key selected by the "winning" condition Ci. This is done implicitly, and no recording or transfer is needed, beyond what already took place during the transfers (which corresponds to bids). The winning party Pi may now claim ownership of the assets A1 . . . . An by (a) providing the evidence corresponding to Ci, and (b) generating a digital signature on statements determining asset transfers, as preferred by Pi, using the prove key Xi. This is a simplified example in that it assumes a winner-takes-it-all situation. However, with a slightly more complex contract CON, any legitimate division of assets may be implemented. One example division is that two or more parties get assigned committed assets according to some formula that is specified in CON; one of these parties may be a tax authority, making the associated transfer an implementation of a value added tax or sales tax. Other exemplary divisions include: the assets may be dividend payments obtained through holding shares in a corporation, the distribution of assets resulting from a bankruptcy, and the distribution of various inherited assets and possessions due from the execution of a will. In another example situation, one of these parties may be a content creator, and the associated transfer is a royalty payment. In one embodiment, the disclosed structure could be implementing a lottery, a horse race, or any other form of gambling, wherein CON is evaluated on some data used to generate a truly random or pseudo-random number, or on some event recorded by an oracle, or a combination of such types of data. The event could also relate to the occurrence or non-occurrence of a stated event within a specified time period, or variations of these examples.

FIG. 31 illustrates a graph corresponding to two bids, which may be a bid and a counter-bid or two related bids that need additional bids or counterbids to become a valid set of bids. Bid X 3101 and bid Y 3121 relate to each other, as indicated in reference 3131 and reference 3132, which may include addresses of the bids they indicate, public keys related to these bids, or other identifiers related to the bids they indicate. Bid X 3101 commits two tokens, token A1 3102 and token A2 3103, which may be fungible tokens, non-fungible tokens, or a combination of fungible and non-fungible tokens. The commitment is represented by a reference 3111 from bid X 3101 to token A1 3102, which may include an address or another unique indicator associated with token A1 3102. The commitment is also represented by a reference from token A1 3102 to bid X 3101, e.g., a digital signature relating to a public key or smart contract of token A1 3102, on bid X 3101, parts thereof, or on information indicated by bid X 3101. Similarly, bid Y 3121 is associated with committed resources indicated by reference 3151, which in this example is an entity Z1 3141. Entity Z1 3141 may be a token, or may be an organization, e.g., represented by a wallet address, one or more public keys, or other unique identifier. Entity Z1 3141 commits resources to bid Y 3121, where these resources include a token collection TC1 3161 that may be referenced 3163 using one or more addresses such as wallet addresses, public keys, etc. TC1 3161 may be implemented as a token that owns tokens, as disclosed in Provisional Patent Application No. 63/375,663 entitled "NFTs that Own Assets," filed Sep. 14, 2022, the disclosure of which is hereby incorporated by reference in its entirety for all purposes. A private key associated with the public key of TC1 3161, or a contract associated with TC1 3161, is used to commit resources (e.g., funds or NFTs) to entity Z1 3141. Entity Z1 3141 may be a re-insurer, for example. There may be additional re-insurers such as entity Z2 3142, which may be used as a guarantor of entity Z1 3141 by commitment 3141. Entity Z1 3141 may indicate the assurance provided by entity Z2 3142 using reference 3154. This is an illustrative but non-limiting example, and it will be understood that there may be additional bids and/or counterbids, and that they may commit resources in the manners described in FIG. 31. The commitments such as the commitment by entity Z1 3141 to bid Y 3121 may be implemented using a bid, e.g., using the same structures disclosed herein, or it may be using alternative methods or variants. Bid X 3101 and bid Y 3121 may be implemented as disclosed in FIGS. 28 and 29.

Systems and methods for bid implementation, operating in accordance with a number of embodiments of the invention are not limited to use within NFT platforms. Accordingly, it should be appreciated that the financial applications described herein may also be implemented outside the context of an NFT platform network architecture unrelated to NFTs. Moreover, any of the systems and methods described herein with reference to FIGS. 27-31 may be utilized within any of the NFT platforms described above.

NFT Platform "Know-Your-Customer"-Enhanced Blockchain Technology

Know Your Customer (KYC) is a common banking requirement for many jurisdictions. It largely corresponds to a requirement to avoid situations in which banking accounts are created for deceased people, people or organizations that do not exist, or in the names of entities that are not involved in the creation of the account. Today's blockchain technology does not support KYC, which creates a legislative disadvantage for payment technologies related to blockchain, as governments may decide to curb the deployment or use of such technologies in the absence of desired control mechanisms.

In this disclosure, an array of novel technologies enabling KYC mechanisms is described. These find applications in financial uses of blockchain, but also in other contexts, where there are no government mandates today to verify ownership, but where this may become important onwards. One illustrative but non-limiting example of this is to establish a link between social networking accounts and the true entities registering these; doing so is desirable to address fraud, online abuse of minors, bullying, propagation of misinformation, and other related undesirable uses of social networking. By enabling such verification, blockchain-based technology will vault to the forefront of protection of vulnerable users.

The disclosure also describes the use of the disclosed techniques in settings not traditionally related to KYC, e.g., advertising, social networking, automated security configurations, etc. The very fact that the disclosed technology has such a wide-ranging set of applications of significant importance indicates the foundational nature of the instant invention.

A. Grouping Information and Certifications

In one embodiment, a collection of records are stored. Each record includes one or more information elements and one or more certification elements.

An information element may include personal information, information about an organization, information about an achievement, information about another related record, a public key, etc. More examples of information will be provided in this disclosure, and these examples are for illustrative purposes only and are not intended to be limiting.

A certification element is relative to one or more information elements. For example, it may indicate that personal information has been verified, or that a related record has been verified to be associated with the record in which the certification is included or associated. The certificate includes an authentication field and an authenticator field, where the authenticator field indicates the identity of the entity generating the certificate and the authentication field may include a digital signature on an associated information element. The authentication field may also be generated using a consensus mechanism, i.e., its validity is assessed based on the consensus of a collection of validators (such as miners or proof of stake entities). In some embodiments, authentication may require human intervention, that is, the authentication may be conducted or triggered by a human being inspecting the one or more information elements, e.g., using a visual interface, before performing the authentication. In other embodiments, authentication may be conducted by an automated authenticator, for example but not limited to, an Artificial Intelligence (AI) performing a mechanical inspection of the one or more information elements before performing the authentication.

One or more information elements may be encrypted, e.g., using a public key encryption scheme, where the decryption key may be held by a trusted party, and where this trusted party may be a distributed entity. The decryption key may be distributed using a threshold sharing scheme, such as Shamir secret sharing. One example of a public key encryption scheme is ElGamal encryption; another is RSA encryption.

One or more of the certificate elements may be encrypted. This may be done using a public key different from the key used to encrypt information elements, or the same. This determines what entities may decrypt the certificate elements. In some embodiments, the authentication field is encrypted, and in some, the authenticator field is. In other embodiments, both of these are encrypted, whereas in some embodiments, neither is. In some embodiments, a variety of elements are fields are encrypted, based on the type of data being encrypted, the settings of the users with whom the data is associated, the jurisdiction of such users, and/or the requirements of service providers associated with the records. Some fields and elements may be replicated, where each copy is encrypted using a public key that may be different from one used in another field or element. This enables the decryption by different trusted entities, i.e., different branches of the government, trusted parties associated with different jurisdictions, or more generally, by different stakeholders with differing motivations governing their actions.

Records like these may be stored on a blockchain, on private storage, on the Inter Planetary File Storage (IPFS), or a combination of such storage types. Some records are stored in multiple places, e.g., for reasons of redundancy, availability or security. Some records may be split into multiple sub-records, with some or all of the multiple sub-records stored in different storage types or systems.

B. A Graph of Records

In one example usage situation, a first record includes information related to a biometric token of a user. This is an example of an anchored token, i.e., one that may not be transferred in terms of ownership. This example record also includes a reference to a second record. The authentication relates to at least some of the information associated with the first record. The second record may include information related to the PII (Personal Identifiable Information) of a user, where this user is the user to whom the biometric information of the first record belongs. The second record may also include information related to a reference to the first record, making it practically convenient to look up the first record from the second, as well as the other way around.

In one variant of the above example usage situation, the references are encrypted using a key of a trusted entity. This means that the trusted entity may determine the relationship between the two records, e.g., that they belong to each other, whereas other parties may not be able to do so, e.g., if a probabilistic encryption algorithm is used to encrypt the references.

In one example usage situation, multiple records are linked together. This may be visualized as a graph, where a record is a node and a reference is an edge. Two-way references correspond to an undirected edge whereas one-way references correspond to a directed edge. The graph may include one or more clusters that are associated with each other in a publicly verifiable manner (i.e., the references are not encrypted), as well as one or more clusters that are not publicly verifiable to belong to each other (i.e., the references are encrypted). In some embodiments, records may be linked together through two-way references in which one directional linkage is encrypted, and the other directional linkage is not, both are encrypted, or neither is encrypted.

Figure 32:
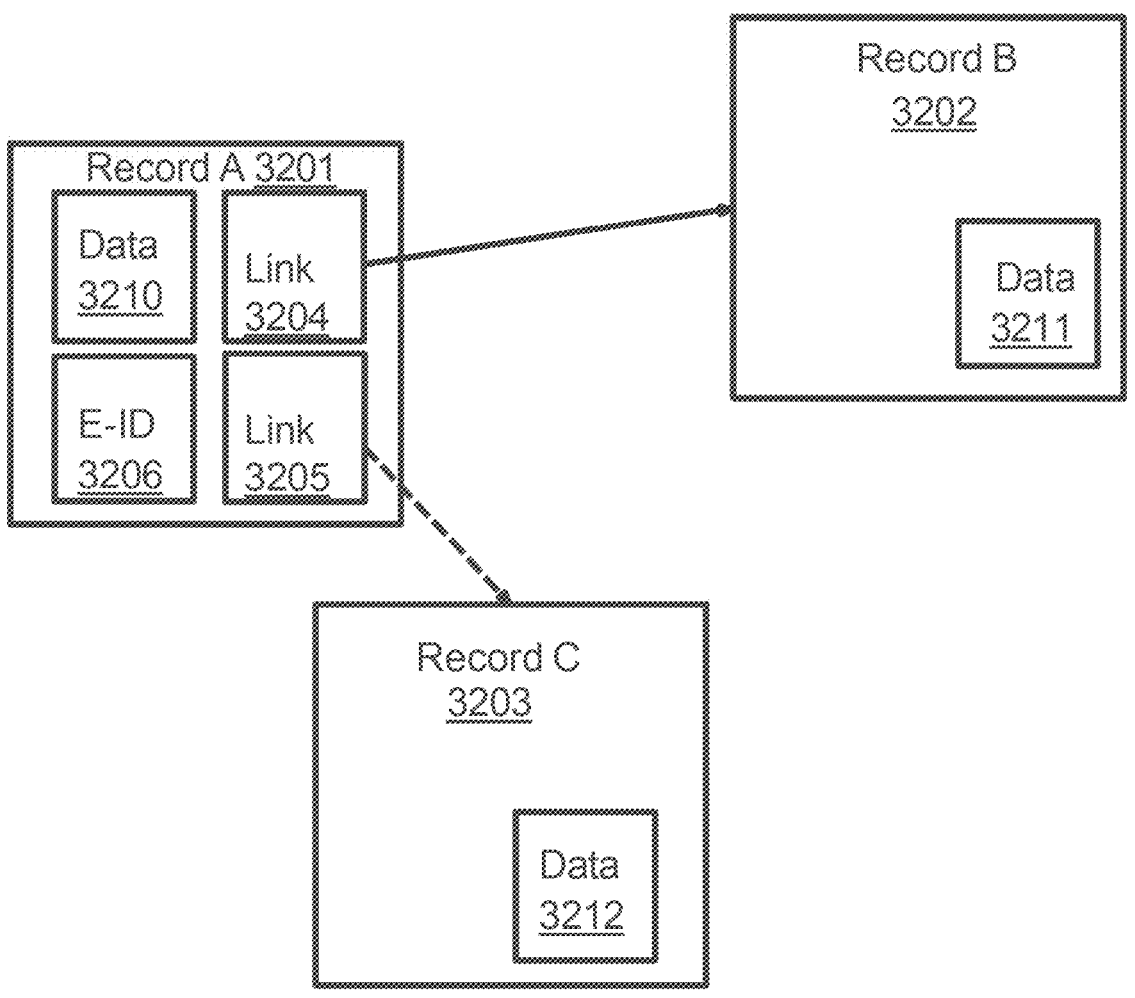
FIG. 32 conceptually illustrates associations of KYC data configured in accordance with some embodiments of the invention.

FIG. 32 is a block diagram illustrating associations of KYC or other described data with other data. Record A 3201 includes Link 3204 indicating record B 3202, where Link 3204 is not encrypted and therefore, the association between record A 3201 and record B 3202 is publicly visible to a party with access to record A 3201. Record A 3201 also includes encrypted link 3205, indicating record C 3203. Encryption identifier E-ID 3206, which may be a public key or a reference thereto, indicates a public key or other identifier of a trusted party (not shown) that may decrypt encrypted link 3205, e.g., using a private key (not shown) corresponding to E-ID 3206, in order to determine the plaintext of encrypted link 3205, which in this case is a reference to record C 3203. The arrow from encrypted link 3205 to record C is shown as a dashed line to indicate that it is not publicly accessible without the cooperation of a party indicated by E-ID 3206. Record A 3201 also includes optional data 3210, which may include one or more links, one or more E-ID values, and one or more fields of information, where a field of information may be in plaintext or an encrypted format, and may indicate information related to a user, an organization, an element on a blockchain, or other information of relevance with respect to record A 3201. It may, for example, include a name of a person, a birthday of a person, a biometric template or value related to one, data associated with an NFT, auditing information, data of relevance to an escrow record, a statement related to one or more other records such as record B 3202 and record C 3203, where this statement may be the result of evaluating a function of data 3211 and data 3212 or parts thereof. Here data 3211 and data 3212, which are both optional, may be of a similar format as data 3210. E-ID 3206 may be implicit, e.g., known without being stated in record A 3201, whether it is always indicating one and the same party, one party from a known list of parties, or whether it is determined based on contextual data, e.g., the identity of the party that created record A, wherein this is not shown in FIG. 32 for the sake of simplicity. One or more of records 3201, 3202 and 3203 may be stored on one or more of a blockchain, on the IPFS (InterPlanetary File Server), in a privately managed database or other form of data storage.

C. Using Encryption for Data Privacy

The encryption of data, processing of encrypted data, and storage of encrypted data may use escrow methods such as those disclosed in co-pending applications titled "Methods for Resolving NFT Fraud and Theft" by Markus Jakobsson, Stephen C. Gerber and Andrew B. Solmssen; and "Automated Wallet and Transaction Control" by Markus Jakobsson and Keir Finlow-Bates, incorporated by reference in their entireties. A person of skill in the art will recognize that there are variants on the techniques disclosed in those two co-pending applications, and combinations with the techniques disclosed herein.

D. Proofs of Identity

A user may prove that he or she (or it, in the case of an organizational user) is the entity that is claimed, if he/she/it may generate a digital signature on a challenge or nonce, where the digital signature is verified using a public key that is indicated in the information element of one of the records described above. That is done using the corresponding secret key. This proves the correspondence between the associated record and the entity. The user may also prove that another record is associated with this public key. That may be done by the same public key being referenced in that other record, or by connecting the other record to the record associated with the aforementioned proof. Such a connection would be straightforward if the reference elements connect the two records in one or more hops, and the reference elements are not encrypted. Alternatively, if at least one of them is encrypted, then the user may prove that the content of an encrypted reference is associated with the record to which the reference points. This may be done by having access to information allowing the decryption of the ciphertext; by participation by one or more trusted parties who have these decryption keys; or by having access to random nonces used in the creation of the ciphertexts. If these nonces are generated using a pseudo-random generator for which the seed is known to the user/user's wallet, then the same pseudo-random number may be generated anew and used to perform the proof, which may also be a zero-knowledge proof, as will be appreciated by a person of skill in the art.

Such proofs of identity, or association of records connected in a graph, may also be performed by one or more trustees with knowledge of the decryption keys. Such parties may also prove that two nodes are not connected in a graph by proving, potentially using zero-knowledge proofs, that a reference ciphertext does not correspond to a value that indicates a given record. One method of performing such proofs was disclosed in the 1996 publication titled "Proving Without Knowing: On Oblivious, Agnostic and Blindfolded Provers" by Markus Jakobsson and Moti Yung, incorporated by reference in its entirety.

In one embodiment, a multiplicity of records include an encrypted public key, where the ciphertext is probabilistic. Accordingly, even though the public keys associated with two records may be the same (which means that the two records belong to the same entity), the ciphertexts would not look the same and could not be correlated to each other by a party without access to the decryption key, or access to a proof related to the two records being or not being associated with each other. However, a trustee or a user with access to the decryption key for the two ciphertexts—or to the random or pseudo-random numbers used when generating the ciphertexts—may prove that the two correspond to the same public key (assuming they do) or that they do not (of that is so). This, too, may be done using the techniques disclosed in "Proving Without Knowing: On Oblivious, Agnostic and Blindfolded Provers" by Markus Jakobsson and Moti Yung, incorporated by reference in its entirety. Similarly, two or more parties, who together know the decryption key but who do not know it on their own, may verify, including using zero-knowledge methods, whether two or more records do or do not correspond to each other, e.g., as indicated by then including the same identifier (such as a public key), whether this identifier is encrypted or not for each of these records. Other encrypted values associated with records may also be compared to each other. A person of skill in the art will recognize that this may be done one comparison at a time, or multiple comparisons at a time for increased efficiency.

E. Generation of Derived Records

A user may be associated with one or more records, wherein a first information item identifies a first property or right associated with the user, and a second information item identifies a second property or right associated with the user. For example, the first item may be a birthdate, and the second item may be an assertion that the user is not a felon. The latter, in turn, may be generated as a function of all the items associated with the user, and the absence of any felon related record causes the creation of the second information item, which may be housed in a separate record from that of the first information item. A trusted party may now generate a third information item, stating that the user associated with it has the right to vote in a given jurisdiction. The third information item may be encompassed in a separate and newly created record, which may be linked to an anchored token associated with the user, e.g., by adding a reference to this or by encrypting the same identifier as is encompassed in the anchored token. For example, the anchored token may include an EI Gamal encryption of a public key or other unique identifier associated with the user. The trusted party may generate a new ciphertext corresponding to the EI Gamal encryption of the public key or other unique identifier associated with the user. The trusted party does not need to decrypt the ciphertext to do that, but may simply perform an action referred to as re-encryption. One example re-encryption method was disclosed in the 2004 publication titled "Universal Re-encryption for Mixnets" by Philippe Golle, Markus Jakobsson, Ari Juels and Paul Syverson, incorporated by reference in its entirety, but a person of skill in the art will recognize that there are other example implementations of re-encryption. Alternatively, the trusted party, potentially with the assistance of another trusted party, may decrypt the ciphertext corresponding to the public key or other unique identifier associated with the user and then encrypt the plaintext value resulting from this action, integrating said resulting ciphertext in the new record. This associates the new record with the anchored token. The new record may be expressed as a token, and recorded on a blockchain, or it may be stored in another format, e.g., on the IPFS. The new record could include a certification by the trusted party that created the new record. A user may then present the new record to a verifier (e.g., a voting booth) and provide evidence that the new record corresponds to the anchored token, which the user will prove corresponds to his or her biometrics. Alternatively, other authentication methods may be used for the anchored token, e.g., the verification of a digital signature generated by a chip implanted in a tooth of the user. The verifier now may determine that the user has the right to vote, but does not get access to information related to the birth date of the user, nor to a collection of records used to determine the absence of a felony associated with the user. This reduces the disclosure of information to a minimum, while still enabling the verification of important facts related to the user.

As new records are introduced, these may be used to determine whether previous records should be updated. For example, if the user described above is convicted of a felony, this may be memorialized in a record associated with the user. The party that generates this record may scan all other prior records to determine whether any one of them includes a statement that no longer is valid as a result of the newly created record. If so, a new record indicating the invalidation of the old record may be created and stored. Alternatively, the record that is being invalidated may be modified. This is related to the co-pending application titled "Distributed Ledgers with Ledger Entries Containing Redactable Payloads," U.S. patent application Ser. No. 17/810,085, by Jakobsson, Gerber, Finlow-Bates and Dufva, incorporated by reference in its entirety.

In another embodiment, a whitelist or a blacklist includes updates related to records and/or their associated change of status, and may be queried by a verifier. Such lists may be stored distributively in a record that is purged as entries become redundant, or where replacement entries are stored and the list is only searched until the most recent entry is verified. A person of skill in the art will recognize that there are many ways of maintaining such a database, which we may refer to as quasi-immutable.

F. Quasi-Immutable Storage

One example quasi-immutable database may include a series of linked entries, where newer entries are inserted on what we may refer to as the "top" of the database. Each entry may be associated with a state, which may be, for example "valid" or "invalid", or "most recent" vs. "older", or have a counter indicating how many related records already existed in the database when a given record was added. When a new record is added, an agent may search for related records and, if present, set the states accordingly. That may mean to set the first found related record to "invalid" whereas the newly added one is set to "valid". Alternatively, if the counter of the most recent one is set to "4" then the newly added one is set to "5". As the list is searched, different agents may have different search policies, e.g., to find the most recent record, to find all valid records with some property, to find the three most recent records matching a given key, etc. In some cases, the agents may store at least part of the list and make a determination of what items to store based on the search policies they support. In some embodiments, additional information may be stored, e.g., in a hash table or using a Bloom filter, and use this additional information to index into the list, or determine what items are associated with what states. In one embodiment, records with some state (such as "invalid") do not need to be stored. This is why we refer to the storage as quasi-immutable: it inherits the immutable aspects of blockchain-related storage and IPFS from the distributed storage policies, and the quasi aspects from the rule that only some elements need to be stored, e.g., based on the associated states or the contents of the hash table or Bloom filter.

One manner to implement a quasi-immutable storage is to represent one or more pieces of data with a collection of records, where one record refers to another and augments or supplants the record referred to. The data may be, at least in part, encrypted, or it may be in plaintext. For encrypted data, different encryption keys may be used for different records, where data may be explicitly forgotten by the system by having one or more parties holding a decryption key (corresponding to such an encryption key) erase one or more components of said decryption key, thereby collectively making it not possible to decrypt the associated data. This causes old data, that may be replaced or modified, to no longer exist in the sense that it is not accessible. Other ways of indicating that data is not relevant are also possible, including indicating in a dependent record that may be digitally signed that a previous record is invalidated, wherein the digital signature attests to the authority of the entity or entities asserting the invalidity. In other embodiments, invalid records may be encrypted with a randomly generated public key for which the private key is not known.

Each trustee may generate a graph structure of secrets such as what is described in the 1999 publication titled "How to forget a secret" by Di Crescenzo, Ferguson, Impagliazzo and Jakobsson, the disclosure of which is incorporated herein by reference in its entirety. Whereas that technique does not apply to data stored in a blockchain, the keys in the publication may correspond to the shares of private keys, said private keys corresponding to the public keys used to encrypt information stored on the blockchain. A person of skill in the art will recognize that this may be applied in a variety of manners, and that it may be used to store—and forget—both symmetric keys and private keys. In some embodiments, an analogous technique may also be used to store public keys.

G. Records Associated with Tokens

Another example of a quasi-immutable database or digital store of records may include a system wherein an address or identifier is generated for each record in the system when the record is first stored, and a token is minted. In some embodiments, the address or identifier may be generated through an application of a cryptographic hash function to some or all of the record. A token is minted when a new record is added to a blockchain, referencing the data of the record. This may be achieved using a variety of mechanisms, including proof of work, proof of stake, and alternatives. In a proof of stake protocol, the stake may include a crypto token associated with the chain that the record is added to; to another chain (e.g., another currency), etc. The stake may also include a non-fungible token (NFT).

In some embodiments, a record may be associated with a token, and the record may be encrypted with a first public key of a first token owner, with the first public key used to derive a first blockchain address against which ownership of the token is registered. When the token is transferred to a second owner by registering ownership of the token to a second blockchain address derived from a second public key, the record may be decrypted by the first owner using a first private key corresponding to the first public key, and then re-encrypted with the second public key. Zero knowledge proofs may be used to prove to the second owner that the re-encrypted record as the encrypted record.

H. Policies Associated with Tokens

In co-pending application titled "Improved Token and Resource Management" by Markus Jakobsson and Keir Finlow-Bates, incorporated by reference in its entirety, it was disclosed that policies may be associated with tokens and, upon transfer (as well as at other times, as appropriate), these policies may be evaluated and enforced, e.g., by a watchful entity implemented in an entity such as a bridge or a consensus mechanism. An entity (such as a token owner, a custodian or non-custodian wallet, a marketplace, a financial institution, a corporation, etc.) may associate a policy with one or more tokens. An example of such a policy is that the tokens may only be transferred to wallets associated with a KYC profile, or to wallets with a specified associated certification. An example certification may be indicating the use of specified hardware such as a secure hardware module; specified securityware such as a digital rights management unit (whether in software or hardware), an entity with a specified risk profile, insurance, jurisdiction, etc. Such policies may also be associated directly with tokens. There may be multiple policies associated with any given transfer request, and these are evaluated and enforced as described above. Aggregate policies may be set, e.g., specifying the maximum value transferred out in a given time frame, or the maximum value transferred out without a step-up authentication being required. Using this approach, various abuses may be prevented or limited in impact, including malware-based abuse, heists, insider attacks, phishing attacks, etc. In addition, methods for recourse may be implemented as described in other co-pending applications, such as "Using Watchful Bridging for Blockchain Fraud Prevention" by Markus Jakobsson, Stefan Dufva, Keir Finlow-Bates and Guy Stewart; "Watchful Consensus Mechanisms" by Markus Jakobsson; "Automated Wallet and Transaction Control" by Markus Jakobsson and Keir Finlow-Bates; and "Improved Token and Resource Management" by Markus Jakobsson and Keir Finlow-Bates. The instant invention is compatible with the technology disclosed in co-pending application "Consensus System for a Blockchain based on 'Know Your Customer'" by Keir Finlow-Bates and Markus Jakobsson, the disclosures of which are incorporated by reference in their entireties.

I. Bounty Hunters Used for Record Generation

In one embodiment, the generation of derivative records in a database, including one relying on a blockchain, may be generated by one or more bounty hunters that identify the need to generate a derived record, e.g., based on a policy associated with the data from which the record is derived, where a bounty hunter may present the derived record and/or evidence indicating that the policy supports its derivation, to an entity that generates a new resulting record and stores it in a database; this database may also utilize blockchain methods for storage, and may be the same database from which the bounty hunter accessed records. In some embodiments, a bounty hunter aggregates data from multiple databases (e.g., blockchains) to generate the derived record. A bounty hunter may be compensated either in a guaranteed manner, based on the validity of the derivation alone, or in a probabilistic manner, e.g., if the derived record is valid and a probabilistic condition is satisfied. Such a condition may be, for example, that a target value generated after the submission of the derived record, and potentially generated from at least the derived record as well as other records, matches at least a portion of the derived record, e.g., that they both have hash values that match in the last 20 bits, for example, making each valid submission a lottery ticket with a one in a million chance of winning a bounty. Aspects of bounty hunting were introduced in co-pending application titled "Perpetual NFT Assets" by Markus Jakobsson, Stephen C. Gerber and Guy Stewart, incorporated by reference in its entirety.

In one embodiment, the entity in charge of the compensation of bounty hunters is a watchful node, such as a miner, an entity performing staking, a bridge, or another watchful entity. In some embodiments, compensation of bounty hunters may be performed automatically by a collection of nodes through an analysis of records generated by an Artificial Intelligence model or Machine Learning algorithm running on the collection of nodes. The collection of nodes may, at regular intervals, perform an update by retraining or updating the model or algorithm based in part or as a whole on all prior generated records and/or a subset of prior generated records (for example but not limited to the subset of records generated since the last update), and may vote on applying the update before applying the update for subsequent generated records.

J. Protecting Entities and Society

A token may be associated with a policy that prevents it from being processed in a mixer. One way of doing this is for the entities in charge of processing or approving transfers of ownership (e.g., miners, validators) to maintain a blocklist of known mixers and associated entities and to refuse transfer of ownership to such an entity. As new mixers or methods of feeding tokens to known mixers are introduced, these entities would augment the blocklist accordingly. An analogous approach may blocklist known criminal entities, or entities to which transfers are not allowed in the jurisdictions in which the transfer processing are performed, or which govern such jurisdictions. This approach protects not only individual entities (individuals as well as organizations) against theft and abuse, but also protects society against the funding of hostile organizations by means of token thefts or other illicit activities.

Policies such as those described above do not have to be attached to the tokens that they come to protect. For example, a user may register his or her wallet identifier with a service that maintains a list of what tokens to protect; any tokens associated with that wallet identifier may be protected using a policy that in some embodiments may be selected by the user requesting the service. In one embodiment, wallets registered with the service may have transactions scanned and accepted or rejected at the wallet level, whereas in other embodiments, signing up to the service may be registered on the blockchain, and nodes maintaining and extending the blockchain may detect the sign-up and may enforce the acceptance or rejection of transactions based on the blocklist. In some embodiments, the blocklist may be maintained on the blockchain.

The policy may also be applied in bulk to all wallets with a specified predicate, where the predicate may be a brand of wallet, a jurisdiction associated with the wallet, etc. Policies may also be associated with the recipient of a token, e.g., if the recipient is not whitelisted then a protective action is applied. Here, the whitelisting may correspond to having enrolled in KYC and having received, as a result of the enrollment, a certificate or other predicate.

Policies may depend on velocity assessments (such as the number of tokens transferred from one address within a given time period), or be based on threat indicators provided by wallets, security services, marketplaces, etc. The techniques disclosed herein address tokens both of the fungible type and the non-fungible type.

In one embodiment, a digital rights management (DRM) system is integrated with a KYC mechanism. When a user configures his or her device, or an admin does so for him or her, the DRM module is provided with information related to the user, effectively associating itself with this user. This may be performed by linking the DRM unit to an anchored token such as a biometric token, or to provide information or access that enables the user to provide information. Such information may include name, address, banking information, one or more certificates, or a reference to another device or account associated with the user. The DRM system may be configured to request additional tokens to be produced, where such tokens may aggregate the information of anchored tokens related to the user, as described above. The DRM system may also be configured to receive requests for information from services, applications, token contracts, etc., and determine based on one or more policies what identifying information (such as references to tokens associated with the user) to provide in response to the requests. The DRM unit may further be used to generate audit information to be reported to entities selected as part of the configuration of the device. Such audit information may be used to centrally collect information indicating malfunction, abuse, and preferences, by comparing reported information to observed actions.

In some embodiments, KYC information may be placed in escrow as part of the enrollment of a user or device in a service, where the service provider does not have the ability to decrypt the KYC information in escrow, but may request this from a trusted third party that may request an indication of the reason for the access, and to log that the access took place. Technology related to escrow was disclosed in co-pending application titled "Automated Wallet and Transaction Control" by Markus Jakobsson and Keir Finlow-Bates; and in "Escrowed Wallet and Transaction Tracking Technology" by Markus Jakobsson, the disclosures of which are incorporated by reference in their entireties. Those techniques are compatible with the techniques disclosed herein.

Figure 33:
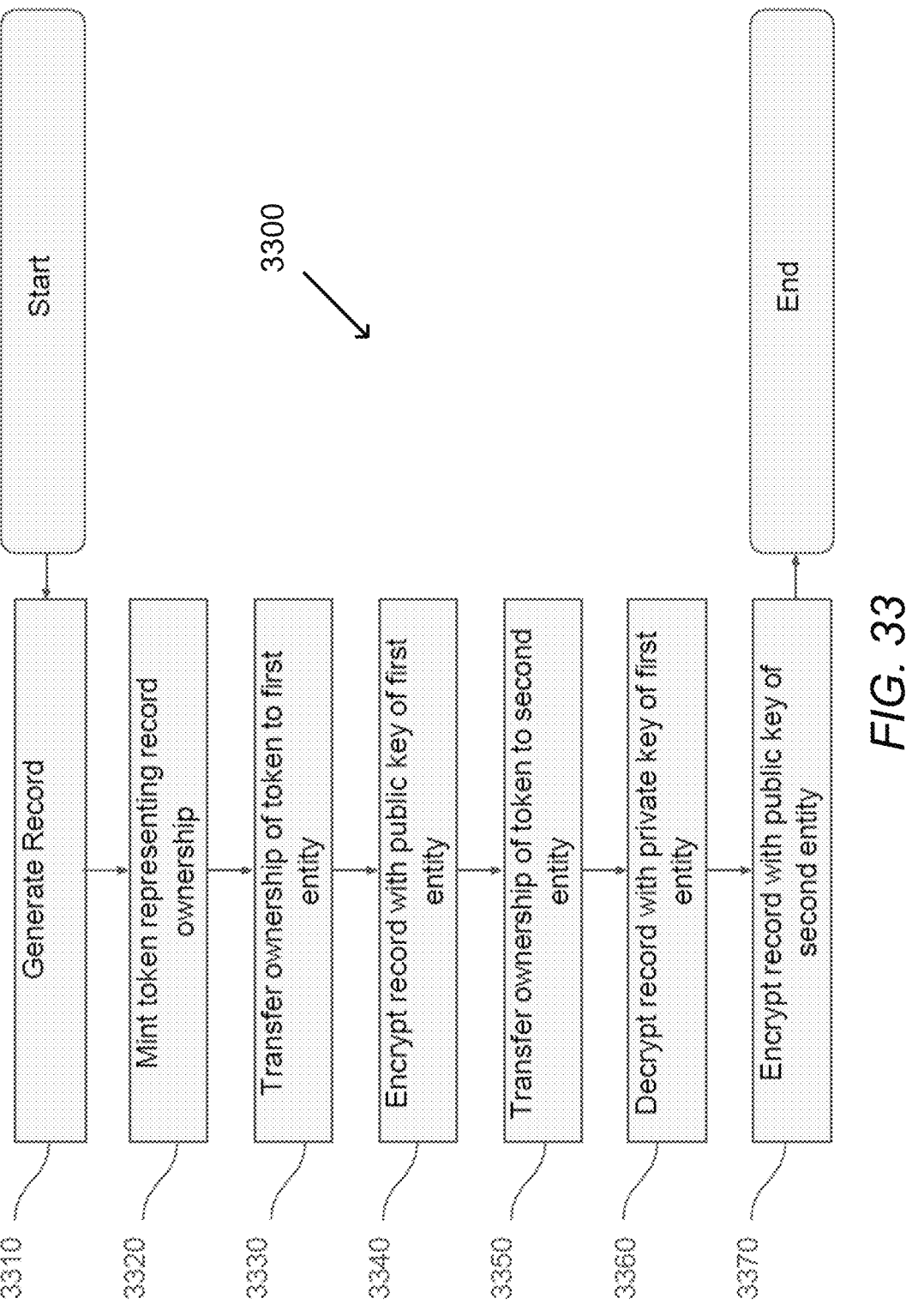
FIG. 33 illustrates a process for representing ownership of a record in accordance with multiple embodiments of the invention.

FIG. 33 is a flow chart illustrating a method 3300 for representing ownership of a record with a token, and encrypting the record based on an owner. Actions may commence with a generation of a record, as shown in step 3310. Actions may then proceed to 3320, in which a token representing record ownership is minted. Actions may then proceed to step 3330, in which the token is transferred to a first entity, thus also transferring ownership of the record to the first entity. In some embodiments, the first entity may generate the record and may mint the token. Actions may then proceed to step 3340, in which the record is encrypted with a public key of the first entity. Actions may then proceed to step 3350, in which ownership of the token may be transferred to a second entity. Actions may then proceed to step 3360 in which the record may be decrypted using the private key of the first entity. In some embodiments transferring the token may also include the first entity decrypting the record, and this may be mandated by the blockchain protocols. Actions may finally proceed to step 3370, in which the record is encrypted with the public key of the second entity, the token and record are owned by the second entity, and the record is encrypted such that only the second entity is able to read it.

While a specific process for recording ownership is described above, any of several processes may be utilized as appropriate to the requirements of specific applications. In many embodiments, steps may be executed or performed in any order or sequence not limited to the order and sequence shown and described. In some embodiments, some of the above steps may be executed or performed substantially simultaneously where appropriate or in parallel to reduce latency and processing times. In numerous embodiments, one or more of the above steps may be omitted.

In one embodiment of the invention, a token, a wallet, a jurisdiction, or a collection of such, are associated with one or more policies. Such policies may either be implicitly or explicitly associated. An example of an explicit association is when an identifier of the entity includes or is tied to the policy or a reference thereto. Examples of an implicit association include but are not limited to: any entity of a given type that has been created after a certain date, by a specified party, in a given jurisdiction, etc. If an entity is associated with multiple policies, these policies may have an order of priority in which they are applied, where a policy that disagrees with a previously applied policy is ignored or automatically modified to remove the conflict. An entity may be associated with policies both implicitly and explicitly. At the same time as a policy may be either implicit or explicit, it may also be either static or dynamic. A dynamic policy includes executable instructions that are executed in the context of an input that may include a reference to the entity with which it is associated. A static policy may be described as one or more conditions and associated classifications, but is not executable.

K. Continuous Monitoring and Automated Reactions

The disclosed technology enables continuous monitoring, in which updates and verifications are made periodically. In one embodiment, one or more records in a graph associated with a user may be updated, augmented, invalidated, re-certified, replaced, etc. As this happens, that may affect other records, which may represent an aggregate of records including the updated, augmented, invalidated, re-certified, replaced etc. record. Here, a record may correspond to a token, such as a non-fungible token (NFT), or may be stored in the IPFS or another file storage system. As some of these records are derived from other records, inspecting the dependencies, e.g., expressed by links or references between the records, enable the determination of what other records are affected by a change, and in turn, the modification of the graph associated with the user. Various entities may depend on the values and associated assertions associated with one or more records; as one of these one or more records are updated, it is desirable for these entities to be notified, or conditionally notified based on the type of change and a notification policy put in place by the entity to be notified. Information about what entities to notify and under what conditions may be expressed as data elements associated with the records in question. As a relying party, e.g., one of these various entities, is notified of a change, this relying party may modify the access to resources, the cost of a service, authentication or access requirements, etc. A party that aggregates data, e.g., to generate new records, may be such a relying party, as may a service provider depending on KYC data. Many other forms of automated reactions, in response to KYC data changes, may be performed in this way, as will be appreciated by a person of skill in the art. A person of skill in the art will also recognize that the disclosed structure and mechanisms find use beyond KYC statements as well, and may be used for any collaborative computing task.

In one embodiment, the determination that a change has been made to a record, where this change affects another record, may be performed using bounty hunting techniques. Bounty hunting was disclosed in co-pending application titled "Perpetual NFT Assets" by Markus Jakobsson, Stephen C. Gerber, and Guy Stewart; are applied in the context of watchful computing in co-pending application "Using Watchful Bridging for Blockchain Fraud Prevention" by Markus Jakobsson, Stefan Dufva, Keir Finlow-Bates and Guy Stewart; and are also compatible with those disclosed in co-pending application titled "Improved Token and Resource Management" by Markus Jakobsson and Keir Finlow-Bates, the disclosures of which are incorporated by reference in their entireties.

In one embodiment, KYC information, e.g., structured, stored and updated as described in this disclosure, is used to limit access to information, filter data, and as input to security algorithms determining the risk posture of a user based on achievements, exposure to events, assertions, educational milestones, as well as user preferences and configurations. The determination of the risk posture may be used to create derived records that may be stored along with other KYC data and be used to inform real-time security decisions made by the system. Similarly, preference data, purchase information and access data (e.g., to data, resources, advertisements, etc.) may be used to generate records identifying advertisement profiles associated with a user, where these records may include aggregated data that omits detailed and therefore more sensitive personal data, but which may be used by advertisers to determine the interests of a user.

Alternatively, a wallet may generate derivative records from already certified records, and obtain a certification for the derivative record, the certified record being stored, e.g., on a blockchain. The certifying authority would receive the record to be certified, along with references to the records it is derived from, and verify the correctness of the record to be certified based on the latter. To the extent that the record to be certified includes encrypted information such as encrypted data or encrypted references, the wallet may provide proof of what the corresponding plaintexts are, or that they correspond to the data or references being provided to the certification authority. The certification authority would preferably verify such proofs prior to providing the service of certifying the record it is provided to be certified, or at least prior to the certified record being published. A person of skill in the art will recognize that some of the tasks described above being performed by the wallet may instead be performed by a party representing the wallet, including the certifying authority.

A user wallet, which may include a digital rights management (DRM) unit, may generate records of the type described herein, whether for purposes of KYC, advertising, generation of audit trails, improved user security, etc. These records may be stored in publicly accessible databases, which may be distributed. In some instances, the user wallet may store information in a temporary storage, e.g., in a user device associated with the user wallet, or with a service provider that is in communication with the user wallet. These temporary records may later be used to generate aggregate records, whether for purposes of reducing exposure of personal information or unnecessary details, or to limit the amount of data to be stored on the blockchain, e.g., to reduce costs.

In one embodiment, KYC data includes data indicating relationships between users, e.g., to determine that a given user is high-risk based on interaction with—or likely relationship with—another user, known to be high-risk. High-risk may relate, for example, to financial fraud risk, credit risk, terrorism links, or politically exposed users. An interaction may be a transfer of a token from a wallet or account of a first user to a wallet or account of a second user, where a user may be an individual, an organization or a collection of nodes managed by a specified script. Such relationships may be mined based on data recorded on the blockchain, e.g., memorializing transfer of tokens. It may also be based on physical co-location, where co-location may be determined based on two wallets or associated devices detecting each other's presence, or by third party nodes detecting the two wallets or associated devices. This may also be used for purposes other than detecting risk, e.g., to identify likely coinciding user preferences based on purchase or location similarities, where such information may be useful for purposes of social networking, automated matching of people interested in being matched to likeminded users, etc.

Some records may include a data field that is encrypted using a trusted party's key, e.g., public key. Similarly, they may include values that are the result of applying a one-way function (such as a hash function) to an input, where the input may have a random nonce element and a sensitive data value that a party with knowledge of the nonce and the data value may prove knowledge of. This enables the use of non-public predicates in a user profile (such as a KYC profile), where these predicates may be extracted by trusted parties, or proven to be present by such parties, or both.

In one embodiment, one or more first records associated with an entity provide references to a multiplicity of second records, where the second records includes data, whether in plaintext or protected, e.g., using encryption. The second records may not include any references to each other or to any of the first records. Therefore, meaningful access to the data associated with a given entity requires access to the one or more first records. The first records may include some data, which could either be in plaintext or ciphertext format. The references in the first records may be in plaintext or ciphertext format. In some embodiments, the first records are publicly accessible, e.g., stored in a blockchain or other publicly accessible database. This approach of organization of storage may be applied hierarchically, e.g., by the use of references to one or more third records may be included in the one or more second records, which in turn are accessed by a party with knowledge of the one or more first records. This may be applied in any number of levels. In one example use situation, the first records are associated with PII, or correspond to anchored tokens that relate to unique entity identities in a manner that may not, or may not easily, be modified. The second records may include data that may be sensitive, but not in the absence of the PII or other unique identifiers of the first records, where these may be encrypted. This enables computation on the second records without an invasion of the privacy of the users with which the records are associated. The third records may include information that is not necessary for this computation, and may be protected so that the public may not access it; the references between first and second records, or those between second and third records, may also be encrypted.

The disclosed technology may be used to generate security assertions relating to an audited entity, e.g., a wallet, an exchange, a service provider, a crypto miner, etc. For example, an audit could include verifying that the audited entity has updated software and firmware according to what updates are available; using an interactive verification such as a software-based attestation method to verify that the audited device is free from malware and undesired processes such as side-loaded software or unauthorized software; verify that the entity is insured according to some baseline requirement; or that it has not been reported to a blacklist based on anomalous or undesired behavior. The security assertions may include digital signatures by one or more certificate authorities, trusted parties, aggregators, etc., and may relate to one or more previously made assertions, each one of which may be stored on a blockchain, on the IPFS, or in one or more cloud-services or other publicly or privately accessible databases. The security assertion may be consumed by a service provider that wishes to provide a service to or receive a service from the entity related to the security assertion, e.g., before a wallet is trusted with obtaining access to copyrighted media content, or before a wallet transmits sensitive personal information to a service provider for the service provider to provide a service to one or more parties associated with the sensitive personal information.

L. Applications to Heuristic Security

There are many security applications where it is of relevance to verify that a request comes from a legitimate user, e.g., as opposed to a bot or a user not associated with a given account; or that a limited number of requests come from a given account during a specified time period, e.g., to curb denial of service attacks. The disclosed technology is useful to enhance security in such contexts. For example, a browser or an associated wallet may generate a proof, for a service provider, that the browser or wallet is being used by a live user, e.g., by providing the service provider or a representative thereof with a proof of knowledge of a private key associated with a certified public key that is included in or referenced by an anchored token. If the entity representing the user includes a DRM unit, this unit may attest to the presence of a user, e.g., by providing a liveness score generated from one or more sensors that together determine the presence of a live user, and potentially, to the user associated with the indicated token. This DRM unit may be housed in secure hardware, at least in part, or it may be expressed in software that is remotely assessed to maintain a minimum security standard, e.g., by means of performing anti-virus verifications of the device on which it is executing.

In one embodiment, a determination is made that a user request is associated not with an anchored token but with another entity, e.g., a DRM unit that may be associated with (i.e., anchored to) a given user or her biometrics; a given location as determined by the DRM unit; or a given account. In some embodiments, the proof may not reveal the account or user identity to which the request is tied, but only that there exists a valid association. This association may be revealed by quorum participation of some trustees, as disclosed in the PHD thesis titled "Privacy vs authenticity" by Bjorn Markus Jakobsson from University of California at San Diego, UMI Order No. GAX98-04529, incorporated by reference in its entirety. It may also utilize a method for privacy related to the digital signatures of Chaumian cash, wherein a threshold number of digital signatures may be generated and distributed without this causing the disclosure of the identifier, but the exposure of one digital signature more than this threshold causes the associated public key to be revealed using methods for interpolation.

Systems and methods for operating know-your-customer functionality in accordance with miscellaneous embodiments of the invention are not limited to use within NFT platforms. Accordingly, it should be appreciated that the blockchain applications described herein may also be implemented outside the context of an NFT platform network architecture unrelated to NFTs. Moreover, any of the systems and methods described herein with reference to FIGS. 32-33 may be utilized within any of the NFT platforms described above.

NFT Platform Improved Token and Resource Management Mechanisms

The use of blockchain technology currently serves to recognize asset ownership, by tying assets such as NFTs and crypto funds to rights of initiating changes to ownership. However, traditional methods do not address the need to control who may access resources, independent of ownership rights, and under what circumstances. Similarly, current blockchain technology does not offer practical ways of automating transactions, or to selectively associate and/or disassociate policies and processing requirements with/from assets.

The disclosed technology may be used for a variety of purposes, including for example for purposes of digital rights management of resources stored in a distributed system; to reverse ownership changes of tokens in response to the detection of fraud or other abuse; and to manage asset recovery in cases of losses, e.g., of physical hardware devices used to store seeds. Thus, the disclosed technology addresses a large collection of the problems currently curbing the enthusiasm among consumers and corporations as it comes to distributed technologies. The instant invention also includes a large array of associated technologies, which offer a wide range of possible functionalities that are not currently available with currently known technologies.

We disclose techniques to control access to and ownership of tokens, where such control may be governed by policies associated with resources, legal requirements associated with a jurisdiction associated with the resources, or other types of input.

One example of such an access is to render content associated with an NFT. Another example is to designate rights to override ownership rights, e.g., by a collection of designated heirs or representatives thereof; by law enforcement; or by a content creator.

Resource access rights as well as override rights may be associated with policies identifying the conditions under which the rights may be practiced. For example, resource access rights may be tied to hardware specifications of a device from which the access request is being issued, and ownership override rights may be predicated on the presence or absence of some specified actions, whether by the currently identified owner or relative to environmental conditions such as the crypto currency market volatility, real-world data incorporated by trusted oracles, etc.

The disclosure includes a collection of exemplar approaches describing the invention. This collection, which is illustrative and non-limiting, and for which the embodiments may be combined, includes centralized techniques and distributed techniques; rule-based approaches as well as AI-based approaches; examples that demonstrate automation and those that rely on end-user inputs. The techniques being disclosed herein are, furthermore, also compatible with the techniques in the identified co-pending applications, which provide many of the technical details describing computational steps of relevance to the instant invention. These co-pending applications include but are not limited to the following: 63/609,747 "Trustee-Monitored Wallet Transaction", 63/587,631 "Token Abuse Protection", and 63/485, 792 "Voting System and Method for Non-Fungible Token Metadata and Assets Storage," the disclosures of which are incorporated by reference in their entireties. The techniques disclosed therein are compatible with the technology disclosed herein, and may be used as building blocks for implementing the disclosed system, as will be appreciated by a person of skill in the art.

D. Associating Tokens with Policies

In one embodiment, a token is associated with a policy. The token may correspond to crypto funds or a non-fungible token (NFT). The policy may include one or more rules. The token may be associated with a policy by explicitly including a reference to it or an encoding of it. It may also be associated with a policy by being logged on a blockchain associated with this policy. A token may also be associated with a policy by being transferred to an address that, in part, specifies the identity of the policy, and which may also in part specify the owner of the token. This may be done, e.g., by digitally signing a message including or referencing an indicator of the policy as well as the one or more public keys or addresses of wallets that are considered having the rights to change ownership of the token. To remove a policy of this type, a party with access to a private key corresponding to one of the public keys associated with the right to change ownership of the token may transfer the ownership of the token to one or more public keys, but not referencing the policy to be removed from association. A person of skill in the art will recognize that combinations and versions of these methods of associating a policy with a token may be used, as well as a combination of such methods. A token may be associated with multiple tokens, which may be listed in order of precedence; should there be a conflict between two such policies, the policy with highest precedence controls. This determination may be made at the time of a transfer or other inquiry, for example. Determinations may also be made at pre-specified times, or triggered by external audit events.

E. Blockchain-Related Policies

Some policies may be implicitly associated with tokens that are moved to a blockchain that is associated with such policies. For example, one blockchain may have a policy that enables the reversal of a transfer upon the determination, by a party associated with the blockchain, that the transfer was undesirable. One related and co-pending application is 63/623,023, "Bound blockchains and autonomous smart contracts," the disclosure of which is incorporated by reference in its entirety. The techniques disclosed therein are compatible with the technology disclosed herein, and may be used as building blocks for implementing the disclosed system, as will be appreciated by a person of skill in the art.

F. Jurisdiction-Related Policies

Policies may also be associated with a jurisdiction, e.g., a country or collection of countries (such as the European Union), a state, a corporation, or other political or organizational unit such as an employer of a user, or a security company designated to protect a given user. This jurisdiction may in turn be associated with wallets or accounts, e.g., voluntarily associated by a user associated with the jurisdiction. By associating one or more tokens with a jurisdiction, the one or more policies tied to this jurisdiction will be applied to the one or more tokens. One example of a jurisdiction is a country, which may require that all residents associate their wallets with the jurisdiction, thereby relating the policies of the jurisdiction to the tokens associated with the wallets. Hardware security modules and software-based digital rights management (DRM) units may enforce compliance. The jurisdiction, the word being used here in a loose sense, may also be an insurance company with which the user owning the tokens is a customer of. The insurance company may require that all tokens that the user wishes to cover with his or her insurance be associated with policies selected by the insurance company. Examples of compatible DRM technologies include but are not limited to co-pending application "Cross-Device Digital Rights Management" by Markus Jakobsson and "Dynamic Distributed Digital Rights Management Enabling Composite Content" by Markus Jakobsson, the disclosures of which are incorporated by reference in their entireties.

Other examples of "jurisdiction" may include:

(1) a corporate environment, for example, tokens instantiated on a permissioned private blockchain run by a corporate entity;

(2) a geographical environment, for example a continent, an island, a location in space or at sea; a professional environment, for example, tokens that are owned by or associated with a licensed profession and that may not be owned by or transferred to a wallet held by a non-licensed person; and/or (3) a membership environment, for example, a union, a political party, a club or society, or some other organization requiring formal recognition of membership and for which tokens may be instantiated that may not be owned by non-members, and/or for which properties of the tokens may be restricted or non-existent for non-members.

Examples of compatible token functionality pertaining to jurisdictions include but are not limited to co-pending application 63/587,631, "Token Abuse Protection" by Markus Jakobsson and Keir Finlow-Bates, the disclosure of which is incorporated by reference in its entirety.

Figure 34:
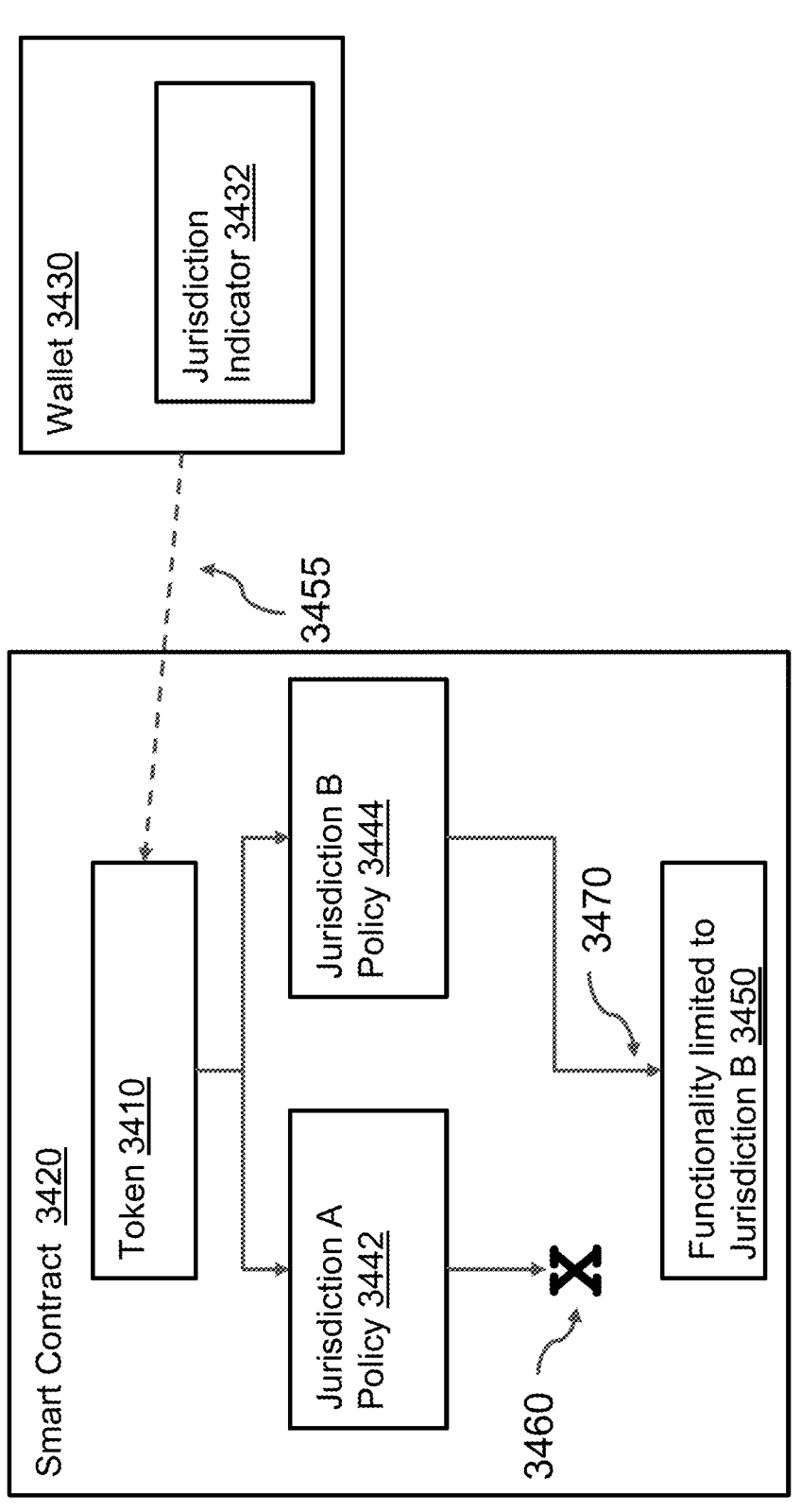
FIG. 34 illustrates a system for applying jurisdictionally relevant policies, implemented in accordance with certain embodiments of the invention, to tokens and token transactions.

A first exemplary embodiment of a jurisdiction-affected token policy is illustrated in FIG. 34. In the embodiment, a token 3410 may be instantiated by a smart contract 3420. The token 3410 may be a fungible token, a non-fungible token, an anchored or soulbound token, or some other form of digital asset.

The smart contract 3420 may also include code instantiating a jurisdiction A policy 3442 and a jurisdiction B policy 3444. Each policy may provide details of actions that may or may not be undertaken with the token 3410 depending on which policy applies. For example, presented for illustrative purposes only and not meant to be limiting in any way, a policy may state that: if the token 3410 is owned by a user residing in a member state of the European Union then the token 3410 may not be staked in a yield-bearing smart contract, or that the token 3410 may not be transferred to an address of a wallet that has no identifiable jurisdiction, or that the token 3410 may not be burned if it is owned by a user residing in a member state of the European Union.

The smart contract may further include functionality 3450 limited to being executable only in jurisdiction B, by the jurisdiction A policy 3442 and the jurisdiction B policy 3444. Examples of functionality 3450 may include: transfers of tokens to other externally owned accounts (EOA), transfers to smart contracts in general, transfers to specific classes of smart contract, burning tokens, evolving tokens, modifying aspects of tokens, locking tokens in smart contracts as part of liquidity provision, etc.

A wallet 3430 may include a jurisdiction indicator 3432, and the wallet 3430 may be registered as the owner of the token 3410. In some embodiments of the first exemplary embodiment, the jurisdiction indicator 3432 may include an anchored or soulbound token with metadata indicating a relevant jurisdiction as disclosed in co-pending application Ser. No. 17/808,264, titles "Token creation and management structure", by Markus Jakobsson and Stephen C. Gerber (the disclosure of which is incorporated by reference in its entirety), a token including a click-through agreement as disclosed in co-pending application 63/370,362, titled "System and Method for a Blockchain-based Verifiable Click-Through Agreement" by Keir Finlow-Bates (incorporated by reference in its entirety), a hash function message digest indicating a location on the Interplanetary File System (IPFS) of a certificate or document indicating a relevant jurisdiction, a uniform resource locator (URL) indicating a location of a certificate or document, or a database or website, indicating a relevant jurisdiction, or some other jurisdictional indicator or credential.

If the owner of the wallet 3430 submits a transaction 3455) affecting the token 3410 through a request to execute the functionality 3450, the smart contract 3420 may examine the jurisdiction indicator 3432 to determine whether the wallet falls under jurisdiction A, jurisdiction B, some other jurisdiction, or if no jurisdiction is specified.

If the wallet 3430 is determined to fall under jurisdiction A, the transaction may be canceled by the smart contract 3420 as shown by action 160. If the wallet 3430 is determined to fall under jurisdiction B, the transaction may be acted on, and the functionality 3450 may be executed.

In a possible implementation of the first exemplary embodiment, if the wallet 3430 does not specify a jurisdiction, some other action may be executed, for example a know-your-customer (KYC) process may commence.

Figure 35:
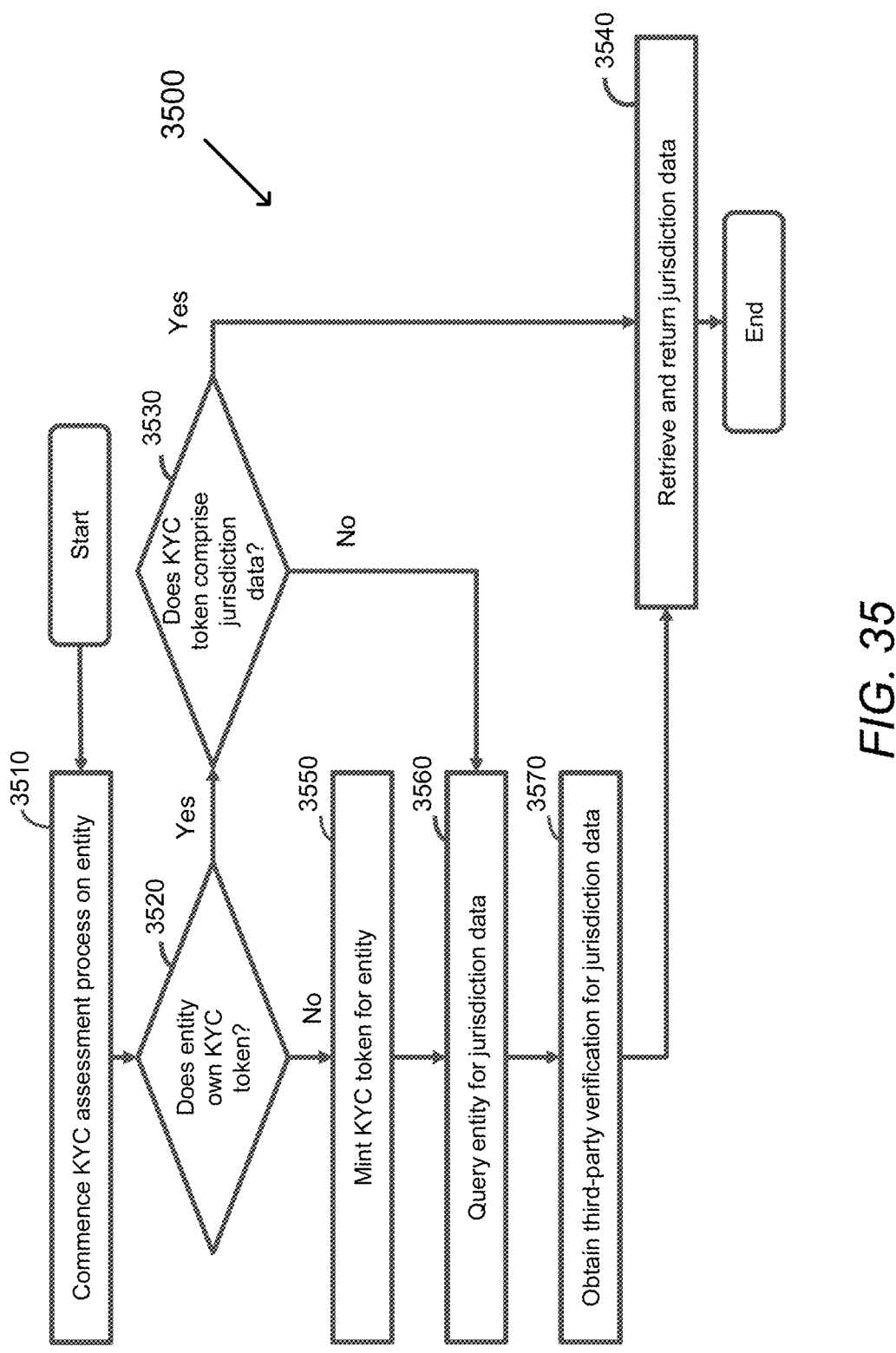
FIG. 35 illustrates a process for assessing know-your-customer and jurisdiction data in accordance with various embodiments of the invention.

A second exemplary embodiment illustrating a know-your-customer process is disclosed in FIG. 35. In the second exemplary embodiment actions 3500 may commence with a KYC assessment process being applied to an entity, as shown in step 3510.

Actions may proceed to step 3520, in which it is determined whether the entity owns a KYC token, which in some embodiments may be a non-fungible token or an anchor token.

If it is determined in step 3520 that the entity does own a KYC token, actions may proceed to step 3530, in which it is determined whether the KYC token includes valid jurisdiction data.

If it is determined in step 3530 that the KYC token does include valid jurisdiction data, actions may proceed to step 3540.

In step 3540, the jurisdiction data may be retrieved from the KYC token, for example from the KYC token metadata, and the jurisdiction data may be returned. If it is determined in step 3530 that the KYC token does not include valid jurisdiction data, actions may proceed to step 3560, which is disclosed below.

If it is determined in step 3520 that the entity does not own a KYC token, actions may proceed to step 3550, and a KYC token may be minted for and transferred to the entity. Actions may then proceed to step 3560.

In step 3560, the entity may be queried for jurisdiction data. On receiving a response to the query for jurisdiction data, in some embodiments the jurisdiction data may be added to metadata for the KYC token. Actions may then proceed to step 3570.

In step 3570, third-party verification for jurisdiction data supplied may be obtained. In some embodiments, verification may be performed by a government or an authorized third-party such as a bank or other official institution. Verification may be confirmed by the third-party digitally signing the jurisdiction data or a hash of the jurisdiction data using a cryptographic key publicly known to be held by the third-party, and using a digital signing algorithm. Actions may then proceed to step 3540, as disclosed above.

G. Example Policy-Associated Action: Ownership Management.

An example action associated with a policy may be to be able to reverse transactions, e.g., to transfer ownership of a token back to an initial owner of the token, or another account associated with the same person or organization. Examples of undesirable transfers may include transfers that are the result of online extortion, phishing attacks, stolen devices, malicious contracts initiating transfers of tokens, transactions executed in error, etc. The party associated with the rights conferred by a policy, e.g., to reverse a transaction, may be a consumer ombudsman selected by the user who lost a token to fraud, a law enforcement entity, a security company, a company operating the blockchain associated with the policy, etc. This party may either be a single entity or a distributed entity, e.g., including a quorum of trusted nodes associated with the policy. Different policies may be associated with different such parties. Compatible technologies, including watchful techniques, are disclosed in co-pending application titled "Watchful Consensus Mechanisms" by Markus Jakobsson; "Using Watchful Bridging for Blockchain Fraud Prevention" by Markus Jakobsson, Stefan Dufva, Keir Finlow-Bates and Guy Stewart; and "Automated Wallet and Transaction Control" by Markus Jakobsson and Keir Finlow-Bates, the disclosures of which are incorporated by reference in their entireties.

Watchful technology has been disclosed, as cited above, as a technique to implement recourse, among other functionalities. Watchfulness may be implemented in a variety of ways. One way is to augment the functionality of a block-chain bridge with a set of policies and associated actions taken on elements queued to be moved across the bridge. This may be either a centralized or a distributed mechanism, as will be appreciated by a person of skill in the art. Another example embodiment is in the context of a proof-of-work consensus mechanism, where the competing miners evaluate policies and perform actions related to the watchful principles. While this may be characterized as being performed by the winning miner alone, it is also done by every entity that is evaluating what chain is authoritative, meaning that these verifiers will also verify the policies and only accept a chain for which they agree that the policies were correctly acted on. Thus, the performance of the watchful filtering mechanism is performed by a single entity (namely, the winning miner), but enforced by the collection of distributed verifiers, many of which commonly will be peer miners.

In these embodiments, an example policy may identify what constitutes an acceptable transfer of ownership rights of a token, whether as the token transfer is attempted or even at a later point when a potential alert is raised. Such a policy may, for example, identify a transfer transaction that is fraudulent, e.g., based on a set of rules, an AI, one or more admin user inputs, etc. An associated action engine may be engaged to perform a modified transaction, which may be to temporarily freeze the token to be transferred, refuse to transfer it, transfer it to an escrow entity that collaborates with law enforcement to determine a next action, or agree to the transfer by place a hold on the associated funds or associated functionality of the token. An example freeze may be to temporarily or permanently add the token to a list of tokens that may not be transferred until a mitigating action is taken. Such an action may be the generation of a digital signature by a trusted entity, such as a DAO, law enforcement, a set of entities forming a consensus mechanism, etc.

Another embodiment of watchfulness filtering is to implement it with a validator in a proof of stake protocol. This is an entity that has put up a financial assurance (i.e., the stake) and is participating in approving a set of transactions by certifying that these are valid. This corresponds, as a person of skill in the art will appreciate, to the mining functionality of a proof of work protocol. However, a miner in a proof of work protocol risks losing a promised reward on mining an invalid block, whereas a validator in a proof of stake protocol risks losing some or all of the staked financial assurance. Similar to how verifiers in a proof of work protocol will determine whether a proof is valid (corresponding to the certification of a collection of notifications, such as token transfer requests) and may, in addition, implement watchfulness by evaluating one or more policies governing the watchfulness functionality, there are verifiers in a proof of stake protocol, and they determine the validity of a certification, and may, analogously to the example related to proof of work, be augmented to include the adherence to watchfulness policies in the determination of validity. Practically speaking, this means that a cheating validator who does not follow the policies, e.g., by approving a transaction request that is in violation with these policies, will be penalized and the transaction will be reversed or otherwise corrected by the next validator, or a subsequent validator, selected to perform the certification. The penalizing step may include the causing of a forfeiture of the stake, or a portion therefore, or a temporary banning of certification rights for the protocol. This also applies to the use of other policies and filtering methods, as described in the non-limiting examples provided herein; in other words, the implementation in a proof of stake protocol is not limited to the deployment of policies related to recourse.

It should be noted that watchfulness, while it may be used to implement recourse (e.g., return stolen funds after verified indications of a malware intrusion), it may also be used to implement other policies. For example, one may implement an automated sales tax on select transfers by taking a portion of a payment and sending it to a tax authority, the remainder being sent to the indicated recipient. This may be based on a policy that determines the jurisdiction and selects the tax authority accordingly, and which determines the tax rate based on the context of the transaction (e.g., where a transacting wallet is registered) and the type of transfer (e.g., to a merchant that is not performing non-taxable services, or a second account of the payee, as opposed to directed to a service provider that sells taxable goods or services.) Analogously, other policies may be enforced using watchful mechanisms, such as:

(1) burning a proportion of a token, possibly in response to a transaction, as a deflationary measure applied heuristically to a token, for example, when a token is used to represent a utilized resource; the portion to be burnt may be a function of time (e.g., the duration since the last burning of the same resource), the type of transaction (e.g., buying digital media vs. buying another currency), a discount code (e.g., member of a specified financial organization, AARP, etc.), (2) minting a new amount of a token, possibly in response to a transaction, as a replenishment measure, for example, when a system determines that a new user has joined, to ensure a fixed number of tokens exist per user of the system, (3) locking a proportion of a token in a staking contract or releasing a proportion of the token, for example, to ensure a price peg against another token by reducing or increasing an available supply of the token, and/or (4) automatically perform a user-specified action, e.g., save a portion of the amount received or spent in a long-term investment account.

Figure 36:
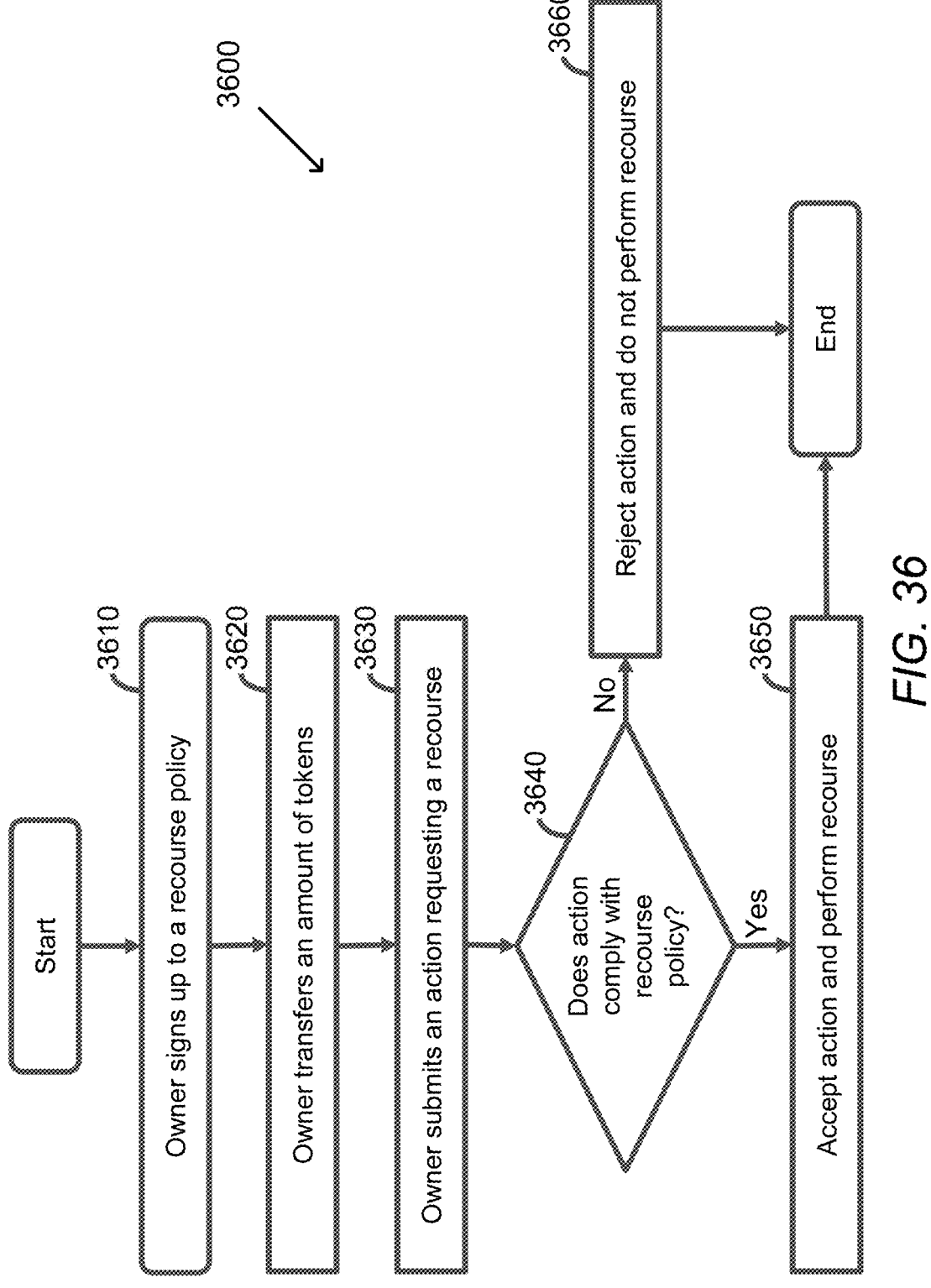
FIG. 36 illustrates a process for determining recourse for a transfer of tokens in accordance with numerous embodiments of the invention FIG. 37 conceptually illustrates a system for applying a rights policy pertaining to an asset in accordance with several embodiments of the invention.

A third exemplary embodiment of a recourse action policy is illustrated in FIG. 36. In some embodiments of the invention, recourse may take place on a blockchain, through an application of a recourse policy. Watchfulness may be used to implement recourse, in which case the recourse policy corresponds to one or more watchfulness policies and, optionally, one or more actions associated with these policies.

In the third exemplary embodiment actions 3600 may commence with an owner of a token type including a recourse policy may sign up to the recourse policy, as shown in step 3610. The recourse policy may stipulate conditions that must apply for the policy to be applicable, for example but not limited to, the owner residing in a specified jurisdiction, the recourse to be requested within a predetermined time limit, a payment of a fee for the recourse, up-to-date payments of an insurance policy fee, assessment of the recourse request by an appointed third-party, etc.

Actions may then proceed with the owner transferring an amount of tokens of the token type, as shown in step 3620. A transfer may be to another externally owned account or a smart contract.

Actions may then proceed with the owner submitting an action requesting a recourse, as shown in step 3630. The action may include a blockchain transaction, for example, a call to a function of a smart contract, or the action may include a notification, for example through a web form, email, SMS, messenger message, or some other communication channel. The notification may be made to an entity identified in the recourse policy, for example, an administrator of a smart contract instantiating the token type, a consumer ombudsman, a law enforcement agency, a security company, a distributed entity, etc.

Actions may then proceed to step 3640, in which an examination is made to determine whether the action complies with the recourse policy. For example, the examination may be made by a smart contract that determines the action has been made within a predetermined time limit, by a law enforcement agency determining that the transfer of the amount of tokens was a fraudulent transaction, by an insurance company determining that the owner has an up-to-date payment schedule for the recourse policy, etc.

If the examination determines that the action complies with the recourse policy, actions may proceed to step 3650, the action may be accepted, and the recourse may be performed, for example but not limited to, an enforced transfer back of the amount of tokens, a burning of the amount of tokens now held by the new owner and a minting of the amount of tokens to the owner, a payment to the owner matching a calculated or otherwise determined value proportional to the amount of tokens, or some other form of recourse.

If the examination determines that the action does not comply with the recourse policy, actions may proceed to step 3660, and the recourse may not be performed.

H. Example Policy-Associated Action: Logging of Identifying Information

Another example action associated with a policy is to require a verification of a physical identifier (e.g., the real name and address of a user; a user's social security number; an organization's Federal Employer Identification Number (FEIN), etc.), where the verification may involve the collection of a public key or other identifier, where this may be stored in an escrow storage unit after successful verification, and where the identifier may be audited by a designated trusted party, e.g., to track payments made for suspected illegal reasons. The verification and storage of identifying information may be a precondition to the transfer of the token to be allowed. It may also be performed within a given jurisdiction to users who have previously been flagged for being associated with undesirable behavior, e.g., as a result of law enforcement investigations. Audits of escrowed information may be performed in response to law enforcement actions, and may be enabled by law enforcement agencies. General audits of flows of tokens may also be performed periodically to identify potential violations of laws, e.g., campaign contribution laws. Examples of compatible escrow techniques include those disclosed in co-pending application titled "Automated Wallet and Transaction Control" by Markus Jakobsson, Kenneth Rosen and Keir Finlow-Bates, and "Escrowed Wallet and Transaction Tracking Technology" by Markus Jakobsson, the disclosures of which are incorporated by reference in their entireties.

I. Example Policy-Associated Action: Content Access Control

One example of an action associated with a policy is the granting a user access rights to a resource, such as a movie, game, music file, eBook, or document associated with a token. This access right may be conditional on the user making a payment to access the resource, and the existence of such a payment, e.g., identifying the resource, may be used as evidence of access rights. A trusted party, which may be distributed, may verify such proofs and enable access after doing this. Enabling access may be performed, e.g., by the trusted party signing an identifier associated with the right to access, where an example identifier may be a serial number or other identifier of a wallet, whether software based or hardware based. The wallet may include a DRM unit that verifies the digital signature of the trusted party, making sure that it identifies the requested resource (e.g., movie) and the wallet, after which the DRM unit facilitates the access to and rendering of the content. As another example, the trusted party may transmit a cryptographic key such as a decryption key to the DRM unit associated with a wallet that has been determined to have access rights to a given resource, where the cryptographic key enables access to the desired resource (e.g., movie or other content.) The trusted party may require the collection of and verification of identifying information, analogously to the escrow example above, to memorialize the access of the indicated content by the requesting party.

Another application of this is to make sure that a given asset (such as a digital sword) that may be used within multiple contexts (e.g., different games) is only usable in one such context, or a predetermined and approved number of contexts, at a time. That means that the use of the asset may be transferred between different contexts, such as different applications or different account holders wishing to use the asset, or different devices associated with the asset—all while ascertaining that the asset may only be accessed from one such context, or a predetermined and approved number of contexts, at a time. Some assets may have other thresholds associated with them, e.g., being allowed to be used within at most three different contexts at a time.

This enables rental of assets, by an owner of the asset, to a limited number of users at a time, or over a period of time. The control of the exact number may depend on the one or more policies, and may require that the owner pays a content creator for each "outsourced" access that is being allowed. Examples of DRM-related policies are disclosed in co-pending application "Ownership-Based Limitations of Content Access" by Markus Jakobsson (incorporated by reference in its entirety); a skilled artisan will recognize that technologies disclosed therein are compatible with the instant invention. One special case of access is disclosed in co-pending application titled "Policy-Based Time Capsule Technology" by Markus Jakobsson (incorporated by reference in its entirety); the techniques of the instant invention are compatible with the techniques described therein. The techniques disclosed in co-pending application 63/376,417 "Access Management Through Time Limited NFTs" (incorporated by reference in its entirety) are compatible with the instant invention, as will be appreciated by a person of skill in the art.

Figure 37:
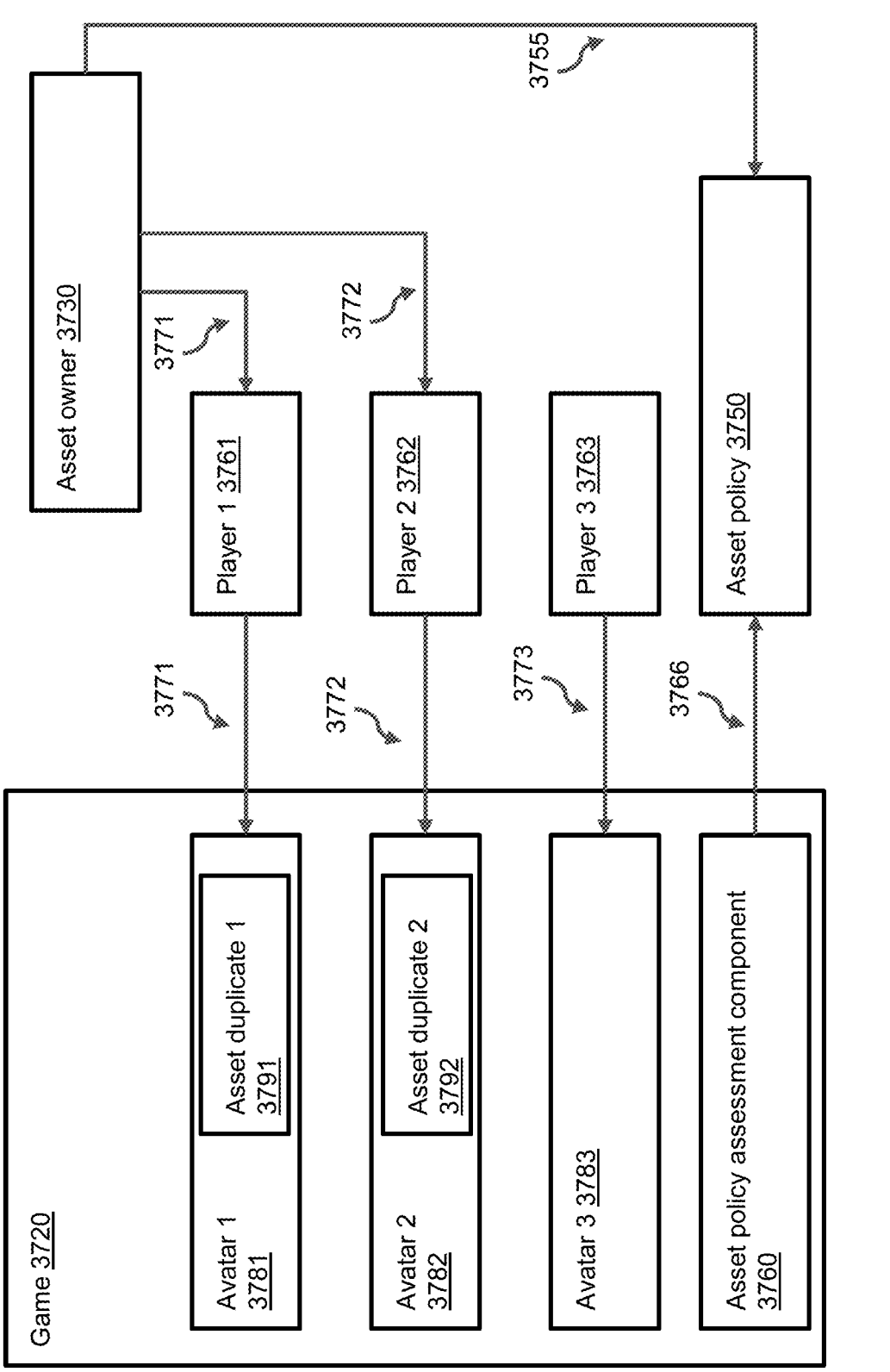

A fourth exemplary embodiment of a system for an application of a rights policy is illustrated in FIG. 37, in which an in-game item, for example a sword, may only be used in compliance with the rights policy.

In the third exemplary embodiment, a game 3720 may allow users to experience continuity of play through logging in with a user account, and subsequently gaining access to an avatar. For illustrative purposes three players are presented, a player 1 3761 logging in with an avatar 1 3781, a player 2 3762 logging in with an avatar 2 3782 and a player 3 3763 logging in with an avatar 3 3783. An asset owner 3730 may own a digital asset, for example, an in-game sword that the asset owner 3730 may have purchased, received as a gift, or obtained through game play or some other means, with the digital asset covered by an asset policy 3750 that, in an example provided for illustrative purposes only and not meant to be limiting, may restrict use of the digital asset to at most two players.

The asset owner 3730 may inform the asset policy or a system implementing and/or enforcing the asset policy 3750 that the digital asset may be used by player 1 3761 and player 2 3762, as shown by arrow 3755.

The asset owner 3730 may also inform player 1 3761 and/or player 2 3762 of a delegation of a right to use the digital asset, as shown by arrow 371 for player 1 3761 and arrow 3772 for player 2 3762. In some embodiments the asset owner 3730 may include a computer or gaming console, and similarly player 1 3761 and player 2 3772 may include computers or gaming consoles, and informing the delegation of the right to use the digital asset may be achieved through network communications, for example, a communication protocol over TCP/IP. In other embodiments informing player 1 3761 and player 2 3762 may be performed through some other communication method, for example, through a messenger application, or even verbally. In some embodiments there may be no communication of the delegation of the right to use the digital asset.

The game 3720, which in some embodiments may run on a server or network of servers, may make a communication request to the asset policy 3750 as shown by arrow 3766, for information on the delegation of the right to use the digital asset, and in some embodiments may retrieve information confirming that player 1 3761 and player 2 3762 has the right to use the digital asset.

Subsequently, when player 1 3761 connects to the game 3720 as shown by arrow 3771, which in some embodiments may involve logging in as avatar 1 3781, player 1 3761 may be granted the right to use a duplicate of the asset, shown as asset duplicate 1 3791 in FIG. 37. Similarly, when player 2 3762 connects to the game 3720 as shown by arrow 3772, which in some embodiments may involve logging in as avatar 2 3782, player 2 3762 may be granted the right to use a duplicate of the asset, shown as asset duplicate 2 3792 in FIG. 37. However, when player 3 3763, who has not been granted the right to use the digital asset through the asset policy 3750, logs in to the game as shown by arrow 3773, as avatar 3 3783, no asset duplicate is available to player 3 3763.

In some embodiments, communication may occur through blockchain wallets and transactions, and/or smart contracts. For example, the asset policy 3750 may be communicated through data structures in a smart contract that may be set by the asset owner 3730 using a setter function, and may be read by the game 3720 using a getter function.

Those skilled in the art will now appreciate in light of the above that communications described may be performed in a different order, and that some communications may be skipped, depending on a configuration of the system. For example, the asset owner 3730 may communicate the delegation of the right to use the digital asset directly to the game 3720 and the game 3720 may confirm this with the asset policy 3750 and then present the player 1 3761 and the player 2 3762 with the right to use the digital asset on logging in.

Those skilled in the art will appreciate in light of the above that the same system may be applied to other digital assets, for example for a media streaming service, an online news service, etc. Furthermore, a person skilled in the art will recognize that the different embodiments disclosed herein may be combined with each other.

J. Generating Access Logs

Content access control, in some instances, involves the keeping of a state (such as a counter, one or more identifiers, an access time, or a combination of such) in a storage, which may be centralized (e.g., maintained by the one or more trusted parties associated with evaluation of policies) or may be stored on a blockchain or a decentralized file system. In the latter case, the blockchain or decentralized file system may be a public blockchain or a public decentralized file system, thereby enabling an audit by the public of the access log, some of which may be encrypted (e.g., the identifiers of the entities gaining access to the associated content) and other which may be public (e.g., access times, access counts, charges collected, taxes and/or royalties paid.) Encrypted material may be protected using public key encryption, using the public keys of dedicated trustees. Different fields may use different dedicated trustees. For example, an identity field identifying what parties accessed content, may be accessible only to law enforcement, whereas a field indicating the jurisdiction(s) associated with an accessing party may be accessible by a wider collection of semi-trusted entities, e.g., advertisers, consumer representatives, political parties, etc. In some embodiments, encrypted data may be accessible only in aggregate. For example, by identifying in an ElGamal ciphertext associated with a first public key, a bit indicating whether an access was from a DRM module or not, which may be represented by a plaintext of either $g^{\wedge}0$ (encoding "no DRM") or $g^{\wedge}1$ (encoding "DRM"). A collection of such ciphertext may be multiplied together, causing a ciphertext that is an encryption of $g^{\wedge}i$, where i indicates the number of plaintexts in the input that had the DRM bit set, and $^{\wedge}$ indicates modular exponentiation, with g being a generator. A quorum of parties corresponding to a trusted entity may decrypt the aggregate ciphertext (comprising the product of input ciphertexts), to reveal the count i, but refuse to decrypt individual ciphertexts. This way, escrowed data may be computed on without revealing the corresponding plaintexts. A variety of methods to compute on encrypted data may be used in this manner to evaluate arbitrary functions on the escrowed data, without revealing individual plaintext elements.

Private keys used for decrypting ciphertexts may be distributed using secret sharing methods such as Shamir secret sharing, enabling distributed application of the private key to one or more inputs by a quorum of participants holding shares of the private key. Such shares may be distributed to the members of a Distributed Autonomous Organization (DAO), where a number of shares proportional to the ownership of assets held by the DAO may be held by different members of the DAO, and where an action by the DAO is performed by a quorum of members, using their shares.

Figure 38:
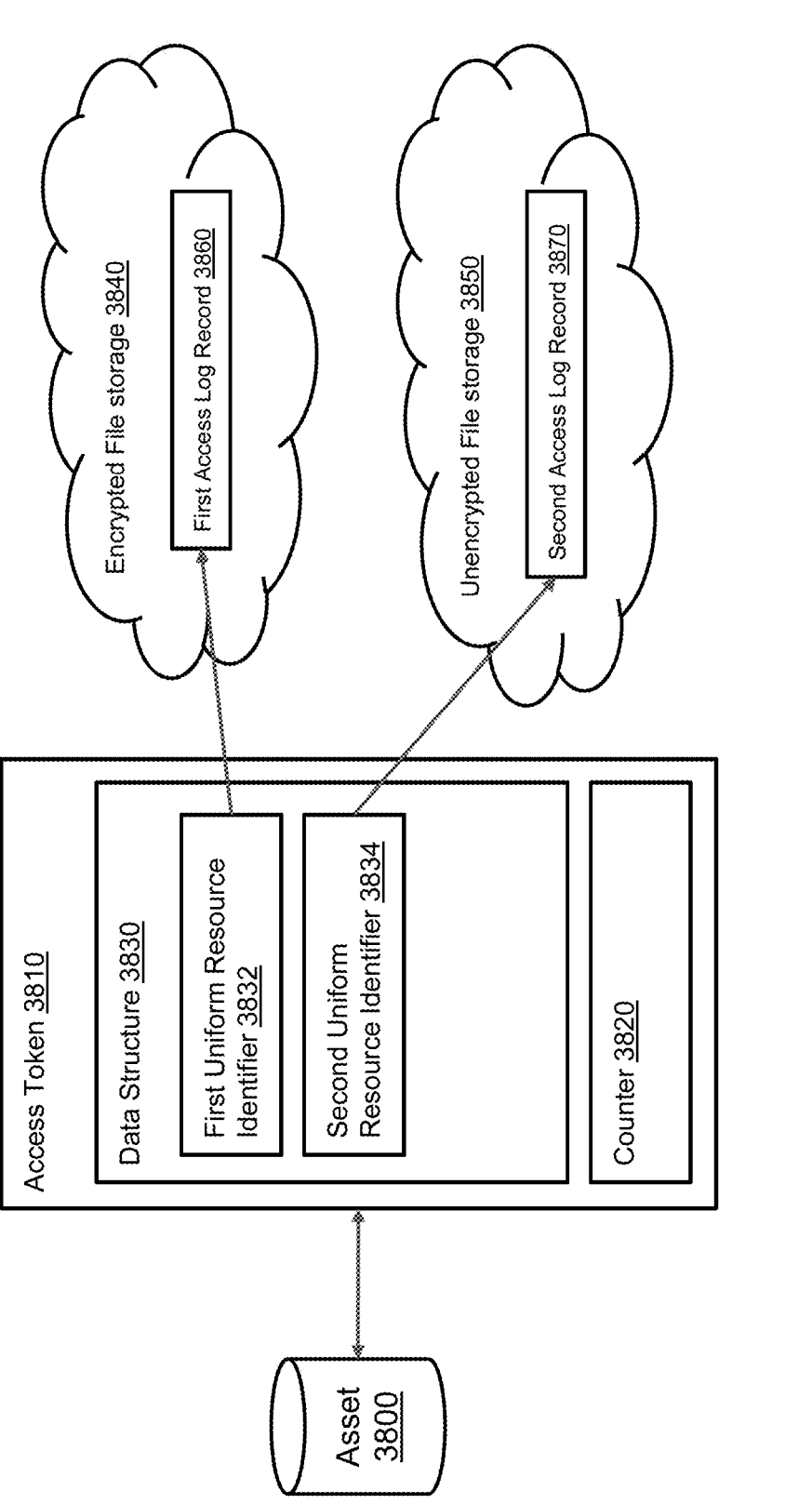
FIG. 38 conceptually illustrates a system for associating assets with access tokens and storing log data in accordance with many embodiments of the invention.

A fifth exemplary embodiment of a system for tracking access control through a blockchain token, for example an NFT or an anchor token, is illustrated in FIG. 38. An asset 3800, digital or physical, may be accessed through an access token 3810, with the access token 3810 tracking access of the asset 3800. Examples for asset 3800, presented for illustrative purposes only and not meant to be limiting in any way, may be: a door, a property, a vehicle, a digital media file such as a music track or a video, an eBook, a database, or a document.

The access token 3810 may include a counter 3820. In some embodiments the counter 3820 may be instantiated by a smart contract on a blockchain, and may include a data structure that keeps count of a number of times the asset 3800 has been accessed using the access token 3810. For example, if the asset 3800 is a door, the counter 3820 may track how many times the door has been opened, or if the asset 3800 is a video file, the counter 3820 may track how many times at least 30 seconds of the video has been watched.

The access token 3810 may include a data structure 3830 for storing uniform resource identifiers (URIs) or uniform resource locators (URLs) for logs relating to use of the asset 3800. A first uniform resource identifier 3832 may point to a first access log record 3860 stored on an encrypted file storage 3840. The first access log record 3860 may include access log data that is required to be kept private, for example, personal information, location information, financial information, and so on. A second uniform resource identifier 3834 may point to a second access log record 3870 stored on an unencrypted file storage 3850. The second access log record 3870 may include access log data that may be publicly revealed.

In some embodiments, the data structure 3830 may include a plurality of URL records pointing to a plurality of access log records stored on a plurality of different file storage systems with different security measures. The data structure 3830 may be dynamically updated, with more URL records added over time, and past URL records may be deleted after a predetermined time has passed or a predetermined condition is met.

K. Example Asset: An NFT Corresponding to Media Content

NFTs may correspond to one or more media content elements, wherein the ownership of the NFT is recorded on a blockchain. The media content (or more generally, the content) may be accessible independently of ownership, as is commonly the case today. The content or some of it may also be access controlled, e.g., require knowledge of some information to access it. Examples of such content may include high-resolution files; media versions without advertisements incorporated; content that may be rendered on specified types of displays, such as movie theater screens and associated audio equipment, e.g., speakers. In some embodiments, a large collection of devices may be capable of accessing such content, e.g., by having the secret key necessary to decrypt encrypted content data. However, not all of these devices may agree to access content to which they have decryption keys. These devices, which may be governed by hardware security modules (HSMs) and/or DRM modules, may determine what content they have access to, and what type of access, and process content accordingly, whether the content is encrypted or not. For example, a class of all devices of a specific type may have, in secure storage associated with each such device, a key used to decrypt one or more content elements of a given collection. The collection may be one or more movies, for example. Each such device may make a determination, based on available access right information, whether a given access request to a given content file should be permitted or not. This determination may depend on the date, the time of the day, the GPS coordinates of the device, a certification level associated with the device, a count indicating the number of previous accesses, one or more digital signatures generated by a content owner or a representative thereof, and one or more policies. Some of this information may be stored on a blockchain, and some of it may be stored or generated on the device, e.g., in a secure component thereof. Certification levels may be determined by periodic auditing of equipment and security mechanisms used, and assertions (e.g., in the form of digital signatures) may be generated by the auditing entity or a trusted organization associated with the auditing entity. The certification level may be time limited, thereby requiring periodic renewal of certification level data. The control of data may also be exercised by the distribution of secret keys to devices that pass a given certification level test, wherein such keys are useful to decrypt content of select types for a period of time that may be predetermined or which is controlled by a trusted entity, e.g., based on the detection of potential abuse.

Another example usage is to share an asset between two or more devices associated with an owner of the asset. Here, the asset may be an in-game artifact that may be used in the context of multiple games and/or in the context of multiple game stations, but only used in one game and/or game station at a time. The devices that may be used to access the asset may all have a key that enables decryption of content, or a permission encoded using an access control list (ACL) or other equivalent means. The devices maintain a common state variable indicating the current state of use of the asset, enabling such devices to check out and return the asset by requesting access; causing a request to be sent to a device currently holding the access rights; receiving an approval to transfer access rights; modifying the state indicating the current access rights to remove the previous rights and adding the new rights, where rights may be encoded in the form of a game and/or device identifier, and then enabling access according to the updated stored access rights data being stored. Requests and responses between devices and applications on these devices may be protected, e.g., using SSL, where protection may include both authentication and encryption. Alternative encrypted channels may be established at a time of setup and then used until a device and/or application is removed from the collection of entities with access to the channel, at which time a new channel may be created to replace the previous channel. When a device or application is added to a collection, then it may be provided with access enabling data (e.g., keys) or having an identifier associated with it recorded in an ACL; or a new channel may be established to replace the old channel.

L. Example Asset: An Anchored Asset

In one embodiment, the asset (e.g., NFT or crypto funds) may be anchored. The notion of anchored tokens has also been termed soul-bound tokens. One example of an anchored asset is a biometric token, e.g., as disclosed in co-pending application titled "Biometric Authentication using Privacy-Protecting Tokens" by Markus Jakobsson, the disclosures of which is incorporated by reference in its entirety.

Another example of an anchored token is a token which is assigned to an entity and which may not be transferred to another. This includes a token that may not be transferred based on being tied to an anchored token.

Anchored assets may be associated with policies, as described above, where the policies may govern the ability to update such assets, e.g., to account for changes in biometric templates. Such changes occur naturally, and are sometimes gradual, other times drastic (e.g., the loss of a digit used for fingerprinting). The latter requires fallback verification of identity by a trusted party with the capability to cause an update to the affected biometric token or related assets. Anchored tokens are disclosed in co-pending application titled "Token Creation and Management Structure" by Markus Jakobsson and Stephen C. Gerber, the disclosure of which is incorporated by reference in its entirety.

M. Example Asset: A Cryptofunds Token

In one embodiment, the disclosed system is used to protect a crypto funds token. This may be done to enable an override of or the reversal of a funds transfer, where a funds transfer corresponds to a transfer of ownership rights. The disclosed technologies may also be used to perform the forced transfer of funds, e.g., the automated payment of taxes, the automated repayment of a portion of a loan, etc. A token may be associated with one or more parties that have ownership rights, as well as one or more entities that may initiate or override transfers according to one or more policies associated with the token; with a jurisdiction; with a blockchain, etc. These entities may also generate a log of transfer data, e.g., including identifying data associated with the party holding ownership rights, where said logging may be used for Know Your Customer (KYC) requirements; and wherein the logged data may be, at least in part, encrypted. The logs may be stored in private storage or public storage, e.g., in blockchains or other storage approaches. The parties controlling the initiation of, modification of or blocking of transfers may be different from the parties controlling the logging of KYC data and other types of transfer data such as indications of transactions and the requesting applications. Different types of actions may be associated with different entities trusted with performing these, where some of these entities may be distributed but others may be centralized; and where some of the entities may be selected by an owner; a content creator; a law enforcement entity, but where some other entities may be selected by protocol designers, e.g., associated with a given blockchain.

Logging of data, as described above, may be performed using watchfulness techniques, where a policy governing the KYC actions required is kept by one or more agents performing watchfulness evaluations, e.g., as a miner may do. The KYC policy may also be kept in or referenced by the token. Both of these approaches are disclosed herein, and may be used in combination with each other or alternative to each other. Some KYC policy evaluation and logging actions may be performed in a digital rights management unit, which may be protected in a secure hardware unit, e.g., associated with a wallet or a miner unit. These design choices also apply to other types of policies, as will be understood by a person of skill in the art, and is not limited to KYC policies. Other such example policies are provided herein for illustrative purposes.

In some embodiments, KYC policies may specify required data, with said required data being self-supplied (that is, provided by the entity required to be certified), or may be supplied by third parties, for example but not limited to government departments, banks, corporations such as utility companies or telecommunication companies, legal offices, courts, trade registries, or licensed professionals. In further embodiments, required data may require certification by other parties. For example, an address may be provided by the entity required to be certified by the provision of a utility bill, with the utility bill countersigned by the entity's bank. Certification may be provided by an approved third-party digitally signing the required data or a hash of the required data using a cryptographic key publicly known to be held by the third-party, and using a digital signing algorithm.

Policy-based actions, such as what is disclosed herein, do not have to be limited to the time that a token is requested to be transferred. For example, if a fraudster steals a token using malware by transferring it from the ownership of the victim to an account the fraudster controls, then the attack may be detected long after this transfer has taken place. Using watchful mechanisms, it may be reverted or otherwise reassigned at any time, including in a situation when the token has already been transferred away from the account to which the criminal transferred it from the victim account. This avoids having an attacker launder tokens by performing a series of rapid transfers: the recourse may be performed even after such a laundering event. An attacker may also wish to use a coin for a legitimate purchase, thereby receiving another token in response to using the stolen token for a purchase. A watchful mechanism may reassign the coin used in this transaction to return it to the victim, and may then use a watchful mechanism to return the token the attacker purchased using the stolen coin, where the return may be made to the seller of that token. Sellers may wish to only take payment for tokens and services using payment tokens that have not recently been transferred, to avoid the risk of having a transaction undone. Sellers may also wish to purchase insurance that reimburses them if they suffer losses from abuse of this kind.

In some embodiments, the log of transfer data appended to subsequent transfer data logs, thus providing a record of precursor transactions and subsequent transactions that allow complex sequences of related transactions to be rolled back.

In some embodiments, the log of transfer data may be appended to subsequent transfer data logs, providing a convenient record of a history of transfers and associated transferring entities, thus providing data required to comply with the Bank Secrecy Act rule 31 CFR 103.33(g) (often called the "Travel" rule). If a transaction includes a transfer with a value above a predetermined limit and includes a sender and/or receiver identified as financial institutions and does not include the log of transfer data, in some embodiments the transaction may be deemed invalid and may not be processed by validators or miners.

N. Anchored Tokens for KYC Requirements

Anchored tokens may be used to satisfy KYC requirements. For example, a biometric token may be used to anchor to a physical identity of an owner. A second token including name, address and birthdate, say, may be tied to the biometric token, e.g., by having its ownership assigned to the biometric token. This may be done, for example, by using a hash of the biometric token as the identifier to which the identity is transferred. In cases where the goal is to irrevocably tie a token to another token, as is desirable in this context to make the second token (which we may refer to as the KYC token) anchored, it does not matter whether the assigned owner (in this case, the biometric token) is capable of ever reassigning ownership, as the intention is for this not to be done.

The KYC token may include some fields in plaintext and other fields in an encrypted format, where different encrypted fields may use different encryption keys, e.g., public keys associated with different trustees able to decrypt the fields. The encryption may be done as described, e.g., in co-pending application titled "Automated Wallet and Transaction Control" by Markus Jakobsson, Kenneth Rosen and Keir Finlow-Bates, and "Escrowed Wallet and Transaction Tracking Technology" by Markus Jakobsson, the disclosures of which are incorporated by reference in their entireties.

In one embodiment, a key K1 used to encrypt personal information PID, e.g., using a symmetric cipher, is encrypted using a first public key pk1 associated with a first trustee, using a second public key pk2 associated with a second trustee, and a third key Kuser that may be symmetric or asymmetric, where Kuser is associated with a user matching the entity whose personal information is encrypted. The resulting ciphertexts may be referred to as $C\_pid=Encr\_K1(PID)$, $C\_K11=Encr\_pk1(K1)$, $C\_K12=Encr\_pk2(K1)$, $C\_user=Encr\_Kuser(K1)$. Here, Encr denotes a suitable encryption algorithm (which may depend on the type of key provided).

This allows multiple parties to access PID. For example, the first trustee may determine PID by decrypting C_K11 to obtain K1, using a private key corresponding to pk1, and then decrypt C_pid using K1. The second trustee may, similarly, determine PID by decrypting C_K12 to obtain K1, using a private key corresponding to pk2, and then decrypt C_pid using K1. The user, similarly, may decrypt C_user to obtain K1, and then determine PID by decrypting C_pid. In one example use case, the user may generate a new ciphertext C_K13 for a third party associated with a public key pk3, where C_K13=Encr_pk3(K1), and then convey C_K13 to this party. This third party may then verify PID, optionally logging it or a reference to it. This third party may be a financial institution, for example, whereas the first trustee may be a consumer ombudsman and the second trustee a law enforcement entity for a jurisdiction relevant to the KYC token, the user, etc. Additional trustees and third parties may be used, as will be appreciated by a person of skill in the art. Threshold re-encryption may be performed using methods described in "On Quorum Controlled Asymmetric Proxy Re-encryption" by Markus Jakobsson, published in October 1999, the disclosures of which is incorporated by reference in its entirety.

Unencrypted fields associated with the KYC tokens may indicate information that is desirable to be public, such as the nationality of the user associated with the KYC token, whether this user is a minor, whether this user has some certification, and if so, a reference to such certification. An example certification may be a driver's license. Another example certification may be the membership in an organization, granting its owner access to some resource. The different certifications may be represented as tokens, where the link from one token to another may be established in a variety of ways, such as by assigning ownership as the KYC token relative to the biometric token as described above. Example methods of associating tokens to each other are provided in co-pending application titled "Token Creation and Management Structure" by Markus Jakobsson and Stephen C. Gerber, the disclosure of which is incorporated by reference in its entirety.

O. Example Method of Implementing Semi-Anchored Tokens

An anchored token is one that is not transferable, but which is permanently associated with a given entity. In some contexts, it may be desirable for the property of a token being anchored to be modifiable, e.g., by a trusted authority. One example may be a resource that is acquired by a user, at which time it is not anchored, and then, based on a request generated by the user, the token is caused to become anchored, whether to a second token, to a public key of the user, or to another identifier of an entity. This may be desirable to avoid undesired transfers. A parent may anchor a token to the wallet of her child to avoid the token being sold or stolen. An employer may anchor a token, which may be used for physical access control for example, to the biometric token of an employee who is thereby granted access to the associated physical resource. This protects against unwanted access to facilities. A government may anchor a token providing the rights to cross borders to a biometric token, thereby avoiding identity theft in the context of border crossings. At a later time, the same or another trusted authority may un-anchor the previously anchored token. This may be performed automatically as a triggering event takes place, e.g., when the child turns 18 years old. It may also be performed in response to an employment-related event, such as a user quitting her job and therefore no longer having the right to access the facilities of the employer. Similarly, it may be performed by a government in order to curb travel rights. The changes to what we may refer to as the anchor status may be non-binary, enabling a selection of states from a collection of available such states, where some state transfers may be enabled by some trusted entities and other state changes allowed by others. The anchor status may be expressed in a policy maintained and evaluated by a watchful mechanism, in a secure wallet, or in any other location where the policy may be verified prior to or in response to a request being made or serviced. Where this and related applications relate to actions taken relative to anchored tokens, a person of skill in the art will recognize that such actions may also be applied to semi-anchored tokens.

P. Example Method of Explicitly Associating a Token with a Policy

Traditionally, an ownership transfer of a token may be performed by using a private key that corresponds to a public key that has been associated with the ownership of the token, wherein the private key is used to generate a digital signature on an identifier of one or more parties to whom the token, or parts thereof, will be transferred. An example of such an identifier is a public key. However, there is nothing that says that a digital signature being created must result in an ownership transfer. Instead, in the instant invention, a signature is used to initiate an action related to an associated token. The action may be to transfer ownership, but it is not limited to that; the action may also be to associate a new policy with the token, or disassociate a policy from the token. Here, example policies include policies such as those disclosed in the instant invention, but could be any type of policy governing the use of, access to, rights associated with or functionality of the token, where such policy or policies may be indicated in the digital signature or by the selection of the format of the digital signature. One way of indicating a policy is to generate a digital signature on the policy or a reference to the policy, or a hash of the policy. Policies could be enumerated, and the digital signature may use an input message corresponding to the number of the policy or policies to be added, then a separator, and then the number of the policy or policies to be removed, as applicable. Since this is a different format than a public key, generating this digital signature does not transfer ownership of the token but just modifies the association between the token and the indicated policies. Collection of policies may be referenced using an address, a number, or another identifier such as a concatenation of hash values, each hash value corresponding to a policy. In one embodiment, a formatting value is combined with an input value, the formatting value indicating the type of action to be taken, and the input value indicating the arguments to be passed to the function applying said action. The arguments may be a public key, a policy reference, or a combination of these. The action may include multiple actions.

Q. Example Policy Embodiment: A Smart Contract

A smart contract may embody one or more policies, expressed as executable code, data, and references to online information sources, such as oracles, blockchains, and trusted entities such as those described above. A token owner may associate policies with the token as described above, e.g., by digitally signing an indication of the one or more policies, which may be expressed as a smart contract. By digitally signing a reference to the smart contract, the smart contract becomes associated with the token. Examples of such a reference include but are not limited to: a storage location where it is kept; a hash of the smart contract; or another indication of the smart contract such as an index into a list of common smart contracts. The digital signature may include an encoded indication of whether the smart contract is designated as the new owner of the token, or whether it is simply associated with the token in a manner specified by the smart contract. This may mean, for example, that the smart contract is allowed to rent out the token in situations where the token is not used by the entity owning it, or that the smart contract identifies, based on thresholds set by the owner, whether there are users willing to pay a price exceeding such thresholds in order to purchase the token, in which case the smart contract may either notify the owner or simply initiate the transaction to transfer the ownership rights, e.g., as identified by an input to the contract that is used as a configuration of it. Other configuration values include the thresholds. The token owner may specify arbitrary policies and limitations regarding how the token may be processed by the smart contract. The token owner may at any point modify the policies associated with a token by generating a new digital signature that modifies what policies (including those specified by smart contracts) govern the token. Here, examples of owners include an individual user performing actions using a wallet; an organization (such as a centralized organization or a DAO) using a combination of scripts and user input units with interfaces operable by users; an AI; and another token. The notion of tokens owning tokens was disclosed in co-pending application titled "Directed Acyclic Token Structure" by Markus Jakobsson, the disclosure of which is incorporated by reference in its entirety.

R. Example Policy Implementation: AI

In the examples above, the policy includes one or more rules, where an example rule includes a regular expression. In some embodiments, the policy is embodied, at least in part, in an AI, and may be dynamic in that the policy changes as the AI learns how to better adapt to the context. This may be applied to all the example contexts in this disclosure.

For example, an AI may be trained to identify fraud, based on observed and reported fraud instances. One or more AI instances may be used to identify the presence of fraud, and then classify the type of fraud. Based on the outputs from the one or more instances, an action is selected. This may be selected using the AI, using a rule-based system, or a combination thereof. The selected action is then taken, e.g., in one of the example manners disclosed in the instant invention. The AI may be managed in a centralized manner or in a distributed manner, where an example of the latter is disclosed in co-pending application titled "Secure and Intelligent Decentralized Technology" by Markus Jakobsson, Stephen C. Gerber and Ajay Kapur, the disclosure of which is incorporated by reference in its entirety.

Training material for an AI may be provided in one of a multiplicity of manners. For example, classified instances may be provided by a trusted party, which may be centralized (e.g., a security company or a governmental agency) or distributed (e.g., a DAO, or a collection of the collaborating and/or competing security companies); classified instances may also be provided from another AI, from a recommendation system, or using a consensus mechanism. An example consensus mechanism is used for bitcoin mining; this (or other consensus mechanisms) may be augmented to also take as input a classification of instances, where a majority vote on the classification would be inherent in the establishment of consensus. Such a consensus-based mechanism may be used to score competing AIs, thereby providing a feedback mechanism that enables the AIs to learn from the feedback provided.

S. Example Implementation: Modification of Biometric Templates.

Returning to the example of the anchored token provided above, the biometric template that is encoded in or referenced in one example anchored token may be associated with a policy for updating of the template. For example, the policy may include an AI that identifies gradual changes of the biometric representation of a given user. These changes are typically incremental and very limited when compared from one authentication effort to the next, but could become most notable after a sufficient time has elapsed. It is therefore valuable for the system to automatically update the biometric templates to account for small changes observed between consecutive successful authentication instances. This may be done by the use of a stored template and a policy that enables the updating of said stored template. For example, consider the encrypted biometric template described in U.S. Pat. No. 6,901,145 titled "Generation of repeatable cryptographic key based on varying parameters" by Philip L. Bohannon, Bjorn Markus Jakobsson, Fabian Monrose, Michael Kendrick Reiter and Susanne Gudrun Wetzel, the disclosure of which is incorporated by reference in its entirety, where individual aspects of the template are expressed as threshold-based selections of values in a matrix. The instant invention recognizes that a modification of the biometrics, as observed by one or more sensors, may be responded to by performing a change of the encrypted template by, for example, modifying the individual thresholds set, without having to replace the matrix values that are being selected based on the comparison with the thresholds. Alternatively, after a user has successfully authenticated, a new matrix may be generated and set to replace the old matrix, wherein the new matrix may use the same threshold values but different contents in the matrix to account for the modifications of the biometrics. Yet another alternative in this example situation is to modify both thresholds and matrix elements. Modifying one or more such thresholds and/or matrix values will enable continued generation of the secret value encoded by the thresholds and the matrix even as the biometric sensors report the new measurements corresponding to the changed biometrics. This may be seen as an example of where learning is used not for the modification of an AI but of stored parameters. However, as will be understood by a person of skill in the art, an AI may encode such parameters, making this just another example of an AI that modifies itself (namely the parameters it includes), as previously described herein.

T. Example Policy: Incentivization and Control

A user may agree to an incentivization program wherein she obtains a benefit (such as a discount, miles, favored access to a resource, etc.) in exchange for an action. Example actions include but are not limited to: signing up for the program, paying a fee, agreeing to have at least some purchase and/or demographic data collected on behalf of a third party, agreeing to receive targeted advertisements, using a coupon, belonging to an organization, allowing two or more parties to exchange collected information about the user, etc. The policy may be associated with a wallet, with one or more public keys, with the usage of a given biometric token for purposes of authentication, with the use of a given blockchain, with a contract or a configuration thereof, etc. As a policy evaluation entity (such as a verifier, or a bridge, for example) determines that a requested transaction is associated with a policy, the policy evaluation entity initiates an action associated with the policy and initiates a response to the requested transaction, e.g., approves the transaction, logs the transaction, causes an advertisement to be rendered on a device associated with the request, collects information related to the device associated with the request, logs information associated with the request, conveys information related to the request to one or more third parties, or facilitates a setup of a connection between the device associated with the request and a third party, such as a content provider. A user may elect to have only some transaction trigger the use of the described policies by indicating, along with the transaction request, what policies should be matched. Some users may be required to comply with some policies, e.g., tracking of location for convicted criminals, or logging associated with transaction requests for purposes of fraud detection, where the logging may be performed on behalf of an insurance company with whom the user is insured. Yet other users may be required to have some policies enabled, e.g., for parental control, wherein the policy may indicate the type of transactions that are allowed for this user, her wallet, or using funds from a given account. These policies may, for example, cap the amount of payments, limit transactions to some specified types, only allow transactions at specified times of the day or associated with approved locations, or only allow the selling of some specified tokens. The policies may alternatively, or in addition, require selective approval by a third party, such as the parent, or an associated party. Similar techniques may be used to control the types of transactions performed by employees of an organization. In some embodiments, the verification of what transactions are allowed and what types of specified resulting actions are required may be performed by a multiplicity of entities, such as both a wallet and an entity associated with a consensus mechanism. This may be done to detect discrepancies and potential tampering with the policy verification.

U. Remote Control of Policies

In the above portion of the disclosure, it has been described how an owner of an asset may modify what policies are associated with the asset. It will be understood that some policies may be required for the hosting of the asset on a given blockchain, and/or access to it from a wallet associated with a given jurisdiction; however, it remains the responsibility of the owner to control the assignment of policies, independently of whether this is done out of free will or by edict. In some embodiments, some policies may also be associated with or disassociated from an asset by a third party that is different from the current owner. Examples of such third party entities include token creators, marketplaces, governments, consumer watchdog agencies, distributed AIs, DAOs, etc.

Whether implicitly encoded in a token or not, the token may be associated with information indicating what types of policies may be controlled, and by what parties. This does not mean that such entities need to step up and perform actions that control the associated tokens, but it simply means that they are able to yield this influence. One way of implementing this is to encode a set of rules and associated entity identifiers (such as public keys of the corresponding parties) specifying what types of control these entities may exercise on the associated tokens, where example types of control include but is not limited to actions for tax collection; actions for generation and usage of escrowed identity information (e.g., related to use or ownership of a given token); capability to reverse transactions, or more generally, to prescribe modifications of ownership under given circumstances. The deployment of such an augmented system promises to take the wild west out of blockchain transactions and offer security and privacy for law-abiding users of the technology, while maintaining features that motivate the deployment of distributed management of ownership information. Thus, the disclosed technology offers approaches to have policies created for the well-being of society govern the practical functionality of blockchain transactions, as opposed to having today's technological constraints force users into a situation in which their well-being is up to shrewdness or luck. An example of one such problem is the use of crypto currencies by criminals blackmailing innocent citizens, whether these citizens were crypto users prior to being attacked-such problems will enter a list of historical abuses with the deployment of the disclosed technology.

V. Example Usage: Conditional Policy Assignment.

A token may be associated with one or more policies and entities that are given rights to initiate actions related to the token. For example, an action may be to log what parties access a media content element associated with the token, or the identity of users acquiring the token. Complex policies are enabled, e.g., based on the context. In one example situation, a wallet that was developed in the USA is registered by a Canadian citizen, and used, while this person is visiting Germany, to perform a transaction that causes the transfer of an asset to a user domiciled in Japan. Representative entities of these jurisdictions may be provided rights to perform actions related to the logging of information, access to previously logged information, and rights related to collection of taxes, for example. Different entities may be provided with different rights, and these rights may be ordered according to a prioritization order to resolve potential conflicts between rights. In addition, the content creator associated with the accessed or transferred token may have rights, e.g., the collection of royalties, which may be governed by a representative of the content creator. The activation and deactivation of some of these policies may depend on the context of a transaction. For example, as the user carrying the device with the wallet on leaves Germany and enters the Netherlands, the German authorities may no longer have access rights to some information related to the wallet (such as a list of what other wallets it is interacting with, or its precise GPS location, as reported to an escrow authority by a secure hardware module associated with the wallet.) Instead, a different collection of rights, related to Dutch authorities, may be enabled. At the same time, the Canadian authorities may maintain their rights to receive some information related to the wallet, such as the rights to query escrow databases to determine the flow of funds related to the user in question. Thus, logic associated with the wallet (including its content, location or transactions) may influence what policies are set to be active; at the same time, aspects related to the transactions (e.g., onto what blockchains tokens are transferred) may control the activation or deactivation of another set of policies. A person of skill in the art will recognize that these examples are non-limiting, and simply used to illustrate the breadth of opportunities of the disclosed technology.

W. Encoding Policies and/or Policy Changes

Policies may be encoded along with tokens on the blockchain in a variety of ways. In one example implementation, each recorded transfer of a token includes an array that indicates what policies are enabled or conditionally enabled (e.g., based on context) vs. which ones are disabled. As an alternative, recorded token transfers may contain a list of added or removed policies associated with the token. The latter may in some instances save storage space, but will incur additional computational costs when a party wishes to determine what collection of policies are active for a given token, as this would require searching through multiple blockchain entries. As a possible compromise, every ten recordings for token transfers may include a list of all policies enabled/conditionally enabled, with recordings in-between only including indications of additions or removals of policies to the most recent previous recorded complete list. A person of skill in the art will recognize that there are many related tradeoffs between storage and computational effort that may be made using variants of such encoding approaches.

Systems and methods for ownership management implemented in accordance with many embodiments of the invention are not limited to use within NFT platforms. Accordingly, it should be appreciated that the token-based applications described herein may also be implemented outside the context of an NFT platform network architecture unrelated to NFTs. Moreover, any of the systems and methods described herein with reference to FIGS. 37-38 may be utilized within any of the NFT platforms described above.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for confirming token ownership rights, the method comprising:
  generating, using a processor, a pre-image value, wherein the pre-image value is generated using a random number generator;
  generating, using the processor, an action request, wherein the action request corresponds to an action performed for a set of at least one particular cryptographic token;
  deriving, using the processor, a commit output, wherein the commit output:
    is derived based, at least in part, on the pre-image value; and
    references at least one condition for the action;
  generating, using the processor, a commit request, wherein the commit request obfuscates the action request based on the commit output;
  submitting, using the processor, the commit request to a particular immutable ledger;
  receiving a first confirmation when the commit request is approved by the particular immutable ledger; and
  after a reveal request referencing the commit output is published, receiving, based on the reveal request, a second confirmation
    that the action request has been approved, wherein the reveal request referencing the commit output is published following a verification that:
      the set of at least one particular cryptographic token is in possession of a generating party for the commit output;
      the at least one condition for the action occurred; and
      the reveal request comprises a reference to the commit output.

2. The method of claim 1, wherein:
  the action request comprises a transfer request, transferring the set of at least one particular cryptographic token to a receiving address; and
  the particular immutable ledger is a blockchain.

3. The method of claim 2, wherein the reveal request is submitted to the particular immutable ledger by the receiving address.

4. The method of claim 1, wherein deriving the commit output comprises applying at least one one-way function to the pre-image value and at least one message comprising an action-associated value.

5. The method of claim 4, wherein a first function of the at least one one-way function is a cryptographic hash function.

6. The method of claim 5, wherein the action-associated value included in a first message of the at least one message comprises at least one of:
  an account identifier for each of one or more parties to the action;
  a token type value, where the token type value numerically identifies a token type for the set of at least one particular cryptographic token; or
  an address value, where the address value corresponds to a blockchain address.

7. The method of claim 4, wherein the second confirmation depends on whether applying the at least one one-way function to the commit output and the action-associated value referenced in the reveal request produces the same result as applying the at least one one-way function to the commit output and the action-associated value referenced in the commit request.

8. The method of claim 1, wherein:
  the reveal request is submitted to a second immutable ledger; and
  a node, monitoring both the particular immutable ledger and the second immutable ledger, determines whether the reveal request comprises the reference to the commit output.

9. The method of claim 8, wherein the action request corresponding to the commit request is approved by the second immutable ledger.

10. The method of claim 1, wherein the commit request corresponds to at least one additional request for a set of at least one additional cryptographic token.

11. The method of claim 1, wherein the commit output further references at least two addresses representing potential participants to the action.

12. The method of claim 11, wherein the generating party is identified by one of the at least two addresses representing potential participants to the action.

13. The method of claim 11, wherein a fraction of the at least one particular cryptographic token is:
  exchanged in the transfer; and
  identified in the reveal request.

14. The method of claim 1, wherein the generating party is selected at least in part based on the at least one condition referenced in the commit output.

15. The method of claim 1, wherein:
  the action is a transfer corresponding to the set of at least one particular cryptographic token; and
  at least some of the set of at least one particular cryptographic token comprises digital currency.

16. The method of claim 1 wherein the random number generator is a pseudo-random generator.

17. A non-transitory computer-readable medium comprising instructions that, when executed, are configured to cause a processor to perform a process for confirming token ownership rights, the process comprising:
  generating a pre-image value, wherein the pre-image value is generated using a random number generator;
  generating an action request, wherein the action request corresponds to an action performed for a set of at least one particular cryptographic token;

deriving, using the processor, a commit output, wherein the commit output:

is derived based, at least in part, on the pre-image value; and references at least one condition for the action;

generating a commit request, wherein the commit request obfuscates the action request based on the commit output;

submitting the commit request to a particular immutable ledger;

receiving a first confirmation when the commit request is approved by the particular immutable ledger; and after a reveal request referencing the commit output is published, receiving, based on the reveal request, a second confirmation that the action request has been approved, wherein the reveal request referencing the commit output is associated with a verification that:

the set of at least one particular cryptographic token is in possession of a generating party for the commit output;

the at least one condition for the action occurred; and the reveal request comprises a reference to the commit output.

18. The non-transitory computer-readable medium of claim 17, wherein:

the action request comprises a transfer request, transferring the set of at least one particular cryptographic token to a receiving address; and the particular immutable ledger is a blockchain.

19. The non-transitory computer-readable medium of claim 18, wherein the reveal request is submitted to the particular immutable ledger by the receiving address.

20. The non-transitory computer-readable medium of claim 17, wherein deriving the commit output comprises applying at least one one-way function to the pre-image value and at least one message comprising an action-associated value.

21. The non-transitory computer-readable medium of claim 20, wherein a first function of the at least one one-way function is a cryptographic hash function.

22. The non-transitory computer-readable medium of claim 21, wherein the action-associated value included in a second message of the at least one message comprises at least one of:

an account identifier for each of one or more parties to the action;

a token type value, where the token type value numerically identifies a token type for the set of at least one particular cryptographic token; or an address value, where the address value corresponds to a blockchain address.

23. The non-transitory computer-readable medium of claim 20, wherein the second confirmation depends on whether applying the at least one one-way function to the commit output and the action-associated value referenced in the reveal request produces the same result as applying the at least one one-way function to the commit output and the action-associated value referenced in the commit request.

24. The non-transitory computer-readable medium of claim 17, wherein:

the reveal request is submitted to a second immutable ledger; and a node, monitoring both the particular immutable ledger and the second immutable ledger, determines whether the reveal request comprises the reference to the commit output.

25. The non-transitory computer-readable medium of claim 24, wherein the action request corresponding to the commit request is approved by the second immutable ledger.

26. The non-transitory computer-readable medium of claim 17, wherein the commit request corresponds to at least one additional request for a set of at least one additional cryptographic token.

\* \* \* \* \*